US012663912B2

(12) United States Patent
Chen et al.

(10) Patent No.: US 12,663,912 B2
(45) Date of Patent: Jun. 23, 2026

(54) DISPLAY APPARATUS AND METHOD

(71) Applicant: VIDAA (NETHERLANDS) INTERNATIONAL HOLDINGS B.V., Duiven (NL)

(72) Inventors: Wenzhu Chen, Duiven (NL); Chen Sun, Duiven (NL); Futeng Niu, Duiven (NL); Qiuhao Hou, Duiven (NL)

(73) Assignee: VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 242 days.

(21) Appl. No.: 18/667,203

(22) Filed: May 17, 2024

(65) Prior Publication Data

US 2024/0302937 A1 Sep. 12, 2024

Related U.S. Application Data

(63) Continuation of application No. PCT/EP2023/054968, filed on Feb. 28, 2023.

(30) Foreign Application Priority Data

| | | | |
|---|---|---|---|
| Feb. 28, 2022 | (CN) | ......................... | 202210190115.6 |
| Mar. 9, 2022 | (CN) | ......................... | 202210225831.3 |
| Jun. 28, 2022 | (CN) | ......................... | 202210747475.1 |

(51) Int. Cl.
*G06F 3/04817* (2022.01)
*G06F 3/0483* (2013.01)
*G06F 8/61* (2018.01)

(52) U.S. Cl.
CPC ........ *G06F 3/04817* (2013.01); *G06F 3/0483* (2013.01); *G06F 8/61* (2013.01)

(58) Field of Classification Search
CPC ....... G06F 3/04817; G06F 3/0483; G06F 8/61
(Continued)

(56) References Cited

U.S. PATENT DOCUMENTS

| | | | | |
|---|---|---|---|---|
| 10,776,414 B2 * | 9/2020 | Des Jardins | .......... | G06F 16/435 |
| 2012/0089971 A1 * | 4/2012 | Williams | .................. | G06F 8/61 |
| | | | | 717/177 |

(Continued)

FOREIGN PATENT DOCUMENTS

| | | |
|---|---|---|
| CN | 102098579 A | 6/2011 |
| CN | 107193516 A | 9/2017 |
| CN | 108307222 A | 7/2018 |
| CN | 108804185 A | 11/2018 |
| CN | 111757154 A | 10/2020 |
| CN | 113360058 A | 9/2021 |

(Continued)

OTHER PUBLICATIONS

The World Intellectual Property Organization (WIPO) International Search Report for PCT/CN2023/054968 Jun. 7, 2023 5 Pages.
(Continued)

*Primary Examiner* — William D Titcomb
(74) *Attorney, Agent, or Firm* — Anova Law Group, PLLC

(57) ABSTRACT

Disclosed are a display apparatus and a method. The method includes: receiving an install command for installing a target third party application in the display apparatus from a user; in response to the install command for installing the target third party application, storing application data of the target third application in a first storage space in a memory in the display apparatus; receiving a display command for displaying an icon of the target third party application on a second application display page; in response to the display command, moving the application data of the target party application from the first storage space to a second storage space in the memory and display the icon of the target third party application on the second application display page.

20 Claims, 34 Drawing Sheets

(58) Field of Classification Search
USPC ........................................................ 715/765
See application file for complete search history.

(56) References Cited

U.S. PATENT DOCUMENTS

| | | | |
|---|---|---|---|
| 2012/0272231 A1 | 10/2012 | Kwon et al. | |
| 2014/0059603 A1 | 2/2014 | Lee et al. | |
| 2015/0339006 A1* | 11/2015 | Chaland ................... | G06F 3/048 |
| | | | 715/835 |
| 2018/0189076 A1* | 7/2018 | Liston .............. | H04N 21/44204 |
| 2018/0262812 A1* | 9/2018 | Chai ................... | H04N 21/4383 |
| 2019/0327534 A1 | 10/2019 | Voth et al. | |
| 2019/0373130 A1* | 12/2019 | Han ........................... | G06F 8/62 |
| 2020/0233568 A1 | 7/2020 | Wang | |
| 2024/0302937 A1* | 9/2024 | Chen ..................... | G06F 3/0483 |

FOREIGN PATENT DOCUMENTS

| | | |
|---|---|---|
| CN | 113835702 A | 12/2021 |
| EP | 3949377 A1 | 2/2022 |
| WO | 2020035007 A1 | 2/2020 |

OTHER PUBLICATIONS

Anonymous: "What is an "Applmage"? How do I install it?", Nov. 3, 2021 (Nov. 3, 2021), pp. 1-12, XP093049754, https://askubuntu. com/questions/774490/what-is-an-appimage-how-do-i-install-it, Retrieved from the Internet: URL: https://web.archive.org/web/ 20211103222718/https://askubuntu.com/questions/774490/what-is-an-appimage-how-do-i-install-it [retrieved on May 25, 2023].
Anonymous: "User Guide Applmage—Frequently Asked Questions", Nov. 11, 2021 (Nov. 11, 2021), pp. 1-2, XP093049761, https://docs.appimage.org/user-guide/faq.html#question-where-do-i-store-my-appimages, Retrieved from the Internet: URL:https:// web.archive.org/web/20211119073434/ttps://docs.appimgage.org/ user-guide/faq.html [retrieved on May 25, 2023].
Techmespot: "How to Run an Applmage on Ubuntu 18.04 LTS?", Sep. 11, 2019 (Sep. 11, 2019), XP093049783, Retrieved from the Internet: URL: https://www.youtube.com/watch?v=6F5jgWvOSjk, [retrieved on May 25, 2023].
Linder Brad: "First look: Huawei MateBook X Pro with Ubuntu 18.04 Linux—Liliputing", Jul. 6, 2018 (Jul. 6, 2018), pp. 1-17, XP093050004, https://liliputing.com/first-look-huawei-matebook-x-pro-with-ubuntu-18-04-linux/, Retrieved from the Internet: URL: https://liliputing.com/first-look-huawei-matebook-x-pro-with-ubnutu-18-04-linux/, [retrieved on May 26, 2023].
The China National Intellectual Property Administration (CNIPA) The First Office Action for Chinese Application 202210747475. Mar. 25, 2026 15 Pages (With Translation).
The China National Intellectual Property Administration (CNIPA) The First Office Action for Chinese Application 202210190115.6 Mar. 28, 2026 17 Pages (With Translation).

* cited by examiner

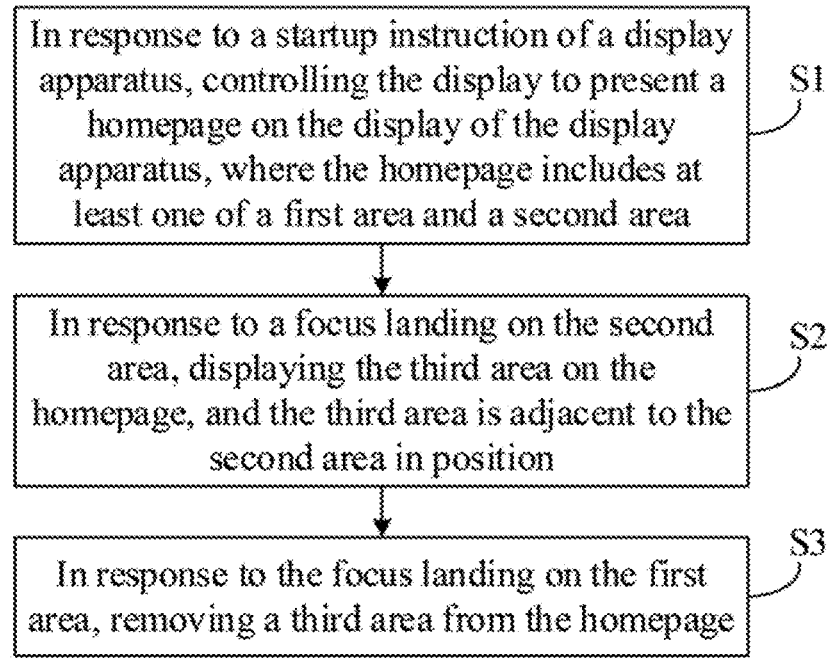

In response to a startup instruction of a display apparatus, controlling the display to present a homepage on the display of the display apparatus, where the homepage includes at least one of a first area and a second area — S1

In response to a focus landing on the second area, displaying the third area on the homepage, and the third area is adjacent to the second area in position — S2

In response to the focus landing on the first area, removing a third area from the homepage — S3

FIG. 6

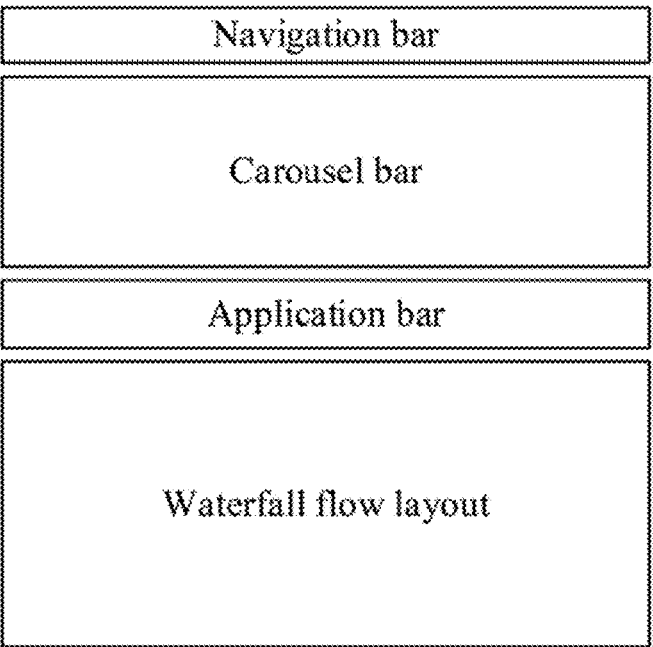

Navigation bar

Carousel bar

Application bar

Waterfall flow layout

FIG. 7A

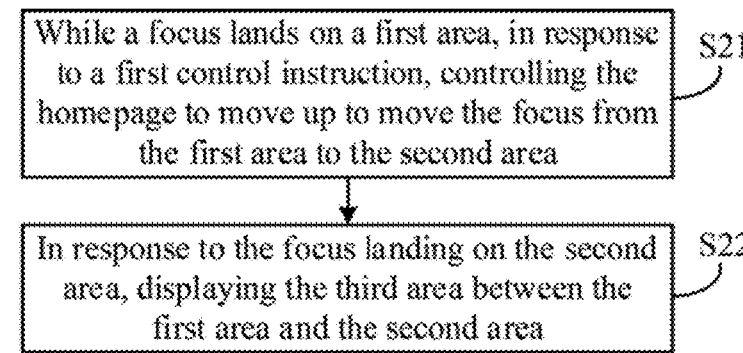

While a focus lands on a first area, in response to a first control instruction, controlling the homepage to move up to move the focus from the first area to the second area — S21

In response to the focus landing on the second area, displaying the third area between the first area and the second area — S22

FIG. 9

Homepage

Navigation bar

Carousel bar

Carousel bar

Application bar

Waterfall flow layout (a)

Bar for application preview

Application bar

Waterfall flow layout (b)

FIG. 10

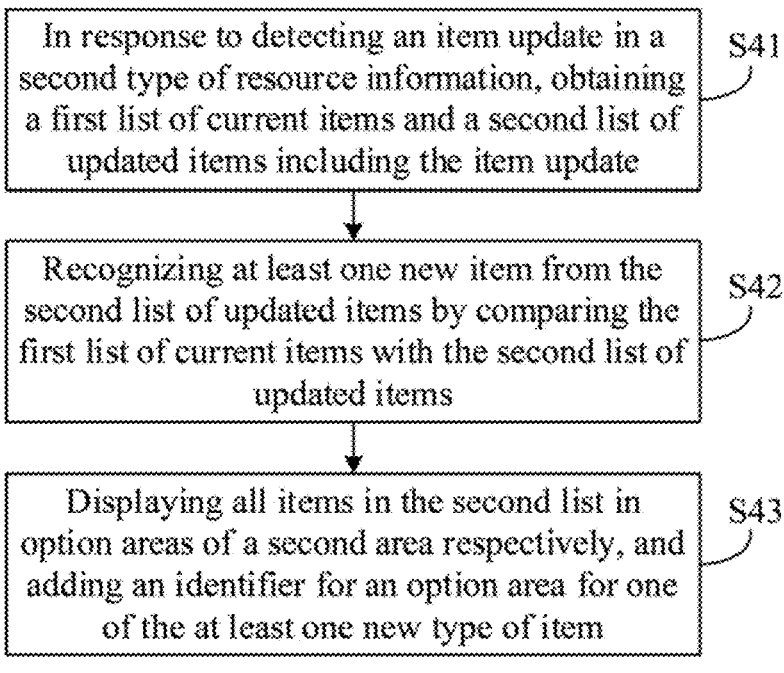

In response to detecting an item update in a second type of resource information, obtaining a first list of current items and a second list of updated items including the item update ⟩ S41

Recognizing at least one new item from the second list of updated items by comparing the first list of current items with the second list of updated items ⟩ S42

Displaying all items in the second list in option areas of a second area respectively, and adding an identifier for an option area for one of the at least one new type of item ⟩ S43

FIG. 16

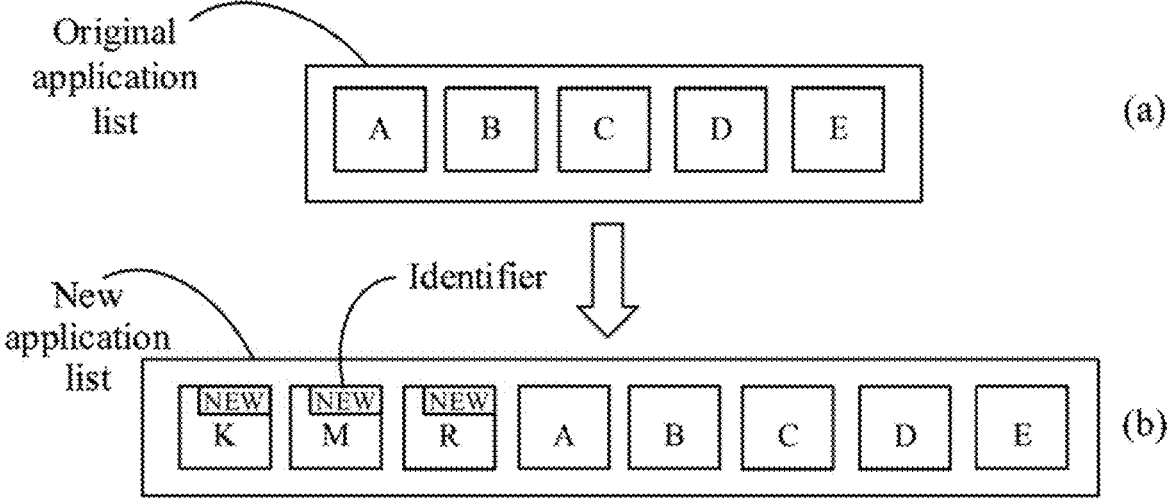

Original application list

| A | B | C | D | E | (a)

New application list     Identifier

| NEW K | NEW M | NEW R | A | B | C | D | E | (b)

FIG. 17

New application list

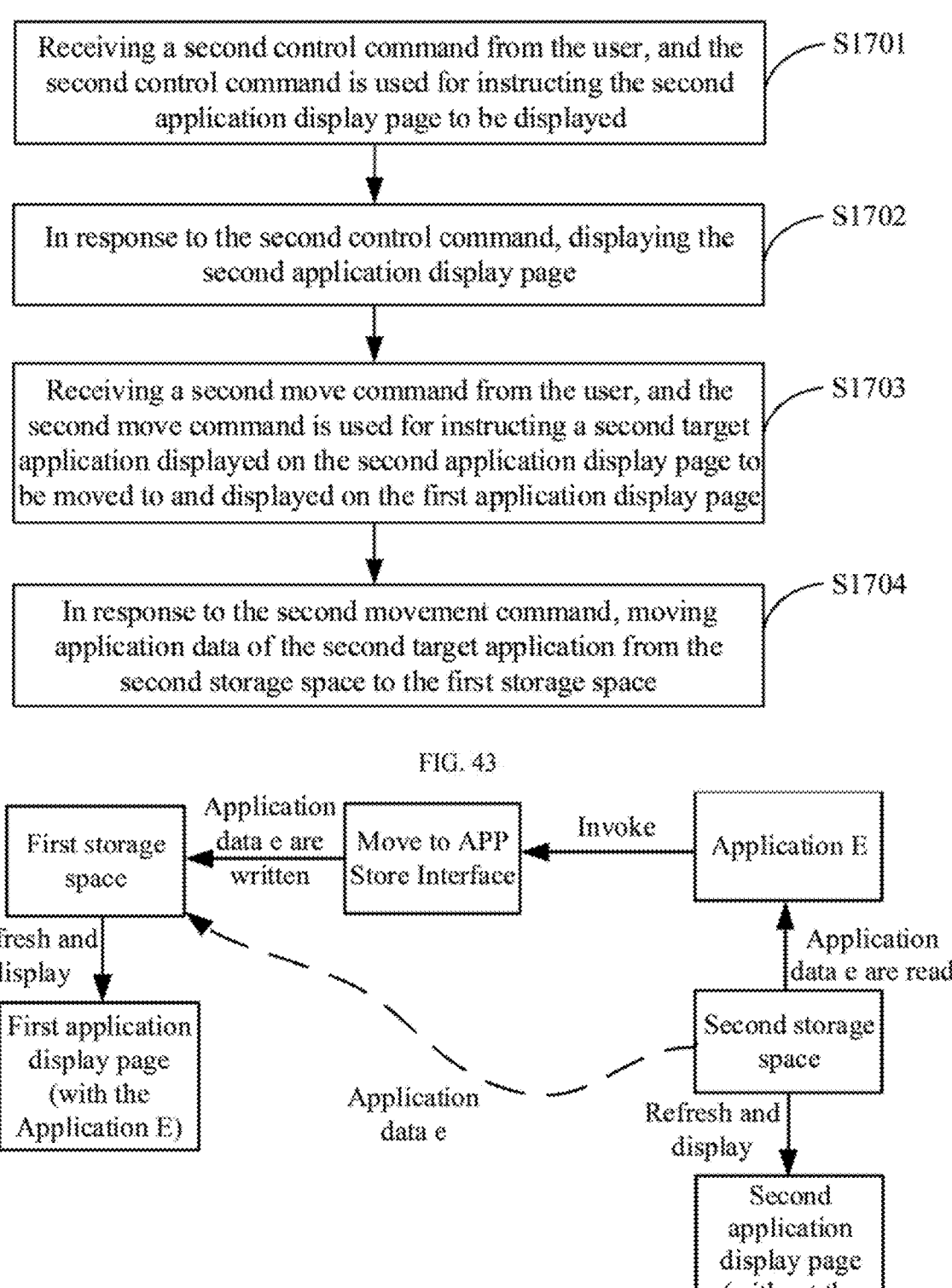

Receiving a second control command from the user, and the second control command is used for instructing the second application display page to be displayed    S1701

In response to the second control command, displaying the second application display page    S1702

Receiving a second move command from the user, and the second move command is used for instructing a second target application displayed on the second application display page to be moved to and displayed on the first application display page    S1703

In response to the second movement command, moving application data of the second target application from the second storage space to the first storage space    S1704

FIG. 43

First storage space

Application data e are written

Move to APP Store Interface

Invoke

Application E

Refresh and display

First application display page (with the Application E)

Application data e

Application data e are read

Second storage space

Refresh and display

Second application display page (without the Application E)

FIG. 44

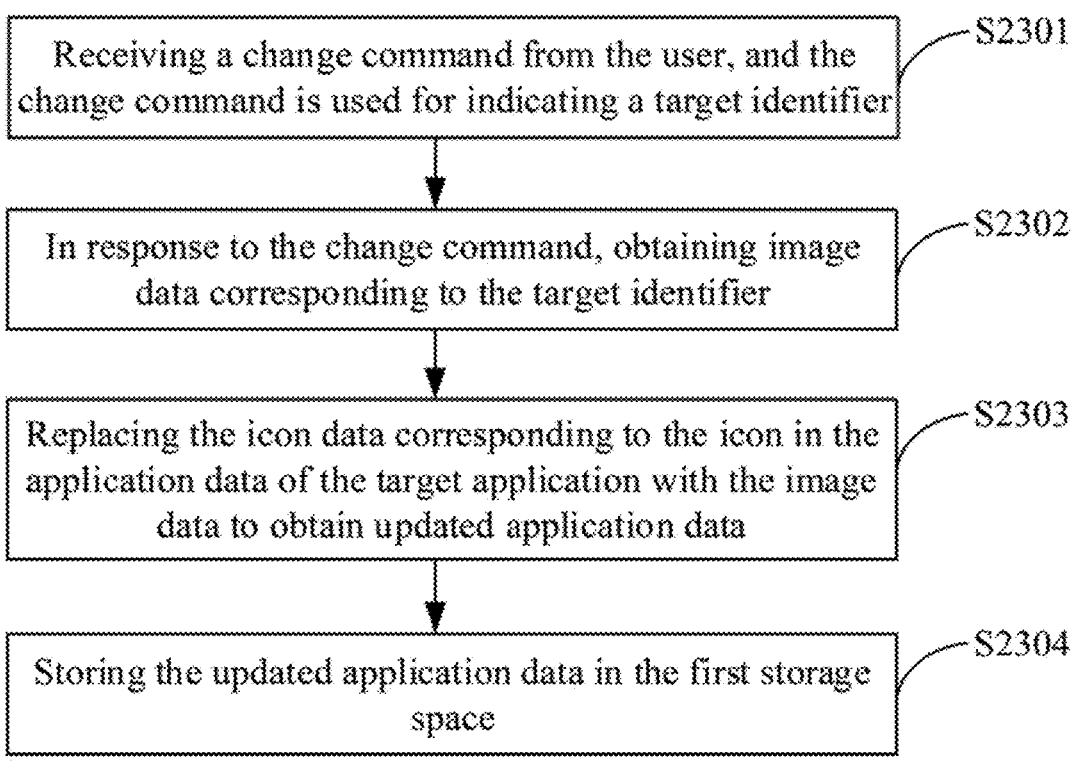

| Receiving a change command from the user, and the change command is used for indicating a target identifier | ⟋S2301 |

In response to the change command, obtaining image data corresponding to the target identifier — S2302

Replacing the icon data corresponding to the icon in the application data of the target application with the image data to obtain updated application data — S2303

Storing the updated application data in the first storage space — S2304

FIG. 49

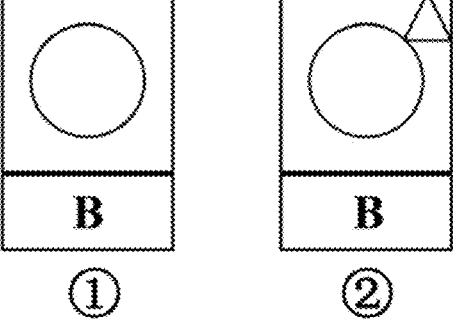

FIG. 50

DISPLAY APPARATUS AND METHOD

CROSS REFERENCE TO RELATED APPLICATIONS

This application is a continuation application of International Application No. PCT/EP2023/054968, filed on Feb. 28, 2023, which claims the priorities to Chinese Application No. 202210190115.6, filed on Feb. 28, 2022, Chinese Application No. 202210225831.3, filed on Mar. 9, 2022, and Chinese Application No. 202210747475.1, filed on Jun. 28, 2022, all of which are incorporated herein in their entities by reference.

FIELD

The disclosure relates to the field of display technology, in particular to a display apparatus and a method.

BACKGROUND

A display apparatus functions as a terminal for outputting images, and is generally implemented as a smart TV, a mobile terminal, a smart commercial screen, a projector, etc.

After the display apparatus starts, a homepage is displayed on its monitor. The display apparatus provides a variety of resource information, such as applications, functions, media data, etc. The homepage can be used for presenting application entry, various functions and media data. The media data includes, but are not limited to a text, an image, a video, a link and an application icon.

SUMMARY

Embodiments of the disclosure provide a display apparatus and a method.

According to embodiments of the disclosure, a display apparatus includes: a display configured to display an image from broadcast system or Internet, and/or, a user interface; a memory, comprising a first storage space and a second storage space, where the first storage space is configured to store application data of a first application whose icon is presented on a first application display page, and the first storage space is a default storage space for a third party application installed upon request; the second storage space is configured to store application data of a second application whose icon is presented on a second application display page different from the first application display page and the second storage space is an optional storage space for a third party application; and a controller in connection with the display and the memory. The controller is configured to: receive an install command for installing a target third party application in the display apparatus from a user; in response to the install command for installing the target third party application, store application data of the target third application in the first storage space in the display apparatus; receive a display command for displaying an icon of the target third party application on the second application display page; in response to the display command, move the application data of the target party application from the first storage space to the second storage space and display the icon of the target third party application on the second application display page.

According to embodiments of the disclosure, a method for the display apparatus includes: receiving an install command for installing a target third party application in the display apparatus from a user; where the display apparatus comprises a display and a memory, the display is configured to display an image from broadcast system or Internet, and/or, a user interface, and the memory comprises a first storage space and a second storage space; where the first storage space is configured to store application data of a first application whose icon is presented on a first application display page, and the first storage space is a default storage space for a third party application installed upon request; the second storage space is configured to store application data of a second application whose icon is presented on a second application display page different from the first application display page and the second storage space is an optional storage space for a third party application; in response to the install command for installing the target third party application, storing application data of the target third application in the first storage space in the display apparatus; receiving a display command for displaying an icon of the target third party application on the second application display page; in response to the display command, moving the application data of the target party application from the first storage space to the second storage space and display the icon of the target third party application on the second application display page.

BRIEF DESCRIPTION OF THE DRAWINGS

FIG. 6 shows a flowchart of a method for displaying a homepage according to some embodiments.

FIGS. 7A-7B show schematic diagrams for illustrating area layout on a homepage according to some embodiments.

FIG. 9 shows a flowchart of a method for displaying a third area on a homepage according to some embodiments.

FIG. 10 shows a schematic diagram of a homepage in a second state according to some embodiments.

FIG. 16 shows a flowchart of a method for updating content of an application bar according to some embodiments.

FIG. 17 shows a schematic diagram for illustrating comparison between application lists according to some embodiments.

FIG. 43 shows a flowchart of moving a third-party application in a second application display page to a first application display page for display according to some embodiments.

FIG. 44 shows a schematic diagram of data flow while an application is moved to and displayed on a first application display page according to some embodiments.

FIG. 49 shows a schematic flowchart of displaying a changed icon according to some embodiments.

FIG. 50 shows schematic diagrams of an icon before and after change according to some embodiments.

DETAILED DESCRIPTION

In order to make the purposes, embodiments and advantages of the disclosure clearer, the embodiments of the disclosure will be described clearly and completely below in combination with the accompanying drawings in embodiments of the disclosure. Obviously the described embodiments are only some but not all the embodiments.

It should be noted that the brief description of the terms in the disclosure is only for the convenience of understanding the embodiments described hereafter, and is not intended to limit the embodiments of the disclosure. Unless indicated otherwise, these terms should be understood according to the plain and ordinary meanings.

Figure 1:
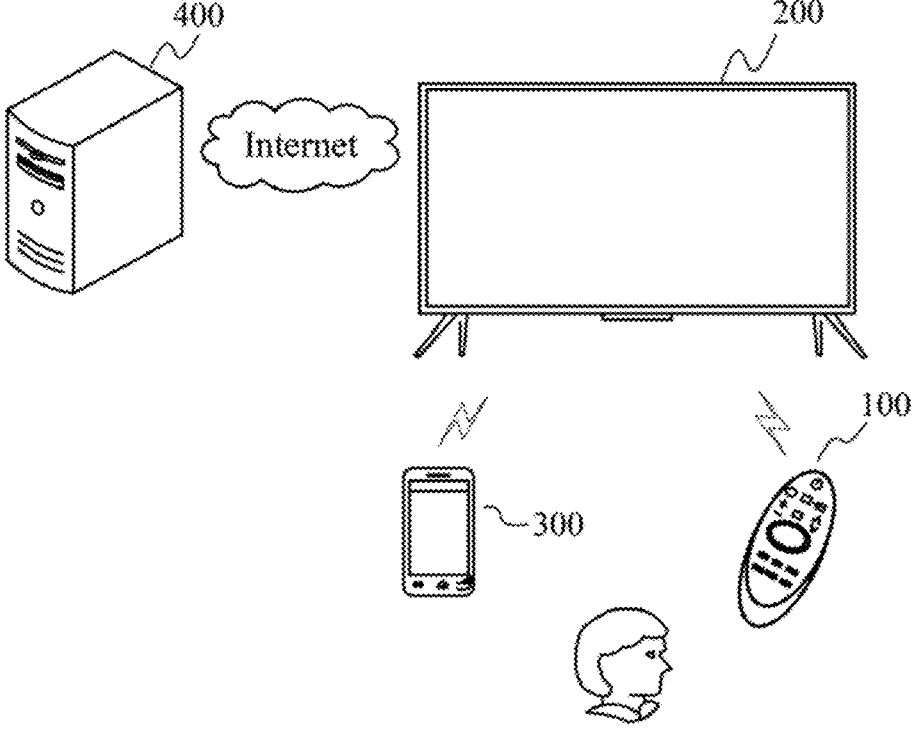
FIG. 1 shows a schematic diagram of an operation scenario between a display apparatus 200 and a control device according to some embodiments.
Figure 2:
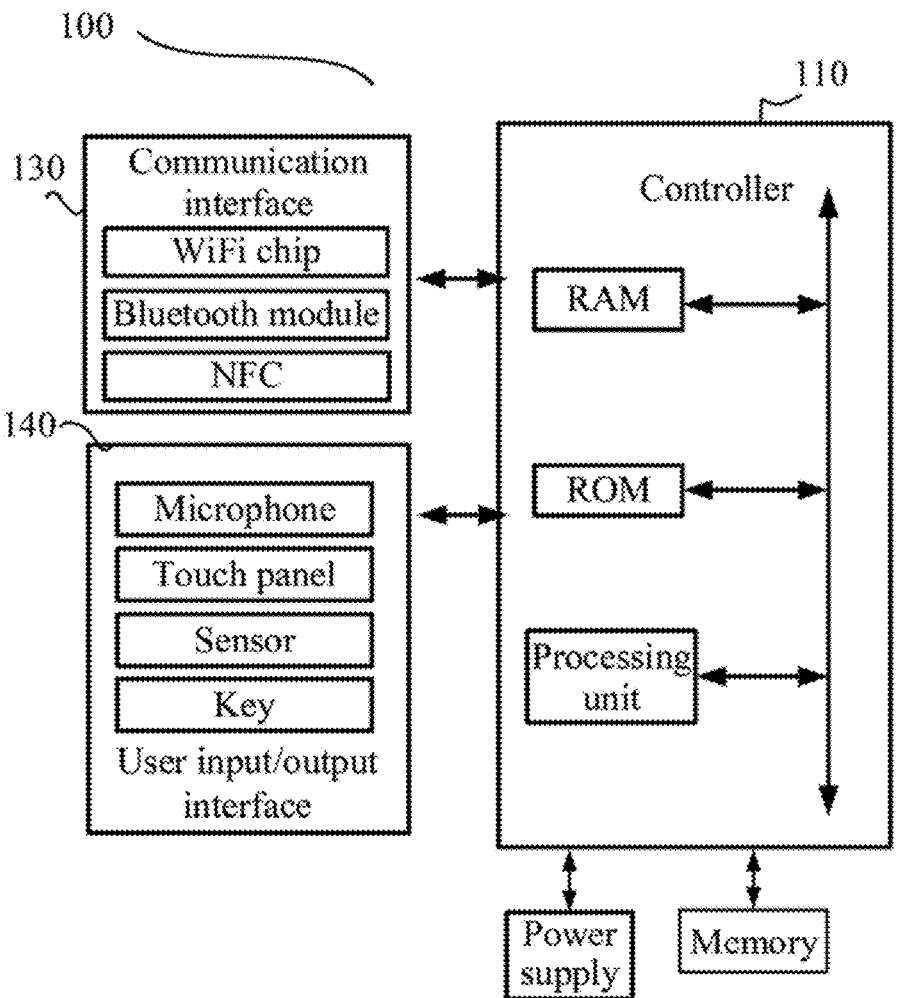
FIG. 2 shows a block diagram of a hardware configuration of the control device according to some embodiments.

A display apparatus according to the disclosure may be, for example, a TV, a smart TV, a computer, a laser projection device, a monitor, an electronic bulletin board, an electronic table, etc. FIGS. 1 and 2 are shown as an example form of the display apparatus 200 of the disclosure.

FIG. 1 illustrates a schematic diagram of an operating scenario between a display apparatus and a control device in an embodiment. As shown in FIG. 1, a user can operate a display apparatus 200 through a control device 100 or a smart terminal 300.

In some embodiments, the control device 100 can be a remote control, and can communicate with the display apparatus 200 through infrared protocol communication, Bluetooth protocol communication, or other short-distance communication methods, to control the display apparatus 200 through wireless or other wired methods. A user can input user commands through keys, voice input and control panel input on the remote control, to control the display apparatus 200.

In some embodiments, a smart terminal 300 (such as a mobile terminal, a tablet computer, a computer, a laptop computer, etc.) may be used to control the display apparatus 200 via, for example, an application running on the smart terminal.

In some embodiments, the command for controlling the display apparatus may not be received via the above-mentioned smart terminal or control device, but based on user' touch or gesture.

In some embodiments, the display apparatus 200 may also be controlled in a manner other than the control device 100 and the smart terminal 300. For example, the user's voice command may be directly received by a module for acquiring voice commands configured inside the display apparatus 200, or the user's voice command may be received by a voice control device provided outside the display apparatus 200.

In some embodiments, the display apparatus 200 also communicates data with the server 400. The display apparatus 200 may be allowed to perform the communication and connection through a Local Area Network (LAN), a Wireless Local Area Network (WLAN), and other networks.

FIG. 2 shows a block diagram of the hardware configuration of the display apparatus 200 according to some embodiments. As shown in FIG. 2, the control device 100 includes a controller 110, a communication interface 130, a user input/output interface 140, a power supply and a memory. The control device 100 may receive a command input from a user, and convert the command into a recognizable instruction to which the display apparatus 200 may respond, so as to serve as an intermediary for interaction between the user and the display apparatus 200.

Figure 3:
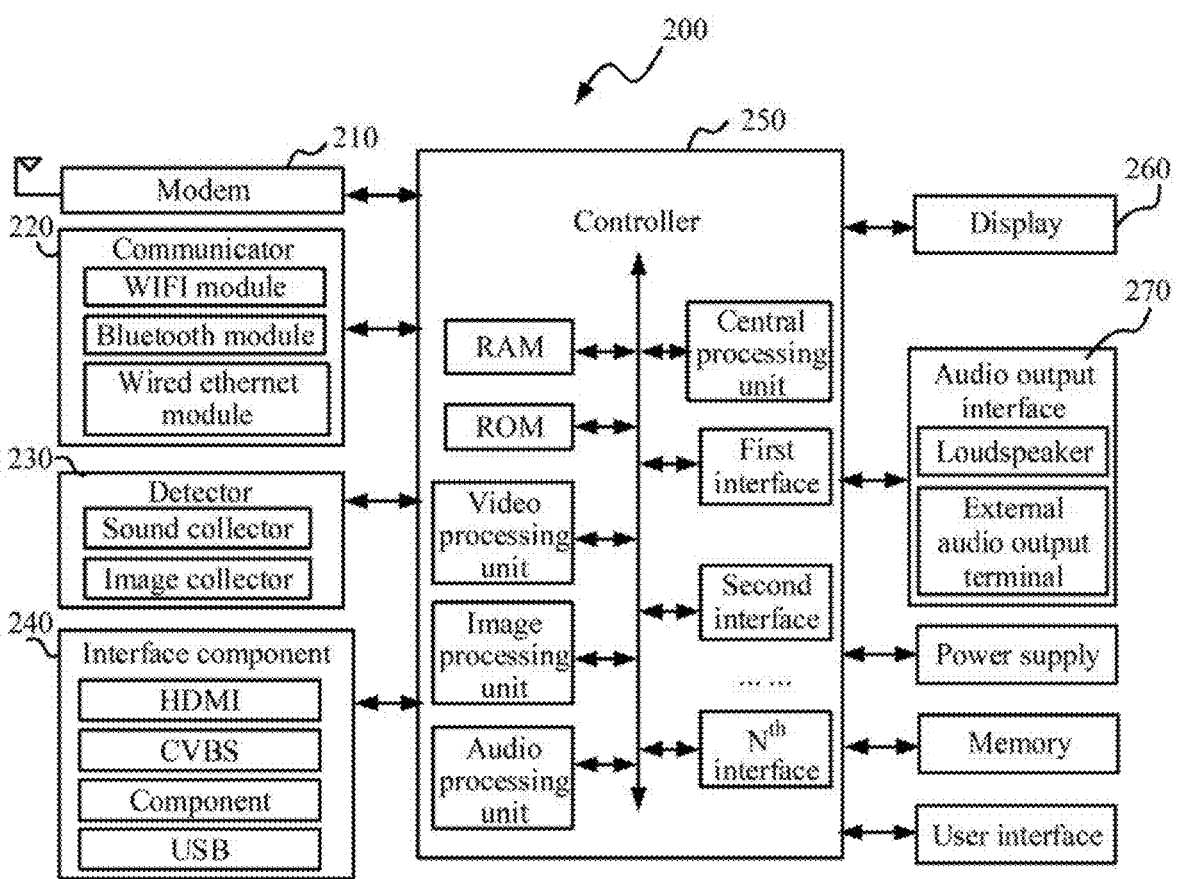
FIG. 3 shows a block diagram of a hardware configuration of the display apparatus according to some embodiments.

FIG. 3 shows a block diagram of hardware configuration of a display apparatus 200 according to some embodiments. As shown in FIG. 3, the display apparatus 200 includes at least one of a modem 210, a communicator 220, a detector 230, an interface component 240, a controller 250, a display 260, an audio output interface 270, a memory, a power supply, and a user input interface.

In some embodiments, the controller includes a processor, a video processor, an audio processor, a graphics processor, an RAM, an ROM, first to $n^{th}$ interfaces for input/output.

The display 260 includes: a panel component for presenting an image, a driver component for driving the image display, a component for receiving an image signal output from the controller to display the video content and image content as well as a menu control interface, and a UI interface for user's control operations, etc.

The display 260 may be a liquid crystal display, an OLED display or a projection display, and may also be a projection device and a projection screen.

In some embodiments, the communicator 220 is a component in communication with an external device or an external server according to various types of communication protocols. For example, the communicator may include at least one of a Wifi module, a Bluetooth module, a wired Ethernet module, other network communication protocol chip or near-field communication protocol chip, and an infrared receiver. The display apparatus 200 may establish sending and receiving of control signals and data signals with the control device 100 or the server 400 through the communicator 220.

The user input interface may be used to receive a control signal from the control device 100 (e.g., an infrared remote control, etc.).

The interface component 240 may include, but is not limited to, any one or more of a High-Definition Multimedia Interface (HDMI), an analog or data high-definition component input interface (Component), a Composite Video Broadcast Signal (CVBS) input interface, a USB input interface (USB), an RGB port. The external device interface 240 may also be a composite input/output interface formed of a plurality of interfaces described above.

The modem 210 is configured to receive the broadcast television signals by a wired or wireless receiving method, and demodulates audio and video signals, such as EPG data signals, from a plurality of wireless or wired broadcast television signals.

n some embodiments, the controller 250 and the modem 210 may be located in separate devices, that is, the modem 210 may also be located in an external device (such as an external set-top box, etc.) of the main device where the controller 250 is located.

The controller 250 controls the operations of the display apparatus and responds to the user's operations through various software applications stored in the memory. The controller 250 controls the overall operation of the display apparatus 200. For example, in response to receiving a user command for selecting a UI object displayed on the display 275, the controller 250 may perform the operations related to the object selected by the user command.

In some embodiments, the controller includes at least one of a Central Processing Unit (CPU), a video processor, an audio processor, a Graphics Processing Unit (GPU), an RAM (Random Access Memory), an ROM (Read-Only Memory), first to $n^{th}$ interfaces for input/output, a communication bus (Bus), etc.

The user may input a user command on the Graphical User Interface (GUI) displayed on the display 260, and the user input interface receives the user input command through the Graphical User Interface (GUI). Alternatively, the user may input a user command by inputting a particular sound or gesture, and the user input interface recognizes the sound or gesture through the sensor to receive the user input command.

Figure 4:
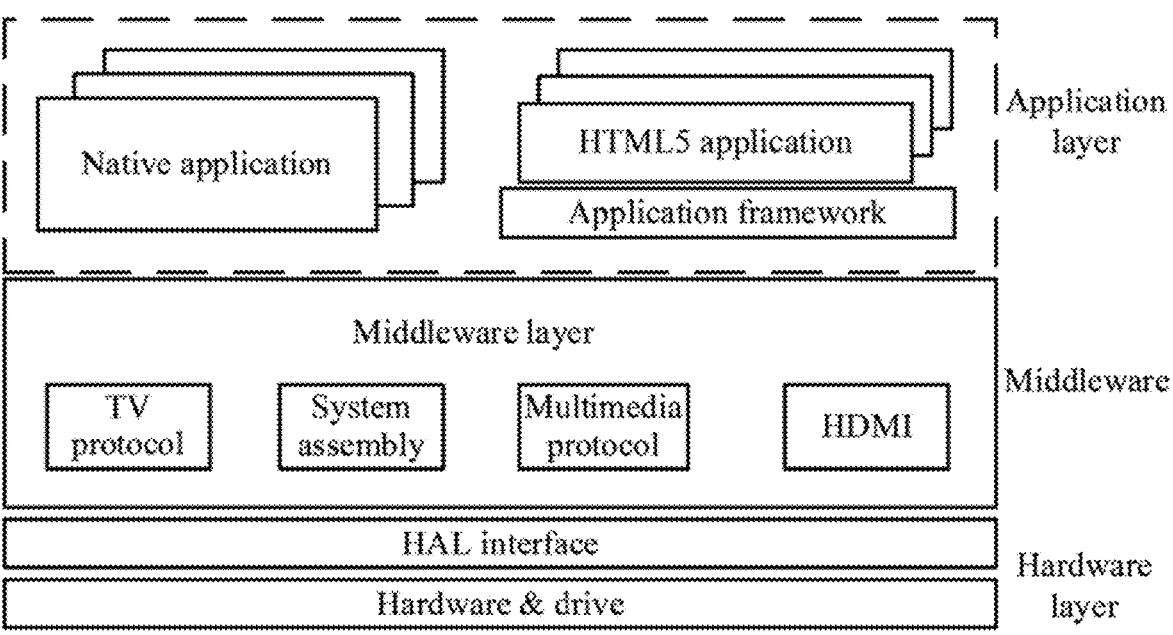
FIG. 4 shows a schematic diagram of a software configuration of the display apparatus according to some embodiments.

FIG. 4 shows a diagram of software configuration of a display apparatus 200 according to some embodiments. As shown in FIG. 4, a system of a display apparatus 200 is divided into three layers, that is, an application layer, a middleware layer and a hardware layer from top to bottom.

The application layer mainly includes general applications on a TV and an application framework. General applications are mainly applications developed based on a browser, such as HTML5 APPs and native APPs.

The middleware layer includes services related to various TV protocols, multimedia protocols and middleware such as system components. The middleware may use basic services (functions) provided by the system software to connect various parts or different applications of an application system on a network, to realize sharing of resources and functions.

The hardware layer mainly includes a hardware abstraction layer (HAL) interface, hardware and drivers. The HAL interface functions as a unified interface for docking of all TV chips, and specific logics are implemented by various chips. The drivers mainly include an audio driver, a display driver, a Bluetooth driver, a camera driver, a WIFI driver, a USB driver, an HDMI driver, a sensor driver (such as a fingerprint sensor, a temperature sensor and a pressure sensor), a power driver, etc.

In some embodiments, a homepage of the display apparatus 200 shows resource information such as entry of applications, various functions and media data provided by the display apparatus 200. The media data include a text, an image, a video, a link, an application icon, etc.

First screen content refers to content first viewed by the user without any operation after the display apparatus 200 displays the homepage. If the user views other content of the homepage by scrolling the homepage, the content is referred to as N$^{th}$-screen content.

Some embodiments of the disclosure provide a display apparatus 200, a plurality of areas are displayed on the homepage, and different types of resource information are displayed in different areas.

In some embodiments, a first area may be a carousel bar. The carousel bar may be used for displaying media data in the form of a plurality of images, videos, etc., and the media data are switched and displayed according to a certain frequency. The carousel bar may be used for displaying many types of resource information, such as promotional information, an advertisement, a TV drama, a variety show, etc.

A second area may include an application bar. The application bar may be used for displaying an application list, and the application list includes, but is not limited to, a built in application of the system, an application published by the platform and an application of custom installation by the user.

A third area may include a bar for application preview. The bar for application preview has a strong correlation with the application bar, and the bar for application preview is used to show media data provided by a specified application in the application bar. For example, a video application A is displayed in the application bar, and in response to a selection of the video application A, media data such as current popular movies and TV series in the video application A are displayed in the bar for application preview.

In some embodiments, the homepage further includes a navigation bar and a fourth area. The navigation bar is used to provide shortcut functions, such as showing a search button, a setting button, time, and a network status. The fourth area may be in a waterfall pattern, and is used to show other types of resource information provided by the display apparatus 200. For the content shown in the waterfall flow layout, scrollable display of objects can be realized through a continuous pull-down operation on the homepage, without using a button for page turning for content load.

In some embodiments, in order to provide the user with various resource information simultaneously, the first area, the second area and the third area may be all displayed on the first screen on the homepage. In some embodiments, the three areas may be shown in an order of the first area, the second area and the third area, or in an order of the first area, the third area and the second area, or in other orders, which is not limited in the disclosure.

Since the carousel bar may be able to display more resource information, in order to cause the user to focus on a carousel area during the user viewing the homepage for latest movies and applications, a display space of the carousel bar may be enlarged. In a case of the three areas are shown in the order of the first area, the third area and the second area, if there is a relatively large area, part or all of content in the second area located relatively below may not be displayed within a visible range of the first screen, which is not helpful for the display of resource information.

Figure 5:
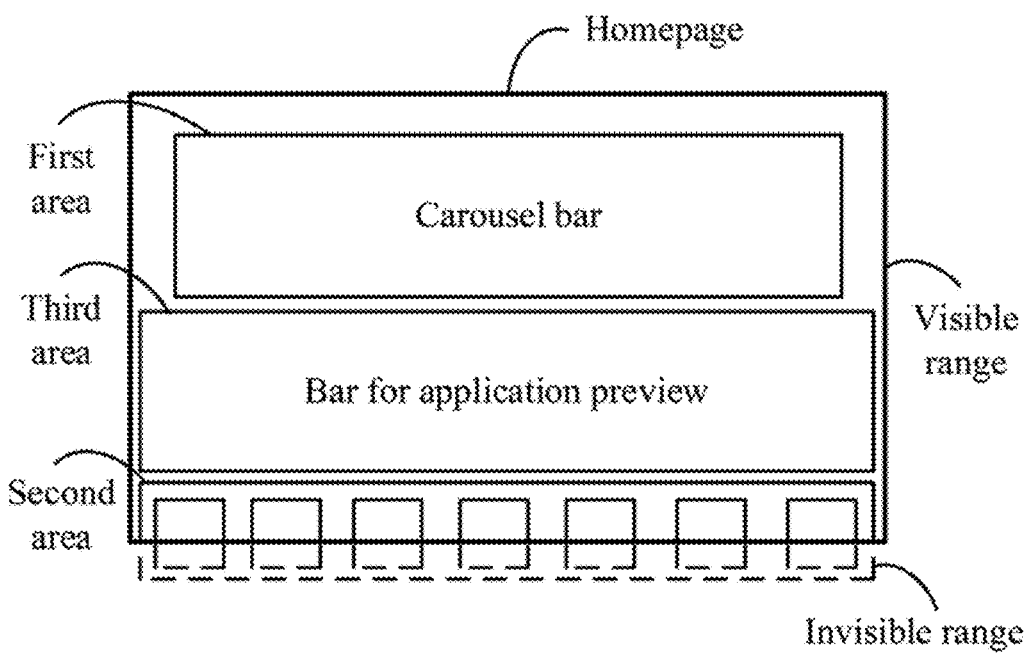
FIG. 5 shows a schematic diagram of a homepage according to some embodiments.

FIG. 5 shows a schematic diagram of a homepage according to some embodiments. As shown in FIG. 5, a carousel bar, a bar for application preview and an application bar are displayed on a first screen on the homepage in that order. Since the carousel bar takes up a large space, part of content of the application bar is out of a visible range of the first screen, that is, the content of the application bar may not be fully displayed on the first screen.

In order to ensure a display effect of the homepage, a display apparatus 200 according to some embodiments of the disclosure displays the carousel bar, the application bar, the bar for application preview, etc. on the homepage. In a limited display space of the first screen of the homepage, the bar for application preview is displayed in a dynamic mode. When a popular media element in the application bar is desired for view, the bar for application preview may be called up to be displayed. In this way, more types of resource information may be displayed on the same screen, and the display effect of the homepage may be improved.

FIG. 6 shows a flowchart of a method for displaying a homepage according to some embodiments. A display apparatus 200 according to some embodiments of the disclosure includes a display 260 configured to display an image from a broadcast system or Internet, and/or, a user interface, and a controller 250 connected with the display 260. While performing a method for displaying a homepage shown in FIG. 6, the controller 250 is configured to perform a process as follows.

S1, in response to a startup instruction of the display apparatus, controlling the display to present a homepage on the display of the display apparatus.

The homepage includes at least one of a first area and a second area, where the first area is used for displaying a first type of resource information and the second area is used for displaying a second type of resource information.

In order to enrich the resource information displayed on the homepage, the homepage is divided into a plurality of areas, and each area is used to display a corresponding type of resource information. For example, the homepage includes a first area including a navigation bar and a carousel bar, a third area including a bar for application preview, a second area including an application bar, a fourth area in a waterfall flow layout, etc.

In order to achieve dynamic display and hiding of the bar for application preview, the display apparatus 200 sets a display attribute of an element of each area on the homepage as a block, that is, each area is displayed as a block-level element. Each block-level element may have line breaks before and after same, and the respective elements are positioned relatively.

Figure 7B:
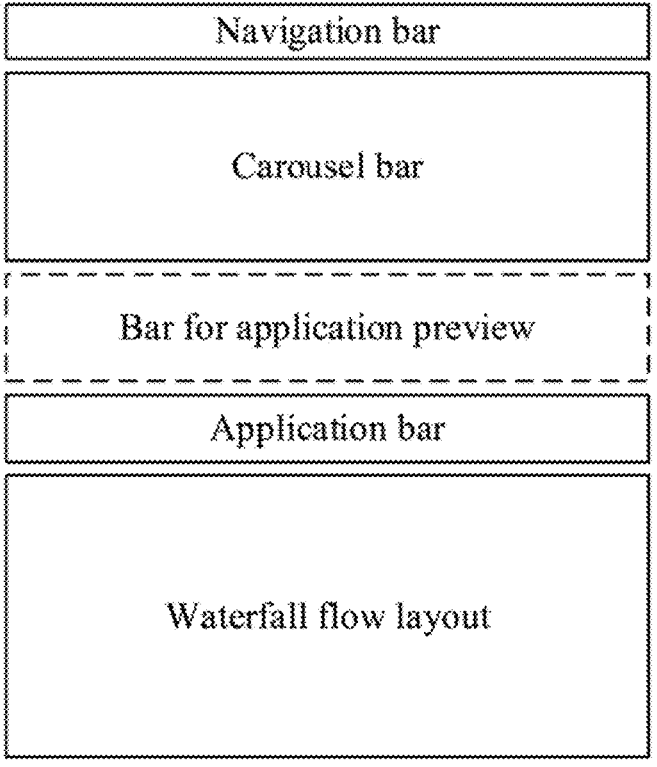

FIG. 7 shows schematic diagrams of area layout on a homepage according to some embodiments. With reference to FIG. 7A, a user starts a display apparatus 200, and the display 260 powers up and presents the homepage. In a first state, a bar for application preview is hidden, and a navigation bar, a carousel bar, an application bar and an area in a waterfall flow layout are displayed on the homepage in turn. With reference to FIG. 7B, in a second state, the bar for application preview is displayed at a side of the application bar. In a scenario where the bar for application preview needs to be displayed between the carousel bar and the application bar, the display apparatus 200 controls the application bar and the area in the waterfall flow layout in combination to move down, or controls the navigation bar and the carousel bar in combination to move up. Interfaces shown in FIGS. 7A and 7B may be switched according to a command from a user. In some embodiments, in a scenario where the second state is switched to the first state, the bar for application preview is hidden, and the application bar may automatically move up to be displayed below the carousel bar.

In order to dynamically display and hide the bar for application preview, while the display apparatus 200 displays the homepage, a focus is set to be on the carousel bar by default. In addition, a display attribute of the bar for application preview is set as none, such that the bar for application preview may be hidden when first entering the homepage.

Figure 8:
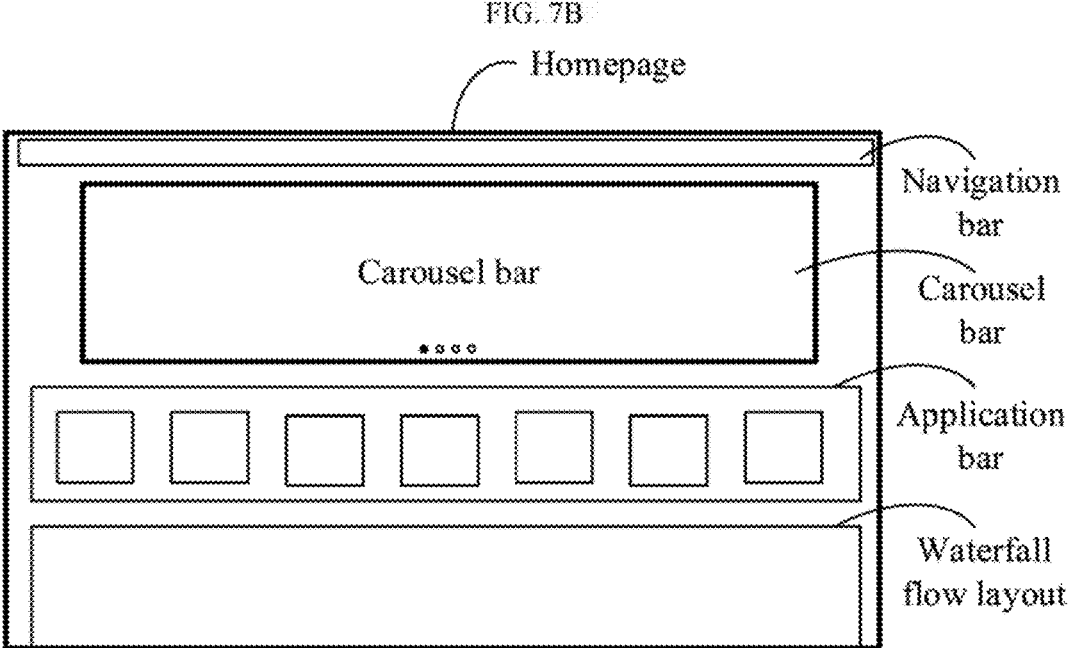
FIG. 8 shows a schematic diagram of a homepage in a first state according to some embodiments.

FIG. 8 shows a schematic diagram of a homepage in a first state according to some embodiments. With reference to FIG. 8, while the homepage is displayed in a display 260, a carousel bar is located above an application bar, and in the first state, the carousel bar and the application bar are adjacent to each other. The first state refers to an initial state in which the display apparatus 200 displays the homepage without any operation from the user.

It should be noted that a focus in the disclosure may not be located on the carousel bar by default. As for relative positions of the carousel bar and the application bar, the application bar may be located above the carousel bar, or the application bar and the carousel bar are located in left and right respectively, or the carousel bar and the application bar may not be adjacent to each other. Based on this, other areas on the homepage may not use the layouts shown in FIGS. 7A, 7B and 8. The disclosure merely takes the layouts shown in FIGS. 7A, 7B and 8 as an example, which does not constitute limitation to the disclosure.

S2, in response to the focus landing on the second area, displaying the third area on the homepage, and the third area is adjacent to the second area in position.

The third area is used for displaying resource information associated with the second type of resource information. The bar for application preview has a strong correlation with the application bar. When the second area is the application bar, the third area including the bar for application preview is used to display the media data provided by a specified application in the application bar.

In some embodiments, a method to cause focus movement may include selecting a direction key on a remote controller, a user gesture or other terminal devices. For example, the focus movement is triggered by selecting a direction key on the remote controller. The user presses the remote controller to send a key signal to control scrolling of the homepage, and the display apparatus 200 starts focus movement once after receiving the key signal.

In order to view other content of the homepage, the homepage scrolls to load display content by scrolling a screen via moving the focus on the homepage. That is, in such a display mode, the content of the homepage is displayed on one screen after another per screen. For example, the focus may be moved from a top of each screen of the homepage to a bottom of the screen, that is, the focus may pass through all areas in each screen to cause the homepage to scroll and perform display per screen, thus loading non-displayed content.

Alternatively, the homepage may scroll to load the display content by a method of causing the screen to scroll while keeping the focus fixed relative to the screen. In this case, a first screen is not distinguished from other screens, and the homepage is driven to scroll and perform display continuously. For example, after the focus moves from a top of the first screen to a middle of the first screen, the focus is caused to move by pressing the direction key on the remote controller again, the focus remains fixed relative to the screen, while the homepage scrolls, and the non-displayed content is continuously loaded. In this process, the focus is always in the middle relative to the screen. When content originally located on a last screen on the homepage is to be loaded, the focus may be moved from the middle to a bottom of a current screen, such that content located at the bottom may be selected.

The two methods for display content loading through scrolling of the homepage above may be set according to habits of the user. There are other methods for display content loading through scrolling of the homepage, and will not be discussed in detail in the disclosure. In the disclosure, description is performed by taking the method for display content loading through scrolling of the homepage by keeping the focus fixed relative to the screen and causing the screen to scroll and perform display continuously as an example.

Since the bar for application preview has a high correlation with the application bar, for dynamic display of the bar for application preview, the bar for application preview is displayed on the homepage in response to the focus landing on the application bar. The bar for application preview is adjacent to the application bar, such that when the user selects an application from the application bar, media data provided by the application may be viewed synchronously in the bar for application preview in time.

FIG. 9 shows a flowchart of a method for displaying a third area on a homepage according to some embodiments. In some embodiments, with reference to FIG. 9, the controller 250 for displaying the third area on the homepage in response to a focus landing on a second area is further configured to cause the display apparatus to perform a process as follows.

S21, while the focus lands on a first area, in response to a first control instruction, controlling the homepage to move up to move the focus from the first area to the second area.

S22, in response to the focus landing on the second area, displaying the third area between the first area and the second area.

The first control instruction may be a key event or signal generated by selecting a direction key on a remote controller, or a control instruction based on gesture. Herein, description is performed by taking the first control instruction being the key signal generated by selecting the direction key on the remote controller as an example.

FIG. 10 shows a schematic diagram of a homepage in a second state according to some embodiments. With reference to FIG. 10 (*a*), the focus landing on a carousel bar by default, and the carousel bar being located above and adjacent to the application bar is taken as an example. If a user wants to view content located below the carousel bar, a down directional key on a remote controller is selected. The display apparatus 200 controls the homepage to move up once in response to a key signal associated with the down directional key selected by the user.

With reference to FIG. 10 (*b*), the focus moves down from the carousel bar to the application bar. The display apparatus 200 displays a bar for application preview between the carousel bar and the application bar in response to the focus landing on the application bar, and the homepage is in the second state. In this process, the display apparatus 200 sets a display attribute of the bar for application preview as a block, so as to display the bar for application preview in the second state.

The second state refers to a state in which the user operates the homepage at least once and displays the bar for application preview at a side of the application bar. The bar for application preview is adjacent to the application bar, and the bar for application preview may be located above the application bar (that is, between the carousel bar and the application bar), below the application bar, or at other positions adjacent to the application bar.

In some embodiments, the controller 250 for displaying a third area between a first area and a second area is further configured to cause the display apparatus to perform a process as follows.

Step 221, in response to a first control instruction, controlling the first area to move up by a preset distance, and controlling the second area to move up by a first distance corresponding to the first control instruction.

Step 222, generating an idle area between the first area and the second area, and displaying the third area in the idle area.

In order to conveniently display the bar for application preview between the carousel bar and the application bar, when the display apparatus 200 controls the homepage to move up, movement distances of the application bar and the carousel bar in the homepage are unequal. The display apparatus 200 controls the application bar and the homepage both to move up by the first distance corresponding to the first control instruction, and controls the carousel bar to move up by a preset distance greater than the first distance.

The preset distance is greater than the first distance, and the preset distance is related to a height of the third area. In some embodiments, the preset distance may be equal to the first distance plus the height of the bar for application preview. That is, after moving up by the first distance along with the homepage, the carousel bar has to move further by the preset distance. In this way, after one movement, the idle area is generated between the carousel bar and the application bar. The idle area has a height equal to the height of the bar for application preview, so that the bar for application preview may be then displayed in the idle area perfectly.

In some embodiments, the bar for application preview may fade in with an animation effect. Duration of a fade-in animation of the bar for application preview may be set to 100 ms, or other time.

In some embodiments, after the carousel bar is moved up once, the carousel bar may disappear from a visible range of the display 260, or merely part of content may be displayed in the visible range of the display 260. In this process, the controller 250 is further configured to cause the display apparatus to perform a process as follows.

Step 231, obtaining a second distance between a top edge of the second area and a top edge of the visible range of the display after movement by the first distance.

Step 232, in response to the height of the third area being greater than or equal to the second distance, moving the first area out of the visible range along a direction from bottom to top of the visible range.

Step 233, in response to the height of the third area being less than the second distance, moving a top of the first area out of the visible range and displaying a bottom of the first area in the visible range.

After one movement, a display state of the carousel bar is determined based on a size comparison result between a distance between a top edge of the application bar and the top edge of the visible range, and the height of the bar for application preview.

Figure 11:
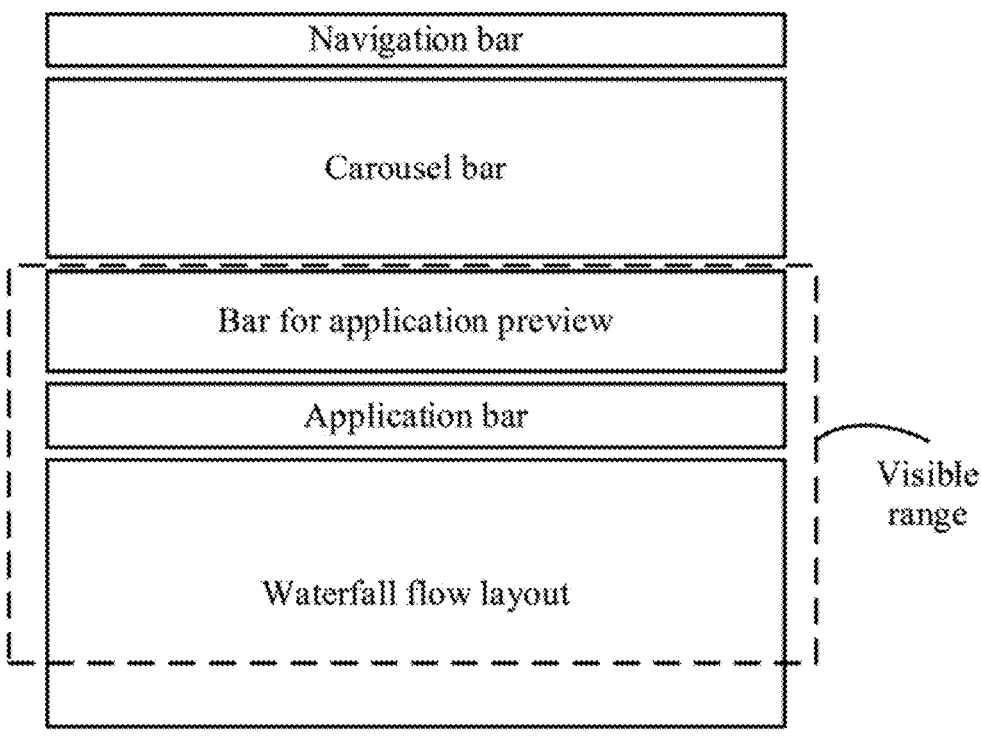
FIG. 11 shows a schematic diagram of displaying a state of a carousel bar on a homepage according to some embodiments.

FIG. 11 shows a schematic diagram of displaying a state of a carousel bar on a homepage according to some embodiments. With reference to FIG. 11, if a height of a bar for application preview is greater than or equal to a second distance, it means that a top edge of the bar for application preview is close to or attached to a top edge of a visible range, then in a case that the bar for application preview is displayed between the carousel bar and an application bar, the carousel bar is moved out of the visible range along a direction from bottom to top of the visible range and disappears from the visible range.

Figure 12:
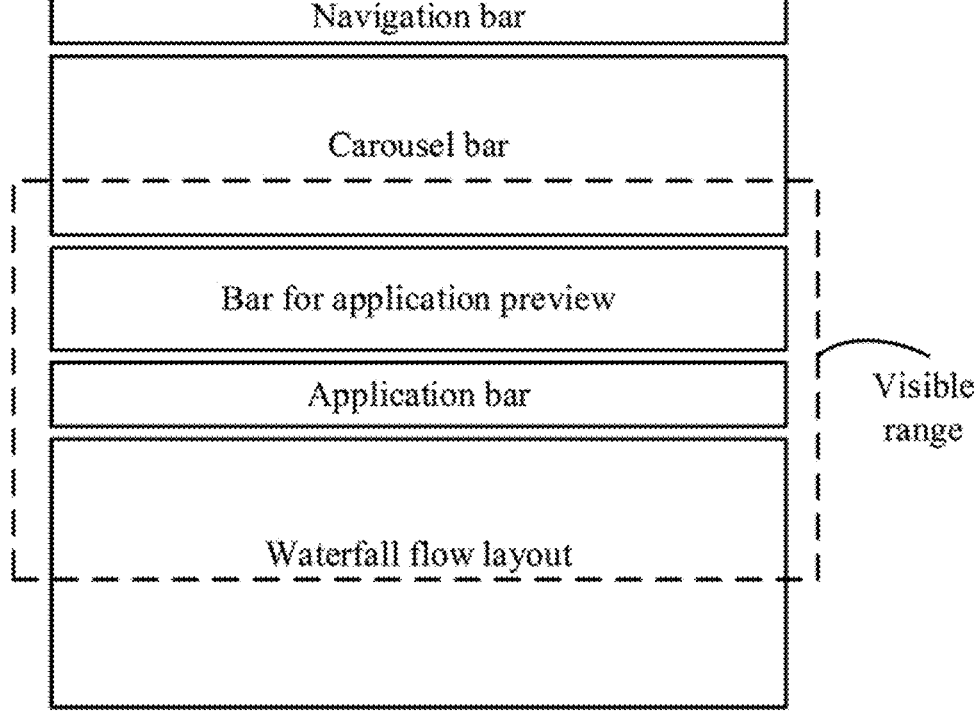
FIG. 12 shows a schematic diagram of displaying another state of a carousel bar on a homepage according to some embodiments.

FIG. 12 shows a schematic diagram of displaying another state of a carousel bar on a homepage according to some embodiments. With reference to FIG. 12, if a height of a bar for application preview is less than a second distance, it means that a top edge of the bar for application preview is separated from a top edge of a visible range by a certain distance, then in a case that the bar for application preview is displayed between the carousel bar and an application bar, a top of the carousel bar is moved out of the visible range, and a bottom of the carousel bar maintains in the visible range.

It should be noted that if a navigation bar is displayed above the carousel bar, the navigation bar may also move out of the visible range along the direction from bottom to top of the visible range and disappear from the visible range after the homepage moves up once. In addition, there are other methods to determine whether the carousel bar moves out of the visible range, and related description will omit herein.

In some embodiments, in order to ensure smooth display of the homepage during move or scroll and inform an association between the bar for application preview and the application bar, while the display apparatus 200 controls the homepage to move up as a whole in response to selection of a down directional key on a remote controller, different animation effects may be used for movement. The controller 250 is further configured to cause the display apparatus to perform steps as follows.

Step 241, in response to a first control instruction, starting a first animation to steadily move the homepage up.

Step 242, during the first animation, starting a second animation. For example, moving a second area down by a preset offset, and setting a transparency of the second area to a first transparency; then moving the second area up by a first distance, and setting the transparency of the second area as a second transparency, where the first transparency is greater than the second transparency.

The first animation acts on the homepage. In some embodiments, the first animation may be a movement animation along a vertical direction, and the first animation may produce an effect of smooth movement of the homepage. A first duration of the movement animation may be 250 ms. In response to a selection of the down directional key on the remote controller, the display apparatus 200 moves a focus down and causes the homepage move upward as a whole. When the focus lands on the application bar, a movement animation along the vertical direction with duration of 250 ms is started, so as to make position changing of the homepage smooth and achieve the effect of smooth movement of the content on the homepage. In some embodiments, the first animation may also be other animations, and the first duration may also be set as other time.

The second animation acts on the application bar. In some embodiments, the second animation may be an animation that fades in vertically downward to a certain point and then vertically upward from this certain point. A second duration of the second animation may be 250 ms. In some embodiments, the second animation may also be other animations, and the second duration may also be set as other time. A start moment of the second animation may be the same as or later than a start moment of the first animation.

While the display apparatus 200 controls the homepage as a whole to move up, taking the start moment of the second animation being later than the start moment of the first animation as an example, when the first animation has been performed for 150 ms, the display apparatus 200 starts a downward movement by a preset offset of 200% for the application bar, and sets the transparency of the downward-moving application bar to the first transparency, so as to achieve a vertically-down animation effect. After finishing the downward movement, the display apparatus 200 starts a vertically-up animation for the application bar in a fade-in mode, and sets the transparency of the up-moving application bar to the second transparency. The second transparency is less than the first transparency, so as to achieve a gradually vertically-up fade-in animation effect.

Here, the preset offset refers to a ratio of a preset movement distance to the height of the application bar. The preset offset may also be set to different values, such as 150% and 230%. The first transparency may be 100% and the second transparency may be 0%. The greater the transparency is, the more transparent an image is, and the smaller the transparency is, the clearer the image is.

In some embodiments, while the display apparatus 200 moves the homepage up, due to the first animation, the homepage content can be present smoothly without sudden content change, which may cause eye discomfort for viewers. Owing to the second animation, the application bar moves smoothly from down to up and gradually fades in, the content on the homepage are displayed gradually and smoothly without abrupt or expected content change, which may cause eye discomfort for viewers. During the up movement, the application bar and the bar for application preview are configured with animations, and may inform the viewers that the application bar and the bar for application preview are related.

While the homepage moves up, the display apparatus 200 may also configure a fade-out animation for the carousel bar. After the homepage moves up, an idle area is generated between the carousel bar and the application bar, and the display apparatus 200 starts a 100 ms fade-in animation for the bar for application preview, and displays the bar for application preview above the application bar.

A start moment of the fade-in animation of the bar for application preview may be later than the end of the second animation of the application bar, at the same moment as the start moment of the second animation, or during the second animation. If the start moment of the fade-in animation of the bar for application preview is later than the end of the second animation of the application bar, the fade-in animation of the bar for application preview is started 400 ms following a moment when the user presses the down directional key on the remote controller (that is, the focus lands on the application bar). Herein, 400 ms is the sum of 150 ms of part of the first animation that has been finished and 250 ms of duration of the second animation.

In some embodiments, when the second area is an application bar and the application bar displays an application list, in order to facilitate display of application icons in the display application list, the second area includes a couple of option areas, and the option area is used for displaying different types of information in a second type of resource information. One type of information corresponds to one application, that is, the option area is used to display different application icons.

After the focus moves down once, the focus lands on the second area, and specifically lands on a first option area in the second area. In order to indicate a current position of the focus, the controller 250 is further configured to cause the display apparatus to perform a process as follows: in response to the focus landing on the first option area, stating a third animation, zooming in the first option area, and displaying the first option area in a zoom-in state. The first option area is an option area in a first position in the application bar, and the third animation may be a zoom-in animation.

Figure 13:
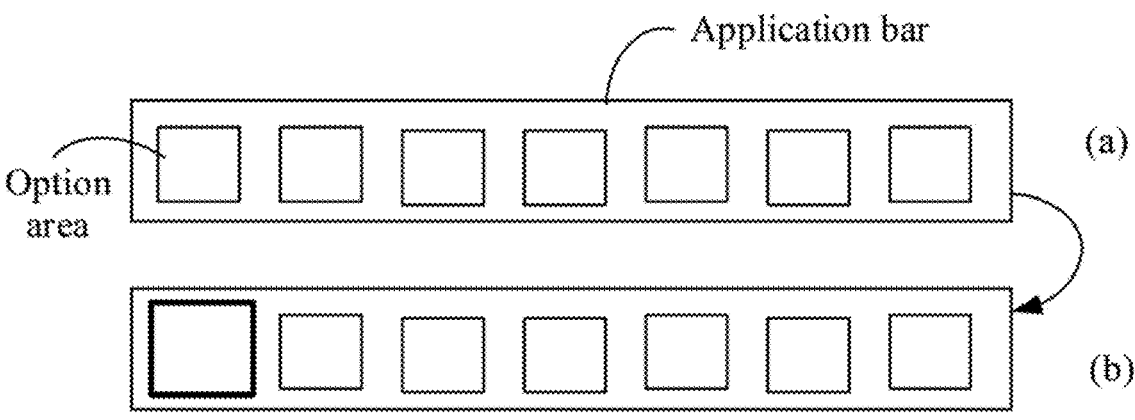
FIG. 13 shows a schematic diagram for illustrating change of an application bar according to some embodiments.

FIG. 13 shows a schematic change diagram of an application bar according to some embodiments. As shown in FIG. 13 (*a*), option areas in the application bar have the same size before causing a homepage to move. As shown in FIG. 13 (*b*), after a second animation of an application bar ends, a display apparatus 200 starts a zoom-in animation for a first option area and displays the first option area in a zoom-in mode, such that a current position of a focus is presented for better human-machine interaction.

A start moment of the zoom-in animation is later than the end of the second animation. If the zoom-in animation is started when a down directional key is selected by the user, the user may not see a zoom-in process of the first option area because the first animation of the homepage is in progress, which may not locate the position of the focus.

In some embodiments, after the user moves the focus to the application bar by selecting a direction key on the remote controller, a bar for application preview may be displayed at a side of the application bar, and corresponding animations are configured for the homepage, a carousel bar, the application bar and the bar for application preview respectively, such that a smooth movement of the homepage is realized, but also an association between the application bar and the bar for application preview is presented or indicated, which allows for better human-machine interaction.

S3, in response to the focus landing on a first area, removing a third area from the homepage.

After the focus lands on the application bar and the bar for application preview is displayed at a side of the application bar, the user selects the down directional key on the remote controller again, the focus leaves the application bar and moves to a position of an area in a waterfall flow layout, and the bar for application preview is still displayed at the side of the application bar.

If the user wants to hide the bar for application preview, the user may move the focus to the carousel bar, the carousel bar may be displayed in the visible range again, in this case, the bar for application preview may be hidden. In this process, the display apparatus 200 sets a display attribute of the bar for application preview to none, and hides the bar for application preview when the focus lands on the carousel bar. It may be seen that display of the bar for application preview is related to whether the focus lands on the application bar, and hiding of the bar for application preview is related to whether the focus lands on the carousel bar.

Figure 14:
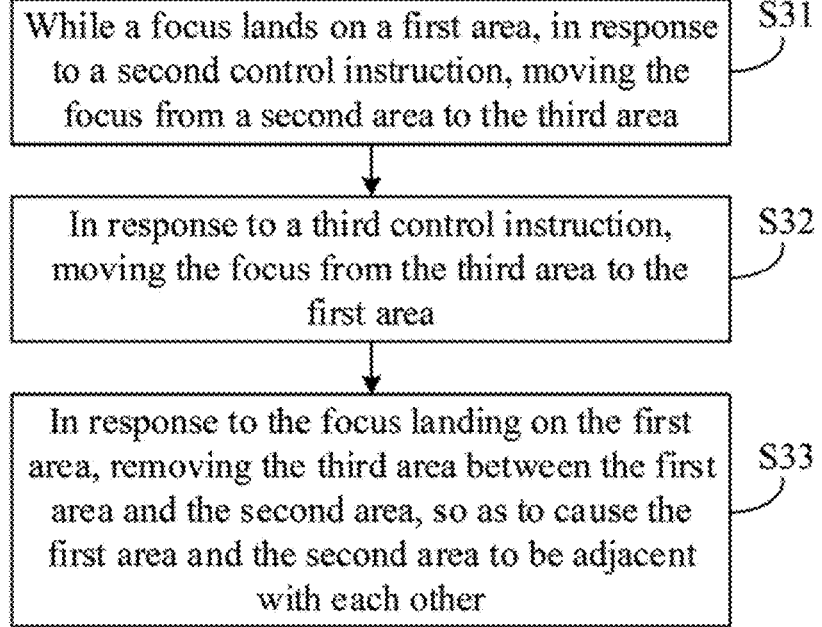
FIG. 14 shows a flowchart of a method for hiding a bar for application preview on a homepage according to some embodiments.

FIG. 14 shows a flowchart of a method for hiding a bar for application preview on a homepage according to some embodiments. In some embodiments, with reference to FIG. 14, the controller 250 removing a third area from a homepage in response to a focus landing on the first area is further configured to cause the display apparatus to perform steps as follows.

S31, while the focus lands on the first area, in response to a second control instruction, moving the focus from a second area to the third area.

S32, in response to a third control instruction, moving the focus from the third area to the first area.

S33, in response to the focus landing on the first area, removing the third area between the first area and the second area, so as to cause the first area and the second area to be adjacent with each other.

The second control instruction and the third control instruction may be generated in a similar mode as a first control instruction. Description is made by taking the second control instruction and the third control instruction being key signals generated by selecting the direction key on the remote controller as an example.

Figure 15:
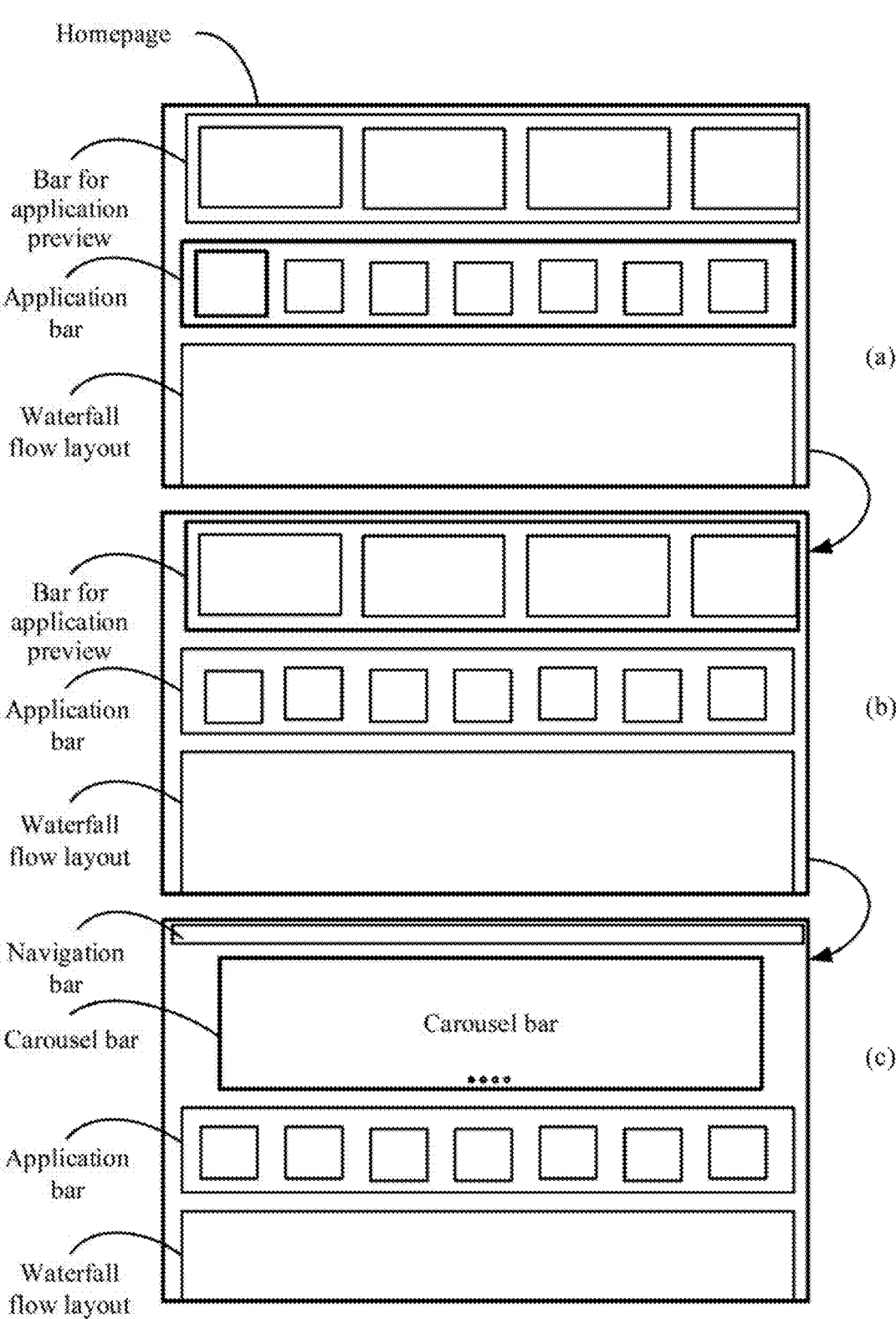
FIG. 15 shows a schematic diagram of hiding a bar for application preview on a homepage according to some embodiments.

FIG. 15 shows a schematic diagram of hiding a bar for application preview on a homepage according to some embodiments. With reference to FIG. 15 (a), for example, while a focus lands on an application bar and the bar for application preview is displayed between a carousel bar and the application bar, a user selects an up directional key on a remote controller once. In response to a first key signal associated with the up directional key, a display apparatus 200 controls a homepage to move down as a whole once, so that the focus moves up from the application bar to the bar for application preview.

With reference to FIG. 15 (b), the user selects the up directional key on the remote controller. In response to a second key signal associated with the up directional key, the display apparatus 200 controls the homepage to move down as a whole again, so that the focus moves up from the bar for application preview to the carousel bar.

With reference to FIG. 15 (c), in response to the focus landing on the carousel bar, the display apparatus 200 hides the bar for application preview between the carousel bar and the application bar, and the homepage is restored from a second state to a first state, that is, a first area and a second area are adjacent to each other. In this process, the display apparatus 200 sets a display attribute of the bar for application preview to none, and hides the bar for application preview.

In some embodiments, while the bar for application preview is removed, the display apparatus 200 may configure a fade-out animation for the bar for application preview to move the bar for application preview out from between the carousel bar and the application bar.

In a scenario where the bar for application preview is displayed on the homepage and the carousel bar disappears from a visible range of the display 260, the display apparatus 200 hides the bar for application preview on the homepage, and moves the carousel bar down and displays same in a position previously for the bar for application preview, such that the carousel bar and the application bar are adjacent to each other. A process of controlling by the display apparatus 200 the carousel bar to move downward may also be achieved through an animation, which is not described herein.

The display apparatus may have more resources by installing third-party applications. These third-party applications may be built-in the display apparatus, or may be downloaded from an application store on the display apparatus and installed in the display apparatus.

In some embodiments, an application list shown in the application bar may be updated, for example, the user customizes installation of a new application or a new application published on a platform, etc. At present, the new application is usually disposed at a last position of the application list.

FIG. 16 shows a flowchart of a method for updating content of an application bar according to some embodiments. With reference to FIG. 16, in order to locate a new application more conveniently and quickly, a controller 250 of a display apparatus 200 is further configured to cause the display apparatus to perform steps as follows.

S41, in response to detecting an item update in a second type of resource information, obtaining a first list of current items and a second list of updated items including the item update.

S42, recognizing at least one new item from the second list of updated items by comparing the first list of current items with the second list of updated items.

S43, displaying all items in the second list in option areas of a second area respectively, and adding an identifier to for an option area for one of the at least one new type of item.

The first list of current items refers to a list of applications originally or previously stored in a system of the display apparatus, such as an original list of applications, and the second list of new types of items refers to a list after an update in the system of the display apparatus, such as a list of applications including new application(s) installed during the update in the system. The display apparatus 200 monitors applications installed in the system in real time. If the display apparatus 200 detects a new application installed in the system, the display apparatus compares the first list of previous applications with the second list of applications including new application(s) installed during update, and recognizes at least one new application from the second list.

FIG. 17 shows a schematic diagram for illustrating the comparison between application lists according to some embodiments. With reference to FIG. 17(a), there are five applications A to E in an original application list. A display apparatus 200 compares updated and previous application lists and recognizes new applications K, M and R. With reference to FIG. 17(b), the display apparatus 200 adds identifiers to option areas of the above three new applications, such that the new applications can be indicated visually.

In some embodiments, after the identifiers are added, in response to a selection on the application marked with the identifier, the display apparatus 200 may modify an attribute of the application and remove the identifier to indicate that the application is not a new application.

In some embodiments, a new or updated application list is shown in an application bar, and one application icon in the new application list is displayed in one option area. While all application icons are displayed, a new item in the new list of items is displayed in an option area at a front position in a second area, and the rest items in the new list of items are displayed behind the option area at the front position. For example, there are an original application and a new application in the new application list. With reference to FIG. 17(b) again, the new application may be displayed at the front position of the application bar, and the original application may be displayed behind the new application.

Alternatively, while displaying various application icons, the display apparatus 200 obtains parameters such as high-frequency words and use time of each application, and different parameters have different weights. Through weighed calculation of a use coefficient of each application, an application with a high use coefficient is displayed at the front position of the application bar, and an application with a low use coefficient is displayed at a back position of the application bar. The high use coefficient indicates that the application is used frequently and for a longer time.

Figure 18:
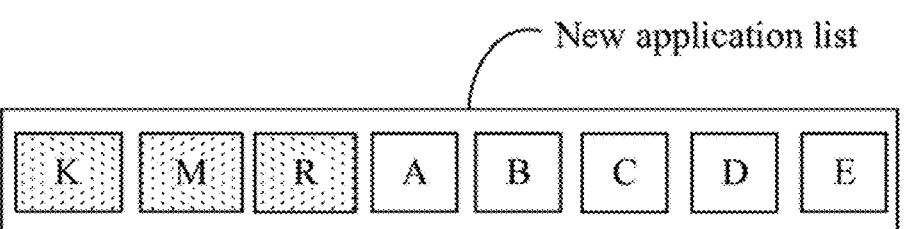
FIG. 18 shows a schematic diagram of presentation of an application list according to some embodiments.

FIG. 18 shows a schematic diagram of an application list according to some embodiments. In some embodiments, with reference to FIG. 18, in order to highlight a new application, besides adding identifier, a display apparatus 200 may further zoom in an option area of the new application in the application bar or configure different display effects, such as configuring a color background and highlighting. An original application is in a default state. For example, option areas of new applications K, M and R are zoomed in, and a color background is added to distinguish the new application from the original application.

It should be noted that the displaying the application bar includes at least one of: adding of an identifier to a new application, displaying the new application at a front position of the application bar, displaying an application with a high use coefficient at the front position of the application bar, zoom-in displaying the new application, configuring the new application with different display effects, etc.

According to the display apparatus 200 according to some embodiments of the disclosure, the display apparatus 200 is started and a homepage is displayed in a display 260 while a method for displaying the homepage is performed, and areas such as a carousel bar, an application bar and a bar for application preview are shown in the homepage. When a focus lands on the application bar, the bar for application preview is displayed adjacent to the application bar. When the focus lands on the carousel bar, display of the bar for application preview is canceled. In a limited display space on the homepage, the bar for application preview is displayed in a dynamic display mode. In this way, more types of resource information may be displayed on the same screen.

FIG. 6 shows a flowchart of a method for displaying a homepage according to some embodiments. With reference to FIG. 6, the method for displaying a homepage according to some embodiments of the disclosure is applied to the display apparatus 200 shown in the forgoing embodiments, and the method includes the following.

S1, in response to a startup instruction of the display apparatus 200, controlling a display to display a homepage, the homepage includes at least one of a first area and a second area, the first area is used for displaying a first type of resource information and the second area is used for displaying a second type of resource information.

S2, in response to a focus landing on the second area, displaying a third area on the homepage, the third area is adjacent to the second area, and the third area is used for displaying resource information associated with the second type of resource information.

S3, in response to the focus landing on the first area, removing the third area from the homepage.

According to the method for displaying a homepage and the display apparatus 200 according to some embodiments of the disclosure, the display apparatus 200 is started and the display apparatus 200 homepage is displayed on the display 260, and the areas such as the carousel bar, the application bar and the bar for application preview are shown in the homepage. When the focus lands on the application bar, the bar for application preview is displayed adjacent to the application bar. When the focus lands on the carousel bar, display of the bar for application preview is canceled. It may be seen that according to the method and the display apparatus 200, in the limited display space on the homepage, the bar for application preview is displayed in a dynamic display mode. In this way, more types of resource information may be displayed on the same screen, and the display effect of the homepage may be improved.

In some embodiments, when the display apparatus (such as a smart TV) displays an installed application, all applications may be displayed on an interface, such as an application bar or an area for application display, for a user to search for a specific application. Although too many applications bring rich viewing resources to the user, it is difficult to locate a specific application quickly from too many applications, and a display position of the application may not be edited flexibly.

The display apparatus may further reduce search difficulty when a homepage or initial interface of the display apparatus displays too many applications. Based on the disclosure, the applications on an application management interface can be edited, linkage between the application management interface and the initial interface may be achieved.

Figure 19:
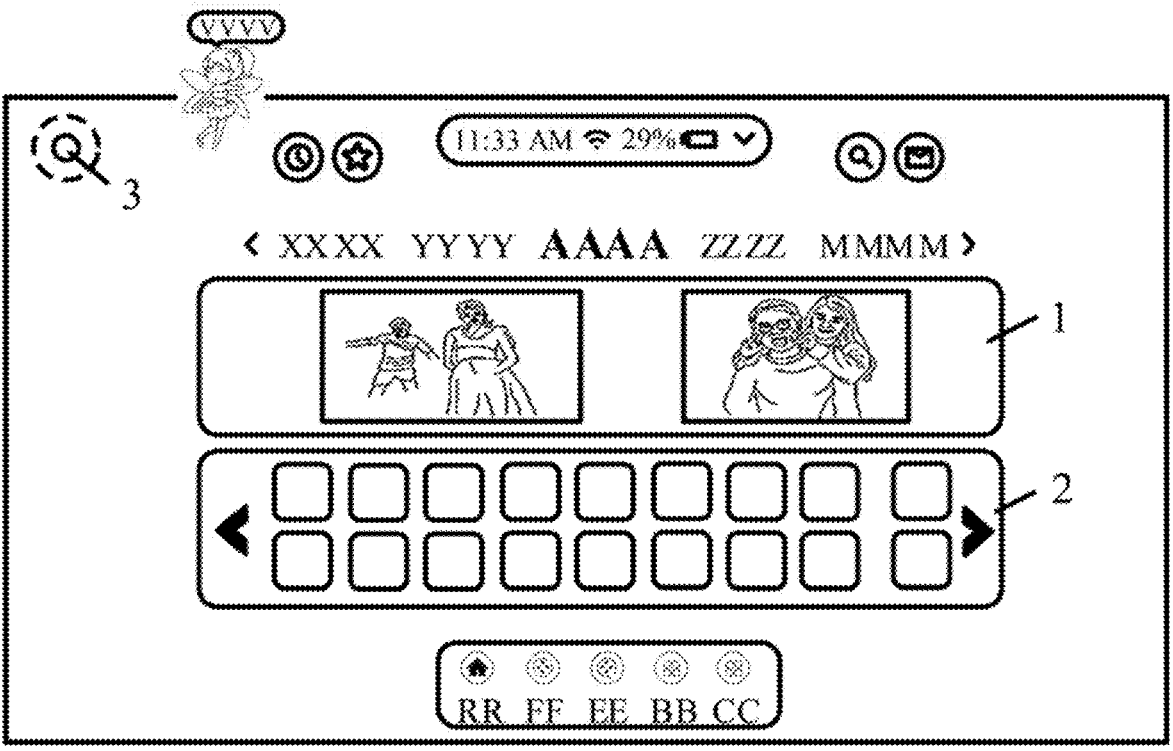
FIG. 19 shows a schematic diagram of an initial interface of a display apparatus according to some embodiments.

FIG. 19 shows a schematic diagram of an initial interface of a display apparatus. As shown in FIG. 19, after the display apparatus powers on, the initial interface is displayed, for example, a homepage. The initial interface may be presented in various UI layouts according to an operation from a user. The initial interface is displayed in a display of the display apparatus, and the initial interface may include an area 1 for recommendation content, an area 2 for application display and an area 3 for floating item.

The area 1 for recommendation content is used for TAB columns of different types, and media resources, topics, etc. may be configured in the column. The media may include two-dimensional (2D) movies, educational courses, tours, 3D, 360-degree panoramic views, live broadcasts, 4K movies, program applications, games and other businesses with media content, and different template styles may be selected for the columns, and the media contents and the topics may be simultaneously recommended and programmed.

In some embodiments, a status bar may further be set at a top of the area 1 for recommendation content, and a plurality of display controls may be arranged in the status bar, and include general options such as time and network connection statuses. Content included in the status bar may be customized by a user, for example, weather, a profile photo of the user and other content may be added. The content contained in the status bar may be selected by the user to perform a corresponding function.

The status bar is used to allow the user to perform general control operations and quickly set the display apparatus. Since there are a plurality of setting options for the display apparatus, it is usually impossible to display all general setup options in the status bar. In view of this, in some embodiments, an extension option may further be arranged in the status bar. After the extension option is selected, an expansion window may be presented in a current interface, and a plurality of setup options may be further arranged in the expansion window to implement other functions of the display apparatus.

The area 2 for application display is used to show a pre-installed application for management, and supports configurations, such as replacing a default icon style with a special icon style. The number of pre-installed applications may be specified as being more than one. In some embodiments, the area 2 for application display further includes a control for moving left and a control for moving right to move the area, so that more different icons can be selected.

The area 3 for items in floating presentation manner may be configured at the top left or top right of the initial interface, may be configured as a replaceable image, or may be configured as a link. The items is presented in a layer above another layer where the interface of the areas locates, which means that the item(s) appears like an item floating with respect to a background where the area 1 and 2. For example, in response to a confirmation operation for a floating item, a certain application is open or a specified function page is shown. In some embodiments, the area for floating item(s) may merely be used for image display without links.

Figure 20:
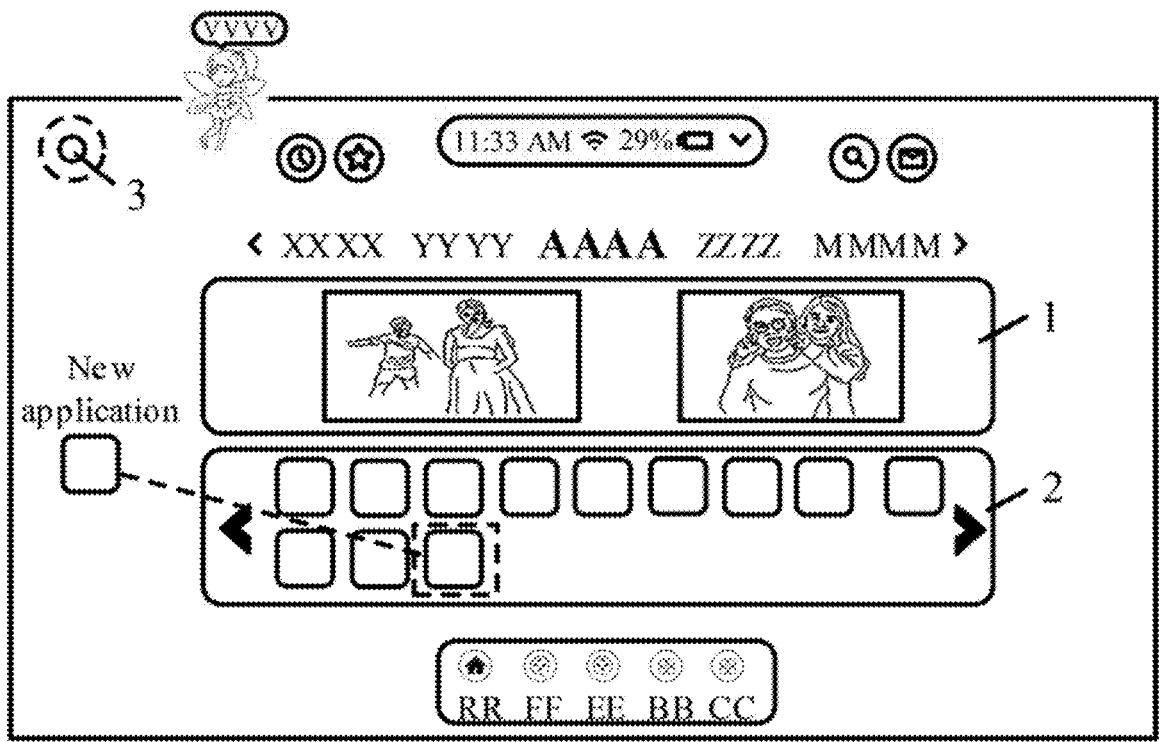
FIG. 20 shows a schematic diagram of an area for application display with an newly added application according to some embodiments.

FIG. 20 shows a schematic diagram of an area for application display of a display apparatus with a newly added application. As shown in FIG. 20, when a user downloads an application from an application store and displays a new application on the initial interface of the display apparatus, the display apparatus adds the new application to a head end or a tail end of the area for application display according to a default rule of the display apparatus. FIG. 20 shows a schematic diagram of an interface with the new application added to the tail end of the area for application display by the display apparatus.

It should be noted that applications in the area for application display and an application management interface both are arranged in a form of an application icon list.

In some embodiments, the area for application display shows all applications including a pre-installed application and a new application, and the display apparatus may edit all the applications on the application management interface.

Figure 21:
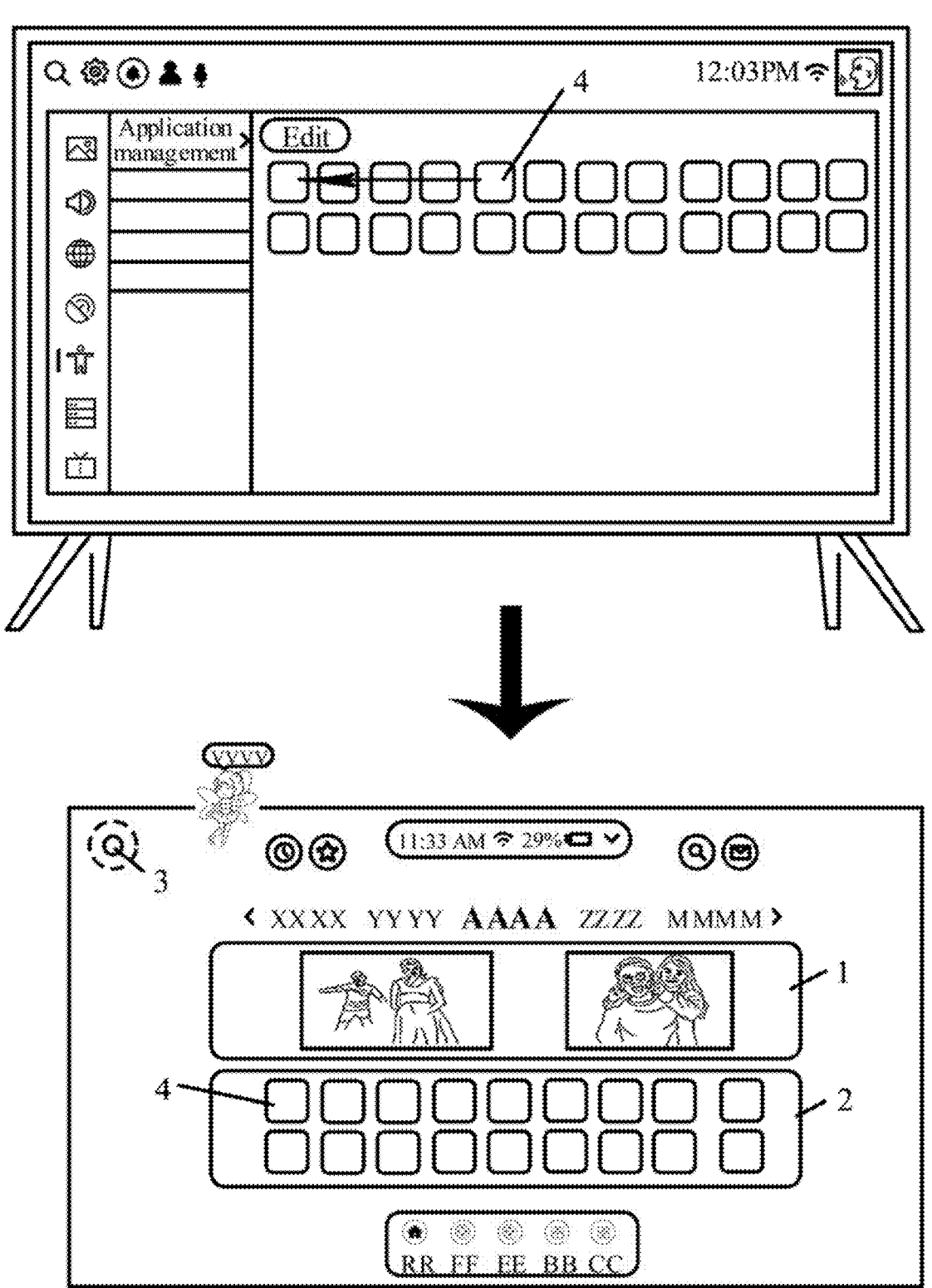
FIG. 21 shows a schematic diagram of an application management interface of a display apparatus according to some embodiments.

FIG. 21 shows a schematic diagram of an application management interface of a display apparatus. As shown in FIG. 21, the application management interface is an interface for managing all applications in an area for application display of an initial interface. When the application management interface enters an editing mode, all applications on the application management interface can be edited. When a user selects some application icon through a control device, the application icon may be moved left or right through the control device. For example, an application icon 4 is moved to a first place of an application icon list on the application management interface, the user needs to control the application icon 4 to move left continuously five times. In this embodiment, by editing the application icon list on the application management interface, the user may merely edit an order of the application icon list, but may not customize the application displayed in the area for application display for determining applications to be displayed in the area for application display. Since the area for application display displays all applications, efficiency of application searching and editing by the user is low.

It should be noted that the order of the application icon list is adjusted in a linear list mode in the above embodiment, in which each application icon may be merely moved in a left-right direction rather than an up-down direction.

In some embodiments, the area for application display may partially display pre-installed applications and new applications according to preference of the user. The display apparatus may edit all applications including pre-installed applications and new applications on the application management interface, so as to select part of applications from all the applications to be shown in the area for application display.

Figure 22:
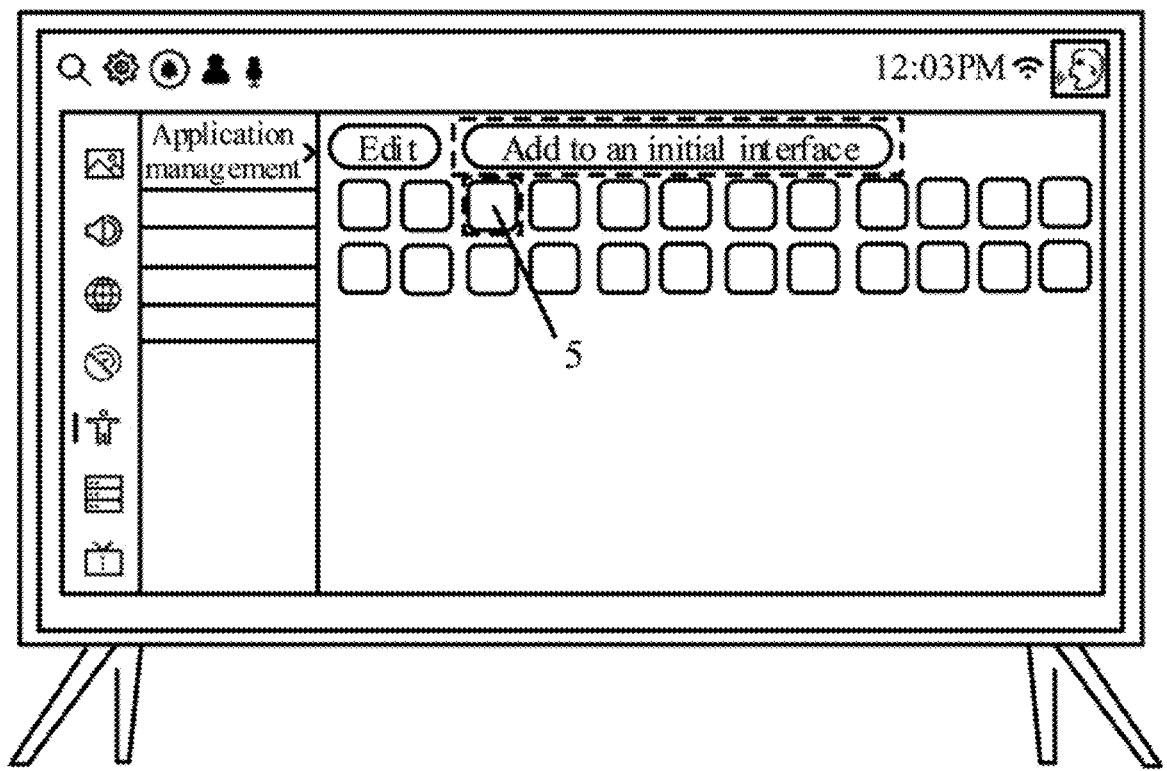
FIG. 22 shows a schematic diagram of another application management interface of a display apparatus according to some embodiments.

FIG. 22 shows a schematic diagram of another application management interface of a display apparatus. As shown in FIG. 22, the application management interface includes an "add to initial interface" control, and the control may allow the addition of an application on the application management interface to an area for application display of an initial interface by default. Moving an application icon 5 to the area for application display is taken as an example. After a user selects the application icon 5, by clicking the "add to initial interface" control, the application icon 5 is added to a tail end of an application icon list in the area for application display. It should be noted that in this embodiment, the display apparatus may merely add the application icon 5 to the area for application display, but may not adjust on the application management interface a position of the application icon 5 in the application icon list. If the user needs to adjust the position of the application icon 5 in the area for application display, the user needs to return to the initial interface from the application management interface, to adjust an order of the application icon 5 in compliance with an editing logic of the initial interface.

It should be noted that in the above embodiment, the display apparatus uses a list mode to adjust the order according to the editing logic of the initial interface, in which the application icon may be moved in left and right directions in the area for application display rather than up and down directions.

Therefore, an existing application management interface is not allowed to edit an order of a high-frequency application list while controlling the area for application display to merely display the high-frequency applications, resulting in low efficiency of application searching and editing by the user and poor user experience.

Figure 23:
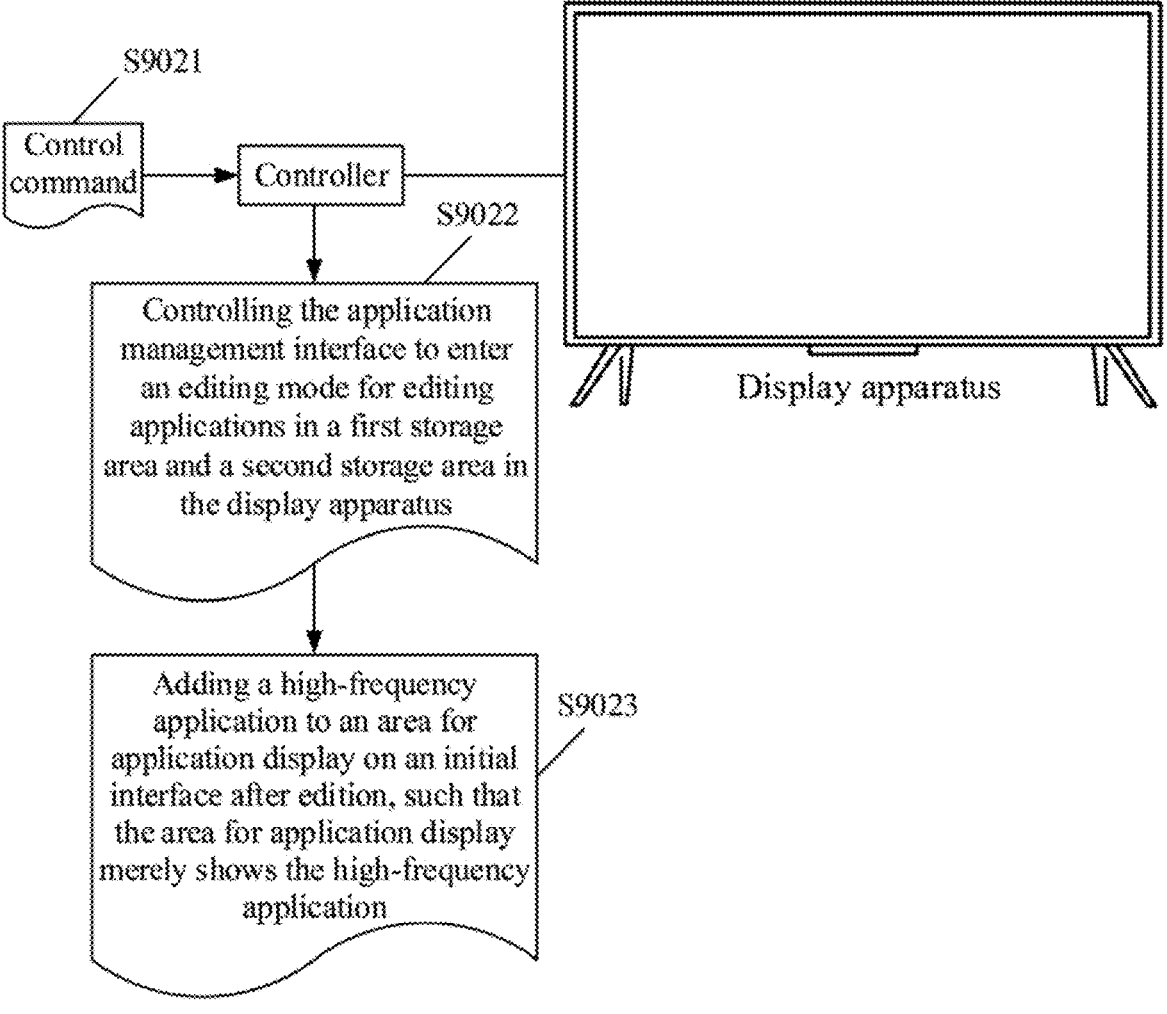
FIG. 23 shows a configuration flowchart of a display apparatus according to some embodiments.

In view of the above issues, it's difficult to search an application on an initial interface with too many applications and not allowed to customize the same, the embodiment of the disclosure provides a display apparatus. The display apparatus includes a display configured to display an initial interface and an application management interface; and a controller configured to perform steps S9021-S9023 shown in FIG. 23.

S9021, a control command for editing an application management interface is received from a user. The application management interface includes a first storage area and a second storage area, the first storage area is used for storing high-frequency applications, and the second storage area is used for storing low-frequency applications.

In some embodiments, the user may input, through a control device or a smart device, the control command for editing the application management interface into the display apparatus. In some embodiments, after the display apparatus powers on, the user may select a "set" control through a status bar at a top of an area for recommendation content 1, and the application management interface can be entered via an extension option of the "set" control.

In some embodiments, the application management interface can be entered by a selection for the floating item on area 3, so as to quickly operate on the application management interface.

S9022, in response to the control command for editing the application management interface, the application management interface is controlled to enter an editing mode for editing applications in a first storage area and a second storage area in the display apparatus. Here, editing includes an application addition option and an application removal option. The application addition operation is used to add the application in the first storage area and/or the second storage area, and the application removal operation is used to delete the application from the first storage area and/or the second storage area.

In some embodiments, when entering the application management interface, the display apparatus enters the editing mode by default, and the user may directly operate on the interface to edit the application on the application management interface.

In some embodiments, a top of the application management interface is provided with an "edit" control. The user may click the "edit" control through the control device or the display apparatus to make the application management interface enter an editing state, and then click the "edit"

control again to make the application management interface exit from the editing state. By setting this control, the display apparatus may prevent the user from changing the application in the area for application display due to accidental selection after entering the application management interface.

In some embodiments, the controller controlling the application management interface to enter an editing mode for editing applications in the first storage area and the second storage area is further configured to cause the display apparatus to perform S10021-S10022 as follows.

S10021, configuring the application management interface in such a way that the first storage area and the second storage area are in a grid layout, and the first storage area is located above the second storage area.

It should be noted that the grid layout may be created in many methods, such as: GridView( ), GridView.custom( ), GridView.count( ), GridView.builder( ), GridView.extent( ), etc. Layout creation through GridView.count ( ) is taken as an example, in this method, a fixed number of layouts may be created, rows and columns as well as sliding directions may be specified, and layout parameters may be specified.

Figure 24:
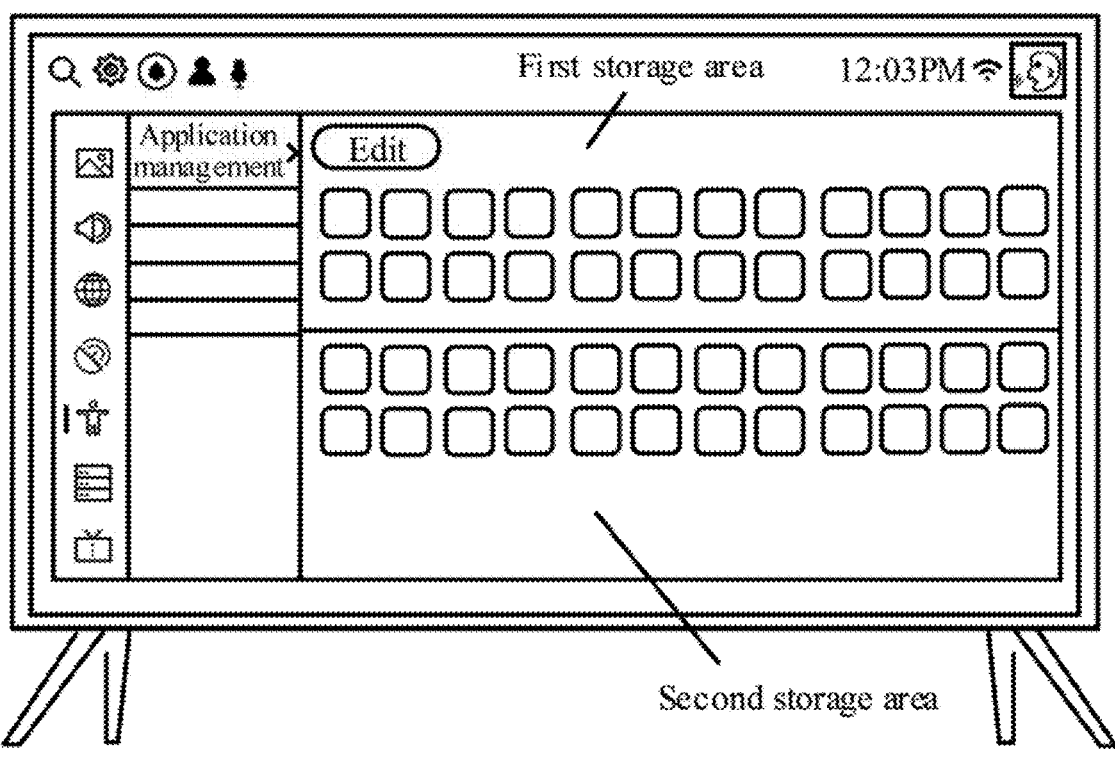
FIG. 24 shows a configuration interface of a display apparatus according to some embodiments.

FIG. 24 shows a schematic diagram of an application management interface according to an embodiment of the disclosure. As shown in FIG. 24, a first storage area and a second storage area are of a grid layout created by GridView.count( ). In some embodiments, in this layout mode, the first storage area and the second storage area are set to show at most 12 application icons per row, and the first storage area is set to show at most 2 application icons per column.

It should be noted that since the first storage area is set to display at most 2 application icons per column, that is, there are at most 24 application icons in the first storage area. When a $25^{th}$ application icon is allocated to the first area, the 25th icon may merely be stored in a first place in the second storage area. By using this implementation mode with a proper maximum number, a user may conveniently view high-frequency applications, so as to ensure that the user may rapidly and conveniently select an application from a proper number of high-frequency applications.

S10022, based on the grid layout, removing an application from the first storage area by moving the application from the first storage area to the second storage area in a direction from top to bottom, or adding an application to the first storage area by moving the application from the second storage area to the first storage area in a direction from bottom to top.

Figure 25:
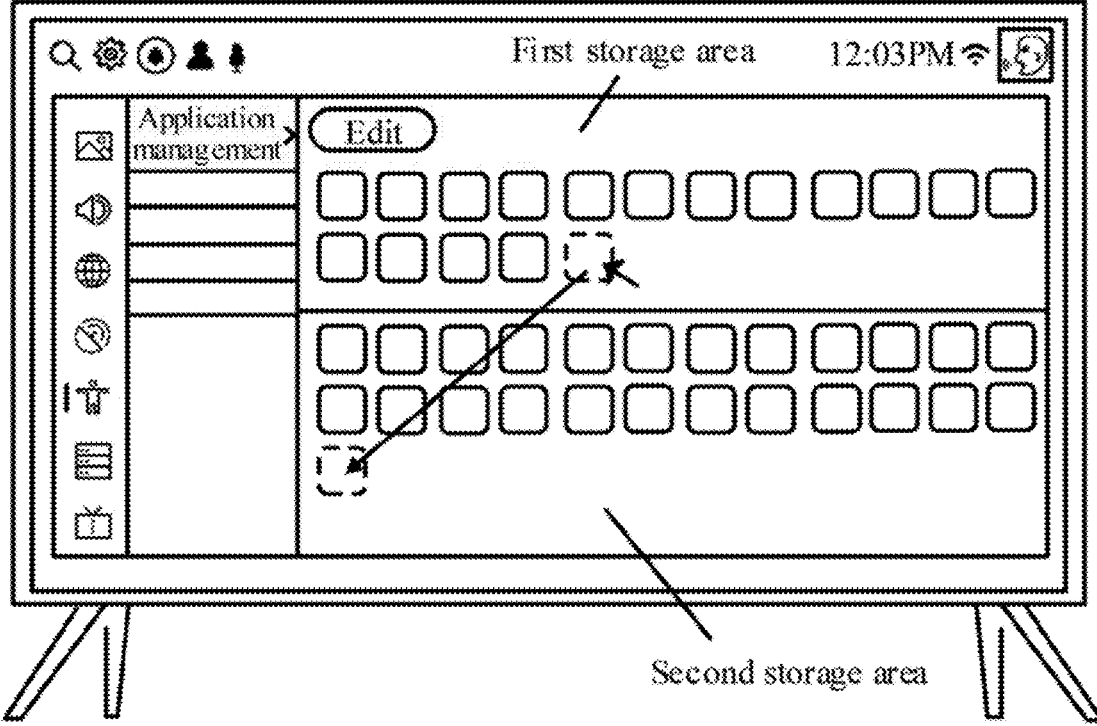
FIG. 25 shows a schematic diagram for illustrating a mode of moving an icon according to some embodiments.

FIG. 25 shows a schematic diagram of a mode of moving an icon according to an embodiment of the disclosure. As shown in FIG. 25, when a user clicks an application icon in a first storage area through a control device, an application corresponding to the icon is removed from the first storage area and added to a second storage area.

Figure 26:
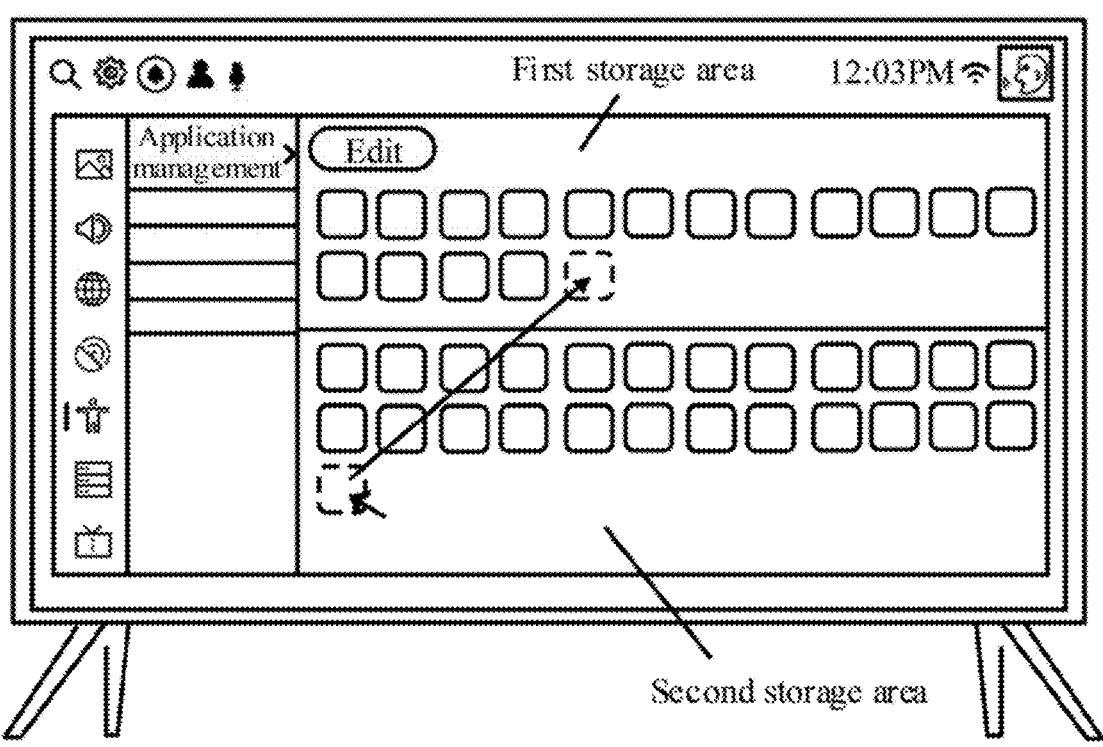
FIG. 26 shows a schematic diagram for illustrating another mode of moving an icon according to some embodiments.

FIG. 26 shows a schematic diagram of another mode of moving an icon according to an embodiment of the disclosure. As shown in FIG. 26, when a user clicks an application icon in a second storage area, an application corresponding to the icon is removed from the second storage area and added to a first storage area.

In some embodiments, adding an application to the first storage area by moving the application from the second storage area to the first storage area in a direction from bottom to top includes: receiving a move command for moving the application input from the user within preset time; and in response to the move command, controlling a new application in the first storage area to move according to the move command.

Figure 27:
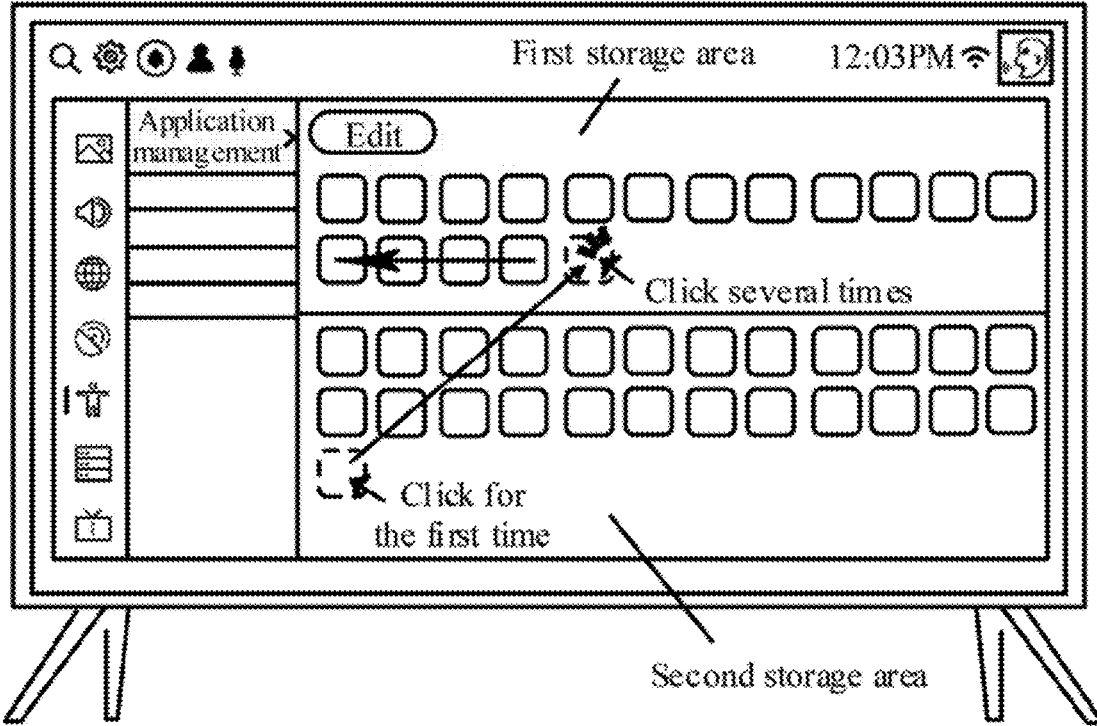
FIG. 27 shows a schematic diagram for illustrating a mode of moving an icon in a first storage area according to some embodiments.

FIG. 27 shows a schematic diagram of a mode of moving an icon in a first storage area according to an embodiment of the disclosure. As shown in FIG. 27, when a user newly adds a certain application to the first storage area, if the user continues to click an application icon within preset time, an order of the application icon in the first storage area may be continuously adjusted. The user may adjust a position of the application icon via left and right direction keys of a control device. In some embodiments, if the preset time is 5 s, when the user moves an application in the second storage area to the first area in a direction from bottom to top, the focus still lands on the application icon in the first storage area. If the user continues to click the application icon within 5 s, the user may move the application icon in the first storage area to adjust the position of the application icon in the first storage area.

It should be noted that in an application management interface, a display apparatus may provide a variety of application management interfaces suitable for habits of the user, and may perform an operation mode of first moving and then removing the application icon, or first removing and then moving. The above embodiment is an example of the operation mode of first deletion and then moving, that is, the user clicks an icon in the second storage area for the first time, the icon is removed from the second storage area and added to the first storage area, and the click is performed again within the preset time, that is the order of the icon is adjusted in the first storage area. If the operation mode of first moving and then removing is used: the icon in the first storage area is clicked for the first time, the icon is moved in the first storage area to adjust the order of the application icon in the first storage area, the focus lands on the icon after the preset time, and the icon may be clicked again to remove the icon from the first storage area.

In some embodiments, the process of controlling the application management interface to enter an editing mode for editing applications in the first storage area and the second storage area includes: in response to an increase of a height of the first storage area due to the application adding or an decrease of the height of the first storage area due to the application removal, controlling a height of the second storage area to change with the height of the first storage area to keep an interface interval between the first storage area and the second storage area consistent.

Figure 28:
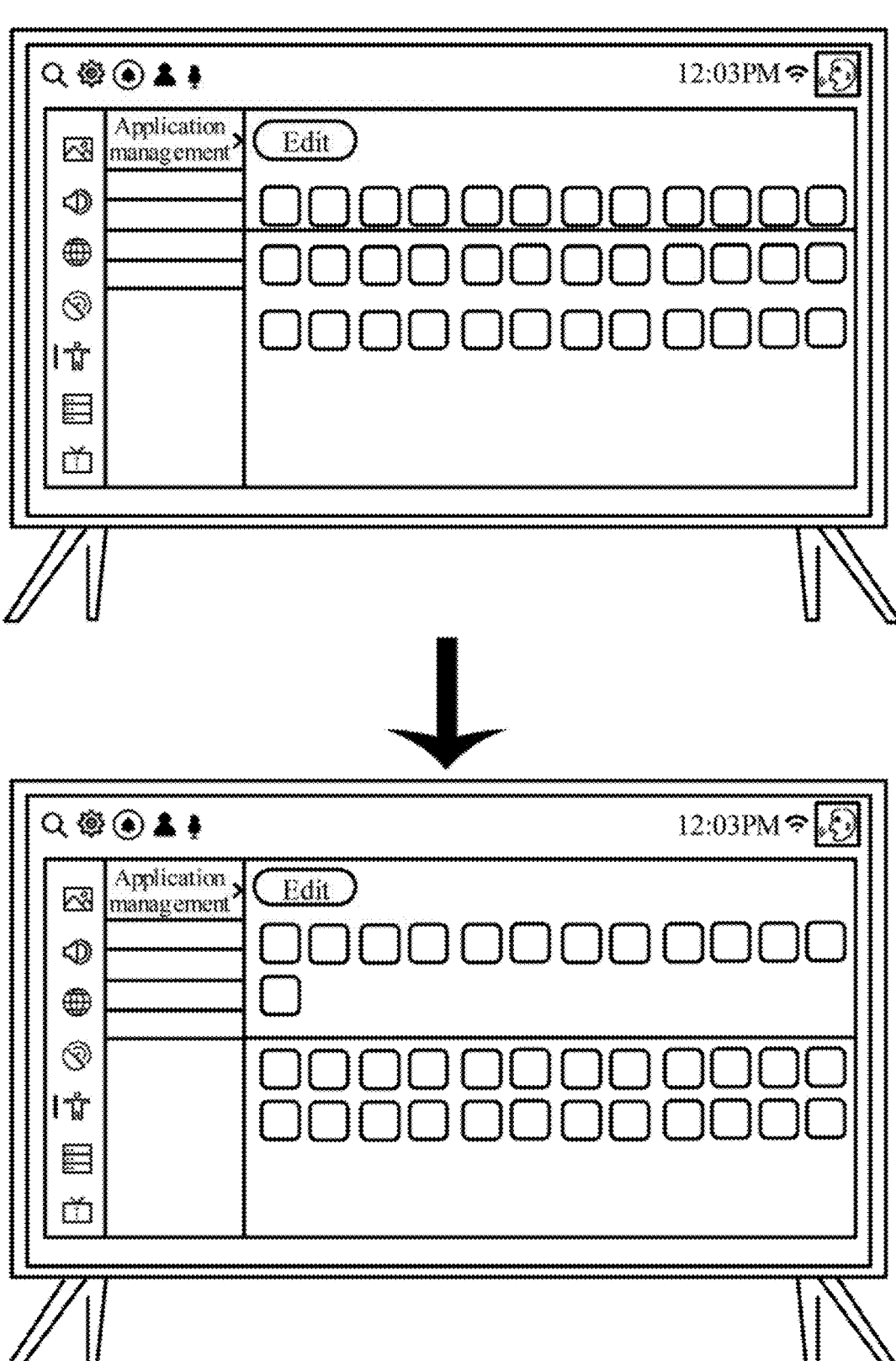
FIG. 28 shows a schematic diagram for illustrating change of heights of an application management interface according to some embodiments.

FIG. 28 shows a schematic diagram of a height change of an application management interface according to an embodiment of the disclosure. As shown in FIG. 28, a display apparatus merely sets a first storage area to display at most 12 applications per row and 2 applications per column. Therefore, when 12 applications stored in the first storage area change to 13 applications, a display interface area of the first storage area may change, and a height of the first storage area needs to be adaptively increased, while a height of the second storage area needs to be adaptively decreased. Or, when the 13 applications stored in the first storage area change to 12 applications, the height of the first storage area needs to be adaptively decreased, and the height of the second storage area needs to be adaptively increased. FIG. 28 merely shows the schematic diagram of adaptive height increase of the first storage area.

In some embodiments, the controller is further configured to cause the display apparatus to perform a process as follows.

Controlling a first icon to be displayed in the area for application display, so as to enter the application management interface through a first icon.

Figure 29:
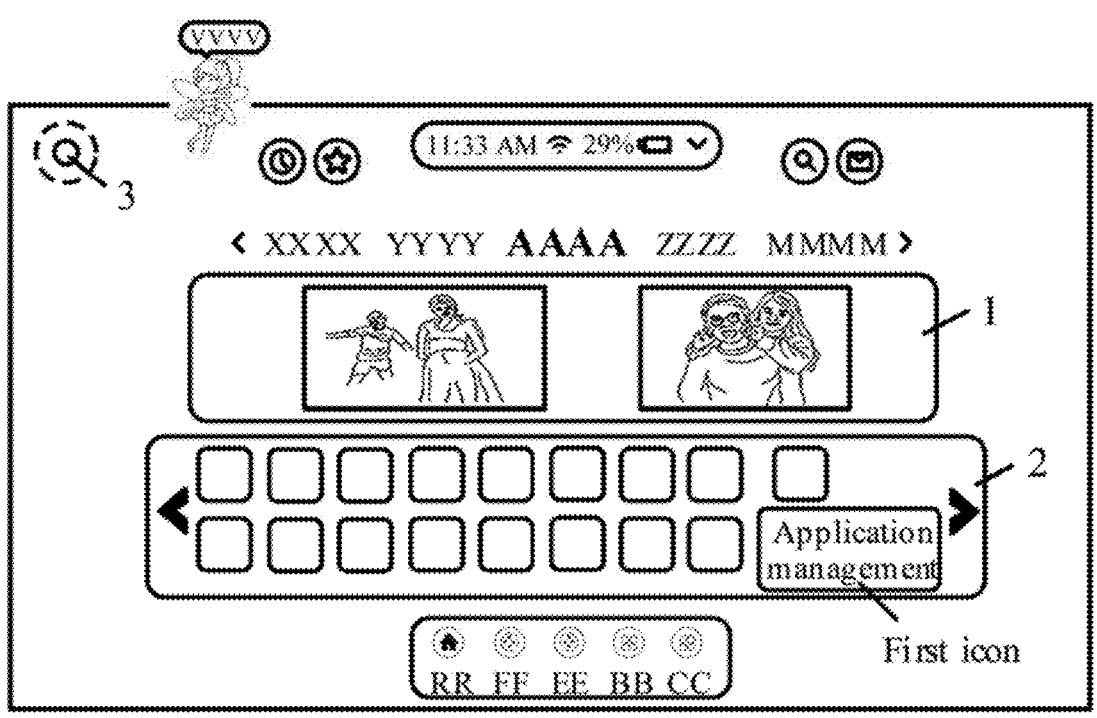
FIG. 29 shows a schematic diagram of an interface including a first icon according to some embodiments.

FIG. 29 shows a schematic diagram of a first icon according to an embodiment of the disclosure. As shown in FIG. 29, the first icon is displayed at a tail end of an application icon list in an area for application display to allow for rapidly entering an application management interface.

In some embodiments, controlling the application management interface to enter an editing mode for editing applications in the first storage area and the second storage area includes: displaying a cover on a first application icon of the first storage area while the first application icon moves from the first storage area to the second storage area in a direction from top to bottom, or displaying a cover on a second application icon of the second storage area while the second application icon moves to the first storage area in a direction of from bottom to top.

Figure 30:
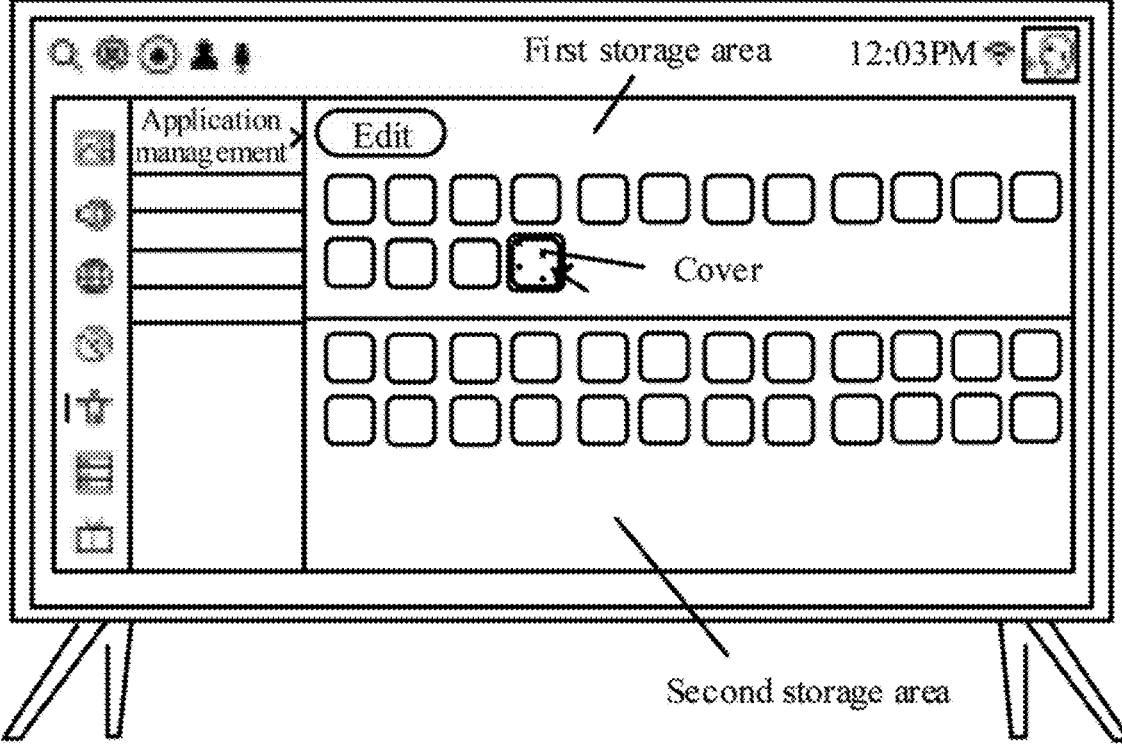
FIG. 30 shows a schematic diagram of an interface presenting a mask according to some embodiments.

FIG. 30 shows a schematic diagram of an interface with a cover according to an embodiment of the disclosure. As shown in FIG. 30, when a user moves a cursor to an application icon, a cover is displayed on the application icon, facilitating focus move to the application icon for a user.

In some embodiments, an application management interface is configured in such a way that a first storage area and a second storage area are in a grid layout, and the first storage area is located at a left side of the second storage area.

In some embodiments, according to the grid layout, an application is removed from the first storage area by moving the application from the first storage area to the second storage area in a direction from left to right, or an application is added to the first storage area by moving the application from the second storage area to the first storage area in a direction from right to left.

S9023, adding a high-frequency application to an area for application display on an initial interface after edition, such that the area for application display merely shows the high-frequency application.

In some embodiments, the step of adding a high-frequency application to an area for application display of an initial interface includes: in response to detecting an application addition operation or an application removal operation in the first storage area, updating the area for application display in such a way that the high-frequency application displayed in the area for application display is consistent with a high-frequency application in the first storage area. In this implementation mode, linkage between the application management interface and the initial interface may be achieved to keep the number of applications in the area for application display consistent with the number of applications of the first storage area.

In some embodiments, the step of adding a high-frequency application to an area for application display of an initial interface includes: determining whether there is an application movement operation in the first storage area, where the application movement operation is used to change an arrangement order of the application(s) in the first storage area; and in response to an application movement operation in the first storage area, updating the area for application display in such a way that an arrangement order of the application in the area for application display is consistent with the arrangement order of the application in the first storage area. In this implementation mode, linkage between the application management interface and the initial interface may be achieved to keep an order of application icons in the area for application display consistent with an order of application icons in the first storage area.

face may be achieved to keep an order of application icons in the area for application display consistent with an order of application icons in the first storage area.

In some embodiments, installed third-party applications may be displayed on the same page, for example, all installed third-party applications are displayed in an application management area in system desktop Launcher of a display apparatus, in this way, it is difficult for the user to search for a target application to launch, or to remove any third-party application that the user wants to remove. Besides, the user may not change an icon of the third-party application after installing it. The third-party application is usually updated in the background, so the user may not know an updated third-party application in time, or which third-party application updates. It can be seen that at present, the display apparatus may not effectively manage so many third-party applications.

The display apparatus according to the embodiments of the disclosure may further effectively manage installation processes of various third-party applications and a third-party applications installed in the display apparatus.

Figure 31:
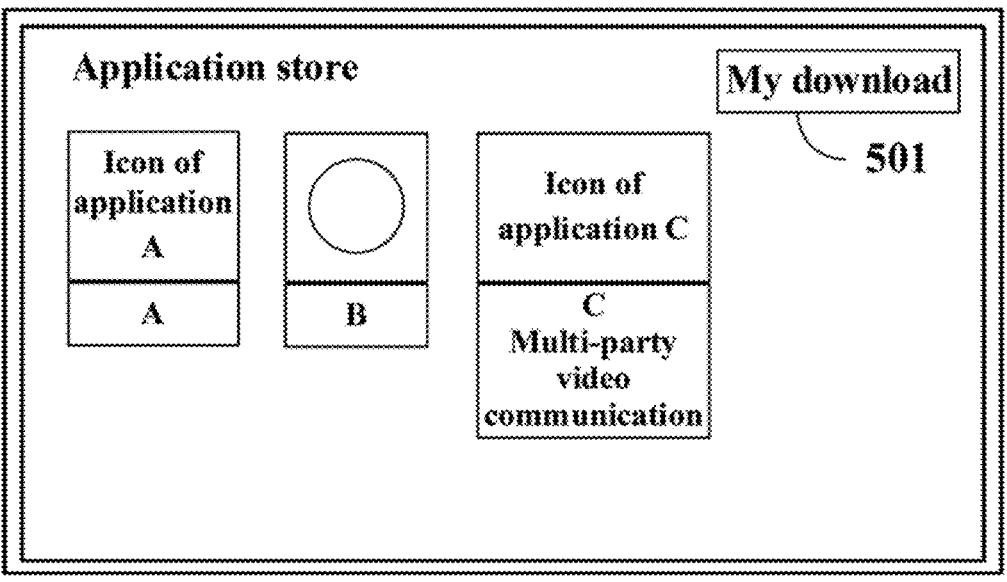
FIG. 31 shows a schematic diagram of a user interface of an application store according to some embodiments.

The application store provides third-party applications that allows to installed in the display apparatus 200, and the user may select a third-party application (hereinafter referred to as a target application for the convenience of description) to be installed in the display apparatus 200 based on demands. FIG. 31 shows a user interface corresponding to the application store, and the user interface includes third-party applications that allows to be installed in the display apparatus 200, that is, application A, application B and application C. In some embodiments, as shown in FIG. 31, application information of the third-party applications is displayed on the user interface, such as icons and names of the third-party applications. The icon of the third-party application may be an application icon of the third-party application (such as the application A), a representative image of content of the third-party application (such as the application B, a representative image of "circle" indicating content "circle" of the application B), etc. In some embodiments, the disclosure information of the third-party applications may further include description information of the third-party applications, and the description information is used to briefly introduce functions, content, consumer reviews, etc. of the third-party applications, such as description information "multi-party video communication" in the application C. Based on the application information of the third-party applications, the user may rapidly find the target application that satisfies the demands.

After the user determines a target application, an installation instruction is sent to the display apparatus 200 based on the target application to instruct the display apparatus 200 to install the target application. A process of installing the target application by the display apparatus 200 is to obtain a resource address of the target application and obtain application data of the target application according to the resource address. The resource address of the third-party application is used to indicate a storage location of the application data of the third-party application, and may be a uniform resource locator (URL). The application data of the third-party application includes an identity document (ID), a name, an application icon address, an application startup address and a startup type. The display apparatus 200 stores the obtained application data in a default storage space in the display apparatus, and displays the icon of the target application on a default page corresponding to the default storage space.

Generally, the display apparatus 200 may display the installed third-party applications on the default page in order to show all the installed applications to the user, and therefore allow the user to fully understand currently available installed applications in the display apparatus 200. In order to facilitate application search on the default page, the default page is usually set on a user interface that may be opened by the user via several operations or less operations. For example, the default page is directly set to be in a specified area on the system desktop Launcher of the display apparatus 200, such that the user may directly see these installed third-party applications in the specified area after starting the display apparatus 200 or returning to the Launcher. Alternatively, in the case that the default page is set to a detail page of some function option on the Launcher, the user may open the default page merely by selecting the function option, so as to see all the installed third-party applications. Alternatively, in the case that the default page is set on a user interface corresponding to a specified key on the control device 100 or a smart device 300, for example, the default page is set on a user interface corresponding to a "menu" key on a remote controller (the control device 100), the user may instruct the display apparatus 200 to display the default page by selecting the "menu" key.

Figure 32:
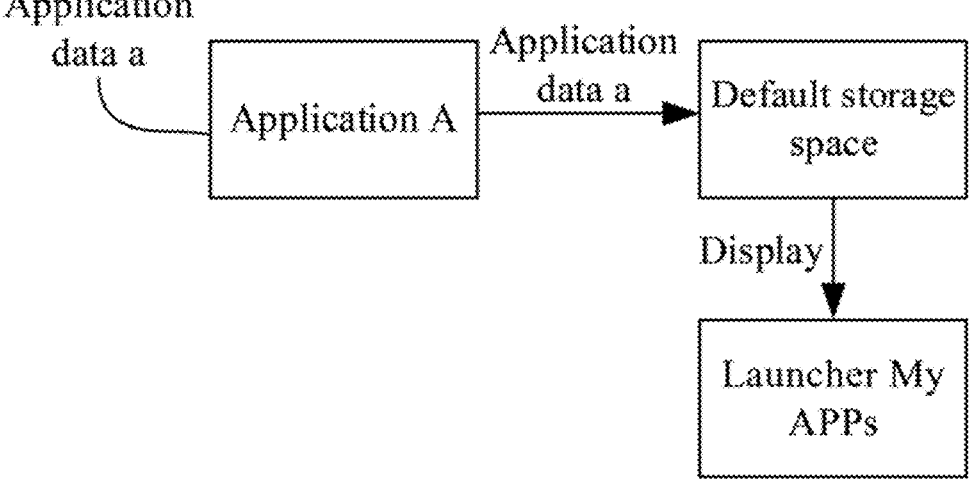
FIG. 32 shows an existing storage path of application data when a third party application is installed according to some embodiments.
Figure 33:
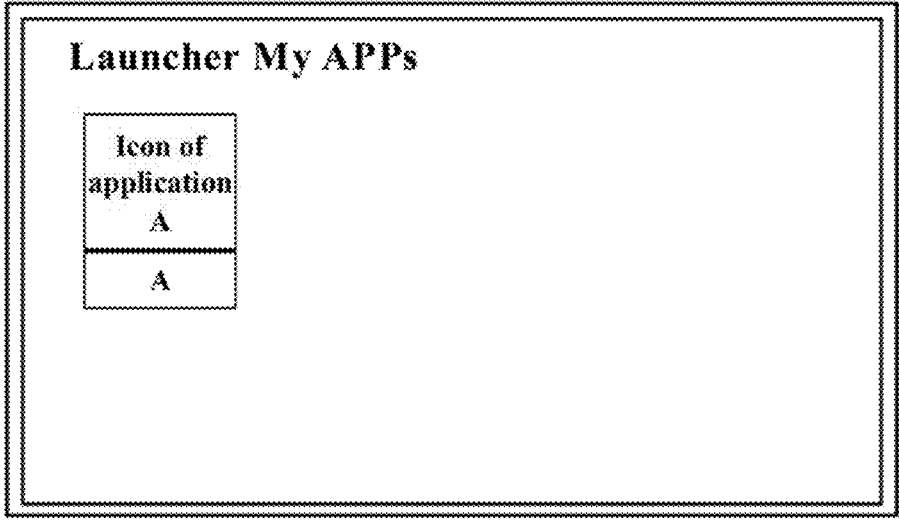
FIG. 33 shows a schematic diagram of a default page according to some embodiments.

Application data of the third-party applications displayed on the default page are all stored in a corresponding storage space, that is, the default storage space in the display apparatus, and the display apparatus 200 is merely configured with one storage space for storing the application data of the installed third-party applications. A flow process of an application data of the target application as shown in FIG. 32 is described by taking the application A as an example. After the display apparatus 200 obtains application data a of the application A from the cloud, the application data a may be merely stored in the default storage space, and accordingly, the application A will be displayed on the default page corresponding to the default storage space, as shown in FIG. 33 in an application display page corresponding to an application management option (My APPs) on the Launcher.

From the above process of installing the third-party applications and displaying the installed third-party applications, it can be seen that the installed third-party applications may merely be displayed on the default page. For a scenario where there are a large number of the installed third-party applications in the display apparatus, the user may rapidly open the default page to browse all the installed third-party applications, but it is difficult for the user to find a third-party application that the user wants to open from so many installed third-party applications. Moreover, these installed third-party applications include some third-party applications that are not frequently used, or that are not downloaded and installed as instructed by the user at all, such as pre-installed third-party applications pre-installed in the display apparatus 200 before delivery of the display apparatus 200, since the storage space for storing the third-party applications is merely the default storage space, application data of these third-party applications may merely be stored in the default storage space, and these third-party applications are inevitably displayed on the default page. If the user wants to stop displaying these third-party applications from the default page, the user may merely delete the corresponding application data from the default storage space. However, after the application data are deleted, once the third-party applications are needed, a process of installing the third-party applications needs to be repeated. Meanwhile, based on a protocol between the display apparatus 200 and the pre-installed third-party application, the application data of the pre-installed third-party application cannot be deleted, such that the pre-installed third-party application is always displayed in the default page and may not be deleted manually by a user.

Figure 34:
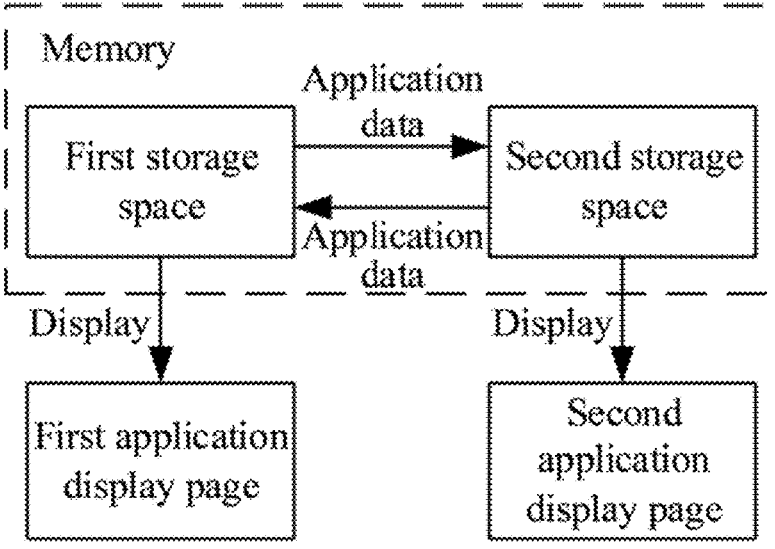
FIG. 34 shows a schematic structural diagram of a memory according to some embodiments.

In view of the above issues, the embodiments of the disclosure provide a display apparatus 200 capable of flexibly adjusting a display position of a downloaded third-party application. As shown in FIG. 34, a memory of the display apparatus 200 includes at least two storage spaces (referred to as a first storage space and a second storage space in the display apparatus for the convenience of description). In some embodiments, the first storage space and the second storage space may belong to two memories in the display apparatus. In some embodiments, the first storage space and the second storage space may be two independent storage spaces belonging to the same memory in the display apparatus. The first storage space and the second storage space are used to store application data of the third-party application, and the first storage space and the second storage space correspond to different pages for presenting icons of the third-party applications respectively (for the convenience of description, these different pages are referred to as a first application display page and a second application display page), that is, icon and/or other description data associated with a third-party application whose application data stored in the first storage space is displayed on the first application display page, while icon and/or other description data associated with a third-party applications whose application data stored in the second storage space is displayed in the second application display page. Therefore, an implementation basis is provided for displaying downloaded third-party applications on different pages based on their different storage spaces of application data.

Data can be interacted between the first storage space and the second storage space by invoking one interface or more interfaces provided by the first storage space and the second storage space respectively, that is, the application data stored in the first storage space may be written to the second storage space through an external interface provided by the second storage space. The application data stored in the second storage space may be written to the first storage space through an external interface provided by the first storage space. Accordingly, the third-party application corresponding to the application data whose storage location switches from the first storage space to the second storage space will switch in display position from the first application display page which corresponds to application data in the first storage space to the second application display page. Therefore, an implementation basis may be provided for flexibly adjusting the display position of the installed third-party applications. In some embodiments, the first storage space is configured to merely operate application data stored therein, for example a file AppInfo.json, and has an external interface which is able to be invoked or called by other module to write application data and other data related to the application data into it. In an example, the external interface is a function which can be mounted in the browser environment and invoked by other modules. Likewise, the second storage space is configured to merely operate application data stored therein, and has an external interface which is able to be invoked or called by other module to write application data and other data related to the application data into it. The external interface for the second storage space is configured similar to that for the first storage space. The first storage space and second storage space is interacted via the external interfaces configured in these two storage spaces, which may reduce coupling of these two storage spaces.

Figure 35:
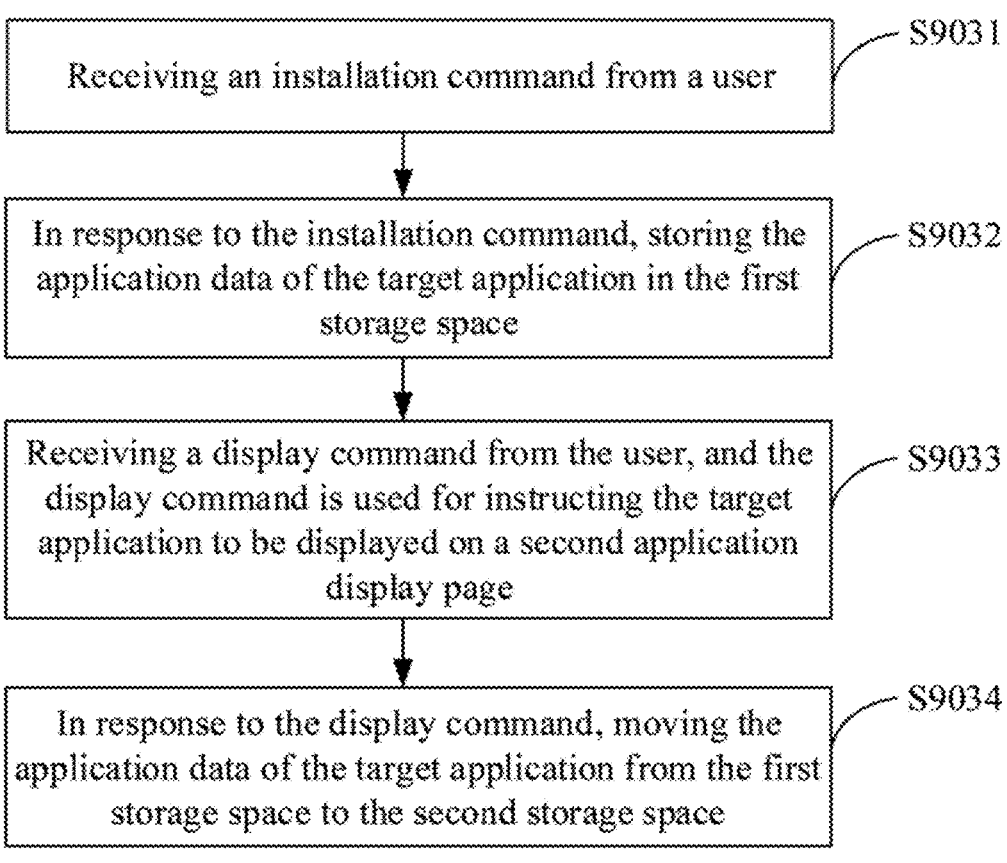
FIG. 35 shows a flowchart of installing a third-party application according to some embodiments.

Based on the above display apparatus 200, the embodiments of the disclosure provide a method for processing a third-party application, so as to switching a display position of a downloaded third-party application more flexibly. With reference to a flow shown in FIG. 35, the method includes specific steps as follows.

S9031, receiving an installation command from a user, and the installation command is used for indicating a target application for installing.

Figure 36:
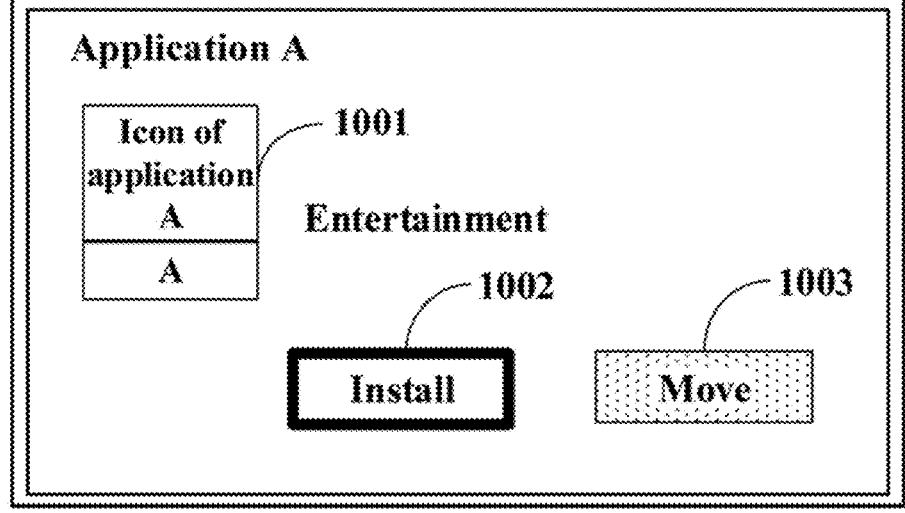
FIG. 36 shows a schematic diagram of a page for downloading application A according to some embodiments.

Based on a user interface of the application store as shown in FIG. 31, the user may select a target application to be installed via the user interface. In some embodiments, the user moves a focus to the target application via the remote controller, and sends a control instruction to the display apparatus 200 by pressing a "OK" key on the remote controller, so as to instruct the display apparatus 200 to open a download page for the target application. For the convenience of subsequent description, this control instruction is referred to as a third control command. The display apparatus 200 displays the download page of the target application in response to the third control command. The download page of the target application includes a name, an icon, description information and corresponding functional options of the target application, such as an installation option. As shown in FIG. 36, application A as the target application is taken as an example for description. A download page of the application A includes an icon 1001 of the application A, a name "A" of the application A, description information "Entertainment" of the application A, and an installation option 1002.

The user issues an installation command to the display apparatus 200 based on the installation option. In some embodiments, the download page shown in FIG. 36 is taken as an example, the user moves the focus to the installation option 1002 by manipulating the remote controller (shown in a bold solid line box) and sends an installation command to the display apparatus 200 by selecting the "OK" key on the remote controller.

S9032, in response to the installation command, the application data of the target application are stored in the first storage space in the display apparatus.

In response to the installation command, the display apparatus 200 obtains the application data of the target application from the cloud. As described above, the application data of the target application includes an ID, a name, an application icon address, an application startup address and a startup type. The application data of the target application are issued to the cloud for the display apparatus 200 by a developer of the target application, such that the display apparatus 200 may obtain the application date from the cloud at any time.

Based on the two pages (the first application display page and the second application display page) provided by the display apparatus 200 for displaying icons of the installed third-party applications, one of the pages may be set as the default page, that is, the page preferentially displaying the installed third-party applications; and the other page may be set to be a page for user instruction, that is the page facilitating browse, search or other processing. In this embodiment, the first application display page being the default page and the second application display page being the page for user instruction are taken as an example. Compared with the first application display page, the second application display page is preferential displayed, or can be located with less operations from the user. Based on display attributes of the first application display page and the second application display page, a third-party application that is of less interest to the user is displayed on the first application display page, such as a less frequently used third-party application and the pre-installed third-party application. A third-party application that is to be displayed as required by the user is displayed on the second application display page, such as a commonly used third-party application, a third-party application that is not commonly used but that is to be displayed as required by the user, and a pre-installed third-party application that is to be displayed as required.

In some embodiments, reference may be made to the related default page of the display apparatus 200 as described above for the second application display page, for example, the second application display page may be set to the Launcher, or the detail page of a specified function option (such as My Apps), which is not repeated herein. The second application display page may further be set as a preference page of the user, that is, a page which the user is used to, so as to facilitate opening of the user of the second application display page based on use habits. For example, if the user is used to returning to the Launcher in one click, the second application display page may be set as the Launcher. The first application display page may be set as a specified area in a page of the application store, or may be set as a detail page of a specified option in the page of the application store. Therefore, the user may accurately determine that the installed third-party applications may be found from the application store based on functional description of the third-party application, and then open the first application display page through the application store to browse the third-party applications, that is not to be displayed on the first application display page as required by the user, displayed on the first application display page.

Based on application display attributes of the first application display page and the second application display page, the display apparatus 200 is configured with a default installation path of the third-party application, and the default installation path of the third-party application is used to preferentially store the application data of the third-party application in the first storage space corresponding to the first application display page. Therefore, while installing the target application, the display apparatus 200 preferentially stores the application data of the target application in the first storage space, and correspondingly, the target application is preferentially displayed on the first application display page. Therefore, the installed target application may be effectively displayed, such that the user may find the target application based on the first application display page. Besides, it may be guaranteed that once the target application is a third-party application that is not to be displayed on the second application display page as required by the user, the target application may not be displayed on the second application display page.

S9033, receiving a display command from the user, and the display command is used for instructing the target application to be displayed on a second application display page.

As shown in FIG. 36, the download page further includes a move option 1003, and the move option 1003 is used to instruct the installed target application to be moved to the second application display page for display. In some embodiments, the move option 1003 may be displayed at the same time as the installation option 1002, and the move option 1003 is configured to be in an unavailable state if an installation process of the target application is not completed, such as a grayed out state (as shown in FIG. 36, the gray indicates that the move option 1003 is in unavailable state). In some embodiments, the move option 1003 is not displayed at the same time as the installation option 1002, that is, the move option 1003 is hidden if the installation process of the target application is not completed, and the move option 1003 is displayed upon completion of the installation process of the target application.

In some embodiments, if the user does not want the installed target application to be displayed in the second application display page, the user may directly exit from the download page, and the target application will be displayed in the first application display page as default.

In some embodiments, if the user wants the installed target application to be displayed in the second application display page, the user may move the focus to the move option 1003 via the remote controller while the move option 1003 is in an available state, and send the display command to the display apparatus 200 by selecting the "OK" key on the remote controller, so as to instruct the target application to be moved to the second application display page for display.

S9034, in response to the display command, the application data of the target application are moved from the first storage space to the second storage space.

In response to the display command from the user, the display apparatus 200 reads the application data of the target application from the first storage space and writes the application data to the second storage space.

In some embodiments, the process of reading the application data of the target application from the first storage space and writing the application data to the second storage space is a data copying process, that is, while the application data are written to the second storage space, the application data are still stored in the first storage space, and after finishing writing to the second storage space, the application data in the first storage space are deleted. Therefore, the problem that in the case where the application data are directly deleted after being read from the first storage space, problems such as interruption may occur during the process of writing the application data to the second storage space, such that the application data written on the second storage space may be incomplete but no data can be read from the first storage space, resulting in data loss of the application data may be avoided.

In some embodiments, after the application data of the target application are completely written to the second storage space, the application data are not deleted from the first storage space, such that the target application is displayed on both the first application display page and the second application display page. The user may not only browse third-party applications that are to be displayed specially as required by the user based on the second application display page, but also browse all the installed third-party applications based on the first application display page.

In some embodiments, in order to synchronize page display, after the application data are completely written into the second storage space, a second application message (APP Message) is sent from the second storage space to the second application display page to inform the second application display page of refreshing the page based on the application data in the second storage space, and the second application display page refreshes the page in response to the second application message to display the target application. After the application data of the target application are deleted, the first storage space sends a first application message (APP Message) to the first application display page to inform the first application display page of refreshing the page based on the application data in the first storage space, and the first application display page refreshes the page in response to the first application message to stop displaying the target application on the first application display page.

In some embodiments, the application data in the first storage space and the application data in the second storage space use the same data structure, to guarantee consistency of logical processing of the application data in the first storage space and the second storage space. In an example, the data structure in the first and second storage space is configured like this:

```
{
    "AppInfo": [{
        "Id": "sport",
        "AppName": "sport",
        "IconURL": "https://192.168.31.2:8080/sport/icon.png",
        "StartURL": "https://192.168.31.2:8080/sport/index.html",
        "InstallTime": "20xx-7-28",
        "version": "1.0",
        "StoreType": "store",
        "updated": "false",
        "updateInfo": "support more media types"
    }, {
        "Id": "NBA",
        "AppName": "NBA",
        "IconURL": "https://192.168.31.2:8080/nba/icon.png",
        "StartCommand": "https://192.168.31.2:8080/nba/index.html",
        "InstallTime": "20xx-10-28",
        "version": "1.3",
        "StoreType": "store",
        "updated": "true",
        "updateInfo": "fix some bugs"
    }]
}
```

Here, Id is used for indicating a unique identifier of an application; AppName is the name of the application; IconURL is the URL address of the icon of the application; StartURL is a URL for starting the application; InstallTime is the time of installing the application; version is the version number of this application; StoreType is for indicating the type of starting the application; updated is used for indicating an update; updateInfo is used for indicating recent update details.

Figure 37:
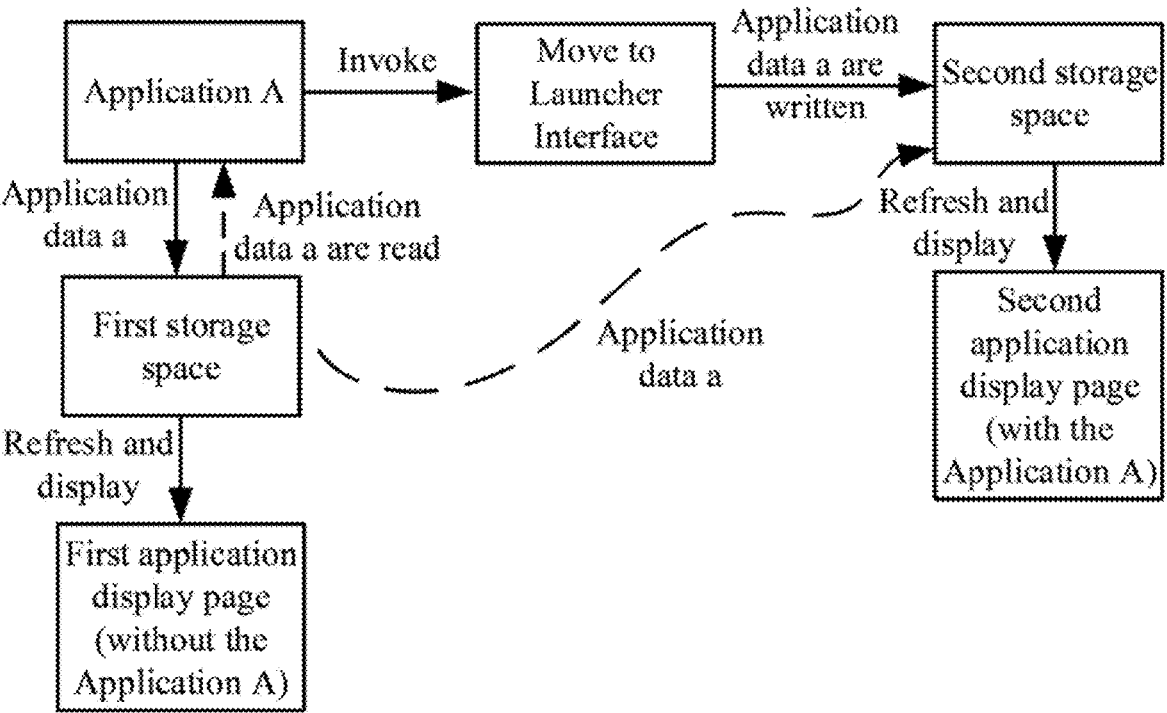
FIG. 37 shows a schematic diagram of data flow while an application is moved to and displayed on a second application display page according to some embodiments.

The application A as the target application is taken as an example for describing the installation process of the above third-party application, and reference may be made to FIG. 37 for the flow for processing the application data of the application A, with details as follows.

The user instructs the display apparatus 200 to display the download page of the application A by sending the third control command to the display apparatus 200. Reference may be made to related description in S9031 for this process, which is not repeated herein. In response to this third control command, the display apparatus 200 displays the download page as shown in FIG. 36.

The user issues the installation command to the display apparatus 200 based on the installation option 1002, and the display apparatus 200 responds to the installation command to obtain the application data of the application A, such as the application data a.

Figure 38:
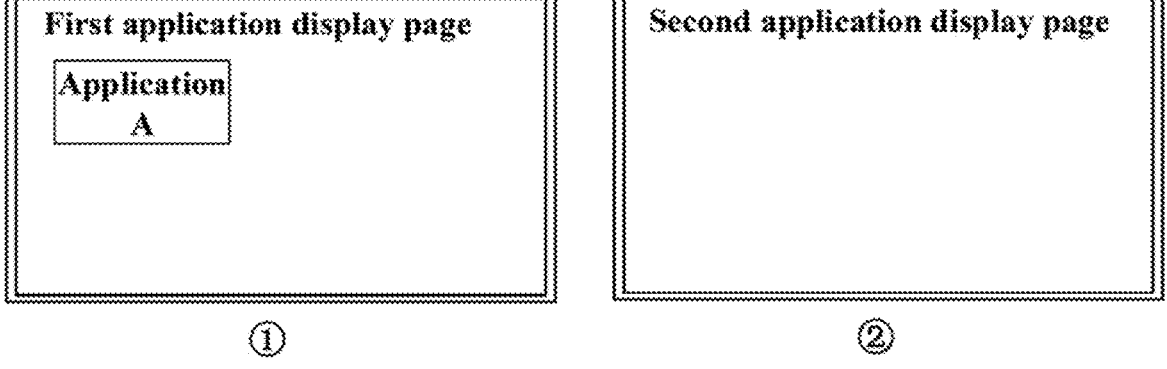
FIG. 38 shows a schematic diagram of display interface before application A is moved according to some embodiments.

The display apparatus 200 stores the application data a in the first storage space. In this case, the application A is correspondingly displayed on the first application display page, as shown in figure ① in FIG. 38. In this example, the first application display page is a user interface corresponding to a specified option "My Download" in the application store. Besides, as shown in figure ② in FIG. 38, the application A is not displayed on the second application display page. After the application A is installed, the move option 903 is adjusted to be in an available state. If the user sends the display command to the display apparatus 200 based on the move option 903, the display apparatus 200 reads the application data a from the first storage space and writes the application data a to the second storage space in response to the display command. After the application data a are completely written to the second storage space, the display apparatus 200 controls the application data a in the first storage space to be deleted. The second storage space sends the second application message to the second application display page after a writing process of the application data a is completed, and the second application display page refreshes the page in response to the second application message to display the application A on the second application display page, as shown in ② in FIG. 39. In an example, the second application message is a JSON message and an example is as follows:

```
{
    "MsgType": "appControl",
    "action": "updateAppState",
    "from": "appstore",
    "to": "launcher",
    "appId":"sport"
}
```

Here MsgType is the type of the message, and appControl is a particular type of message; action is an operation associated with the messgae, and in the above example the action is update application state; from is the source of the application; to is the destination of the application; and appID is the ID of the application.

Figure 39:
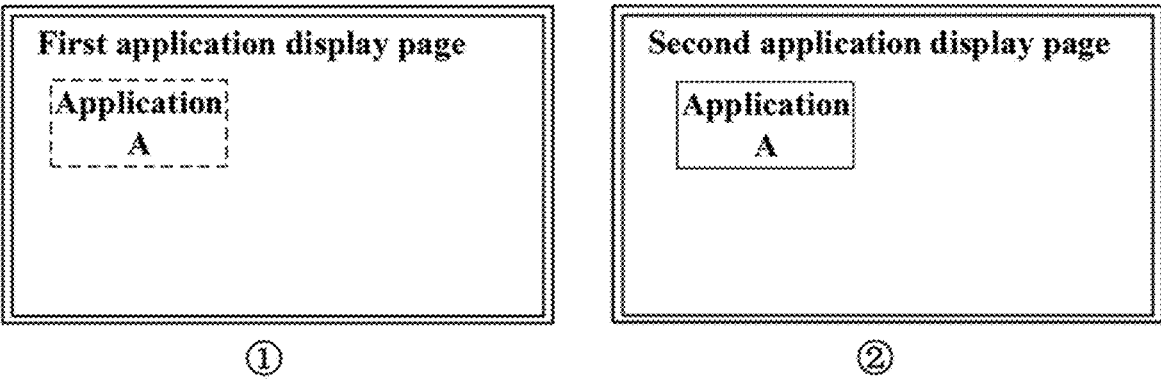
FIG. 39 shows a schematic diagram of display interface after application A is moved according to some embodiments.

After the application data a is deleted, the first storage space sends the first application message to the first application display page, and the first application display page refreshes the page in response to the first application message to delete the application A from the first application display page, as shown in ① in FIG. 39 (a dotted line indicates the deleted application A). The first application message is configured like the second application message. Therefore, a process of moving the application A from the first application display page to the second application display page for being displayed is completed.

Figure 40:
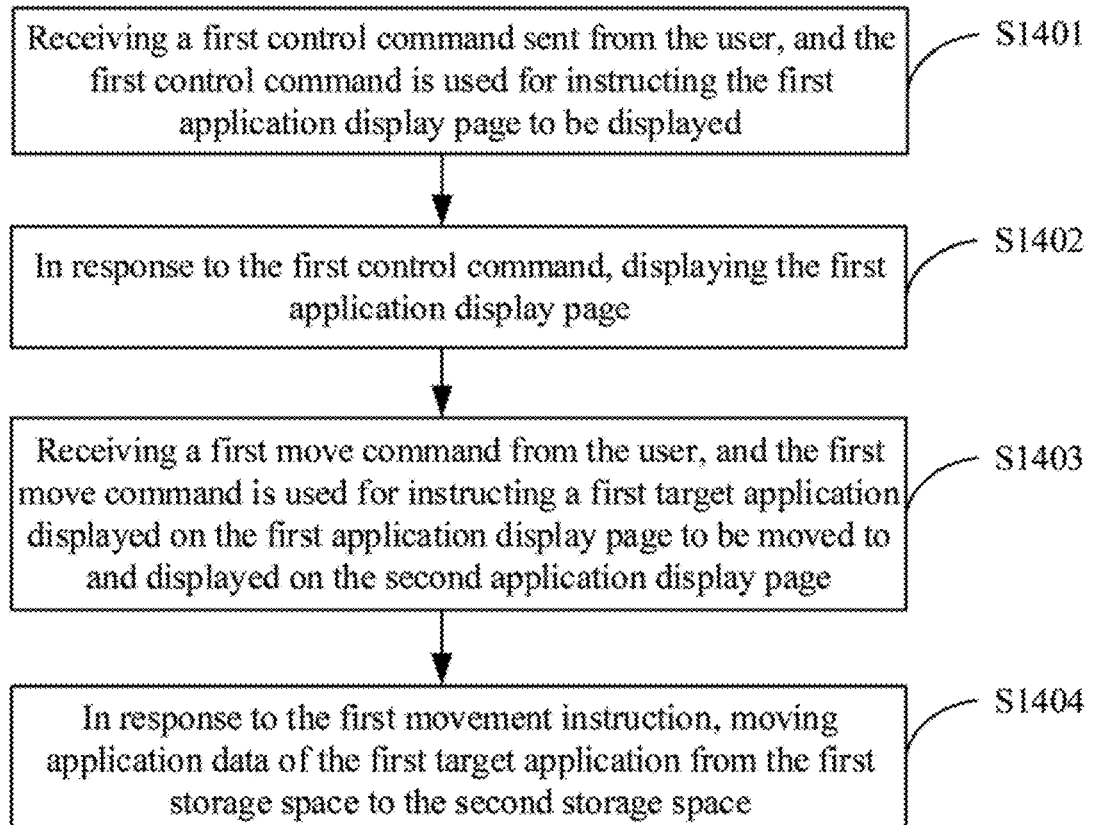
FIG. 40 shows a flowchart of moving a third-party application in a first application display page to a second application display page for display according to some embodiments.

As for the third-party application currently displayed on the first application display page, reference may be made to a process shown in FIG. 40 for a process of moving the third-party application to the second application display page, with details as follows.

S1401, receiving a first control command sent from the user, and the first control command is used for instructing the first application display page to be displayed.

The display apparatus 200 will display the first application display page in response tp a control command from the user, and this control command denotes as the first control command for distinction from other commands or instructions.

In some embodiments, the first application display page is the user interface corresponding to the specified option "my download" in the application store. Based on the user interface corresponding to the application store as shown in FIG. 31, the user interface includes an option 501 of my download. The user moves the focus to the option 501 of my download. The user moves the focus to the option 501 of my download via the remote controller, and the first control command is generated by a selection of the "OK" key on the remote controller.

S1402, in response to the first control command, displaying the first application display page.

Figure 41:
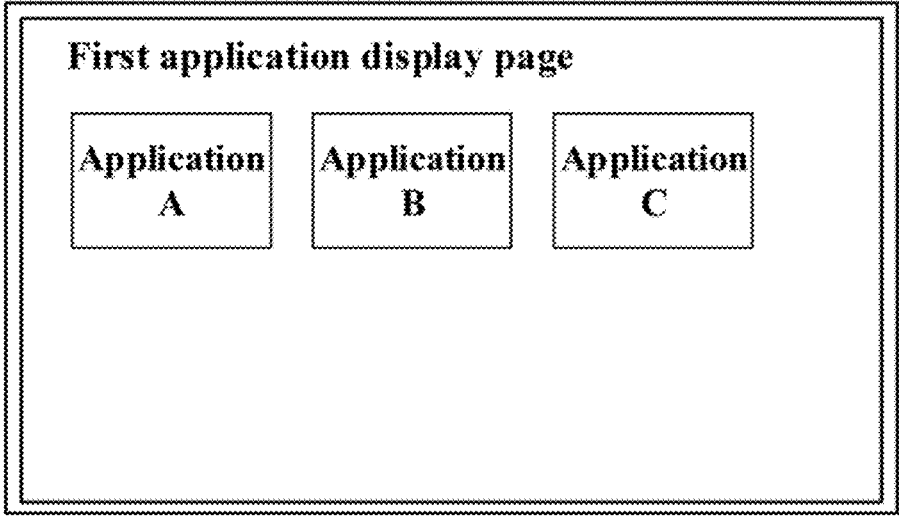
FIG. 41 shows a schematic diagram of a first application display page according to some embodiments.

In response to the first control command, the display apparatus 200 displays the user interface corresponding to my download as shown in FIG. 41, that is, the first application display page, and the first application display page includes the application A, the application B and the application C.

S1403, receiving a first move command from the user, and the first move command is used for instructing a first target application displayed on the first application display page to be moved to and displayed on the second application display page.

By browsing the third-party applications on the first application display page, the user determines a third-party application (referred to as the first target application for the convenience of description) to be moved to the second application display page as required by the user.

The user moves the focus to the first target application via the remote controller, and sends a command to the display apparatus 200 by selecting the "OK" key on the remote controller, so as to instruct the display apparatus 200 to display the detail page of the first target application. The application A as the first target application is taken as an example for description, as shown in FIG. 42, the detail page of the application A includes a name "A" of the application A, an icon 1601 of the application A, description information "Entertainment" of the application A, an open option 1602 for instructing the display apparatus 200 to display the user interface of the application A, and a move option 1603 for instructing the application A to be moved to and displayed on the second application display page.

In some embodiments, as for a first target application simultaneously displayed on the first application display page and the second application display page, a move option in a detail page is in an unavailable state, such as a grayed state, to prompt the user that the first target application is unmovable. Optionally, the move option in the detail page is hidden. Optionally, the icon has a special identifier, or a prompt is added to the move option to inform the user that the first target application is already displayed on the second application display page.

Figure 42:
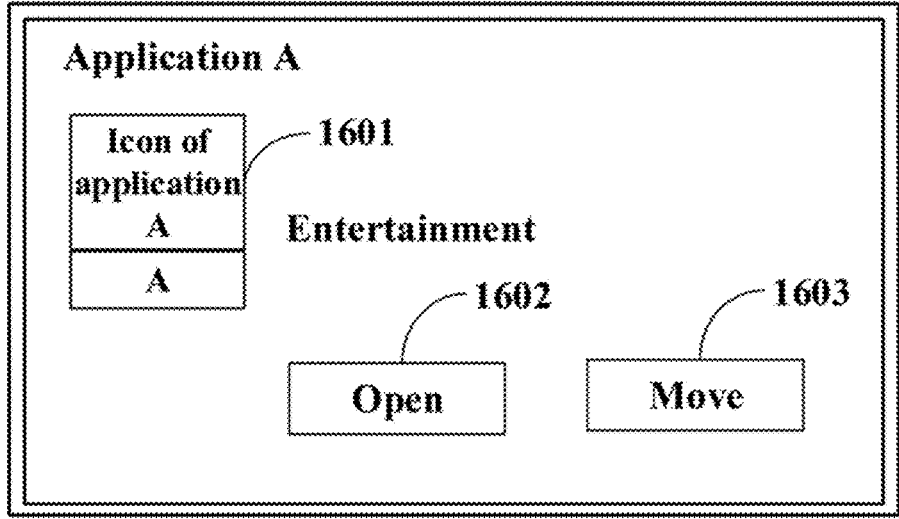
FIG. 42 shows a schematic diagram of a detail page of application A according to some embodiments.

In some embodiments, as for a first target application that is merely displayed on the first application display page but not displayed on the second application display page, a move option in an available state is displayed, as shown in FIG. 42.

The user issues the first move command to the display apparatus 200 based on the move option 1603 to instruct the display apparatus 200 to move the application A to the second application display page for being displayed.

S1404, in response to the first move command, moving application data of the first target application from the first storage space to the second storage space.

In response to the first move command, the display apparatus 200 reads the application data a of the application A from the first storage space and writes the application data a to the second storage space. By refreshing the second application display page, the application A is displayed, and by refreshing the first application display page, the application A is removed from the first application display page. If the first application display page is configured to display the first target application that has moved to the second application display page, the application A is not removed, that is, the application A is displayed on the first application display page and the second application display page simultaneously. Reference may be made to part described above corresponding to FIG. 37 for a flow process of the above application data a, and reference may be made to FIG. 39 for a process of the above page display change, which is not repeated herein.

Based on the above process, the third-party application displayed on the first application display page may be moved to and displayed on the second application display page, such that a display position of the third-party application on the first application display page may be flexibly presented.

As for the third-party application currently displayed on the second application display page, reference may be made to a flow shown in FIG. 43 and a flow process of an application data shown in FIG. 44 for a process of moving the third-party application to the first application display page, with details as follows.

S1701, receiving a second control command from the user, and the second control command is used for instructing the second application display page to be displayed.

The display apparatus 200 will display the second application display page in response to a control command, and this control command denotes as the second control command for distinction.

In some embodiments, the second application display page is a user interface corresponding to a specified option "My Apps" in the Launcher. Based on the user interface of the Launcher as shown in FIG. 33, the user interface includes an application management option 701. The user moves the focus to the application management option 701 via the remote controller, and sends the second control command to the display apparatus 200 by selecting the "OK" key on the remote controller.

S1702, in response to the second control command, displaying the second application display page.

Figure 45:
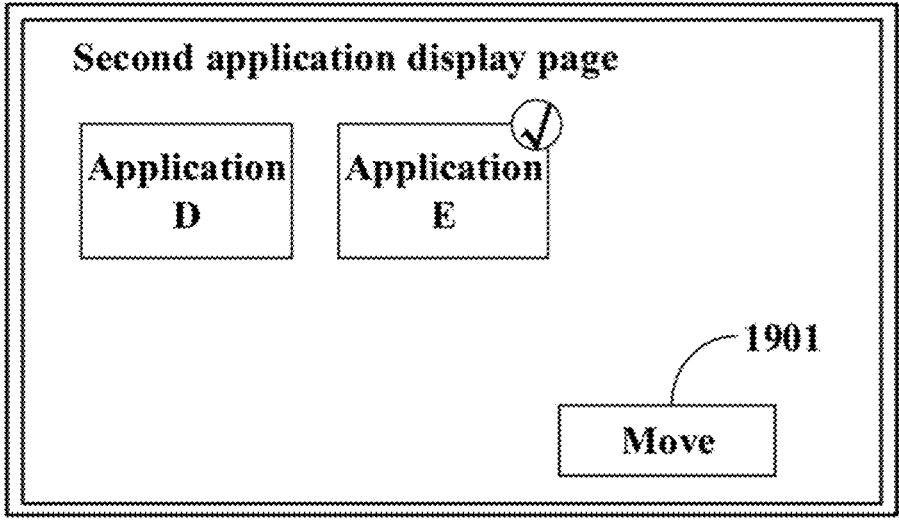
FIG. 45 shows a schematic diagram of a first application display page according to some embodiments.

In response to the second control command, the display apparatus 200 displays the user interface corresponding to My Apps as shown in FIG. 45, that is, the second application display page, and the second application display page includes application D and application E. In this embodiment, the pre-installed third-party application may be displayed on the second application display page by default, for example, the application E is the pre-installed third-party application.

S1703, receiving a second move command from the user, and the second move command is used for instructing a second target application displayed on the second application display page to be moved to and displayed on the first application display page, where the second target application includes the third-party application pre-installed in the display apparatus before delivery.

By browsing the third-party applications on the second application display page, the user determines a third-party application (referred to as the second target application for the convenience of description) to be moved to the first application display page.

The user moves the focus to the second target application via the remote controller, and issues a command to the display apparatus 200 by selecting the "OK" key on the remote controller, so as to instruct the display apparatus 200 to mark the second target application. The application E as the second target application is taken an example, as shown in FIG. 45, the application E is marked with a check mark in a circle at a top right corner. The second application display page as shown in FIG. 45 further includes a move option 1901, and the move option is used for moving the second target application to and displayed on the first application display page. The user sends the second move command to the display apparatus 200 based on the move option 1901 to instruct the application E to be moved to and displayed on the first application display page.

S1704, in response to the second move command, moving application data of the second target application from the second storage space to the first storage space.

Figure 46:
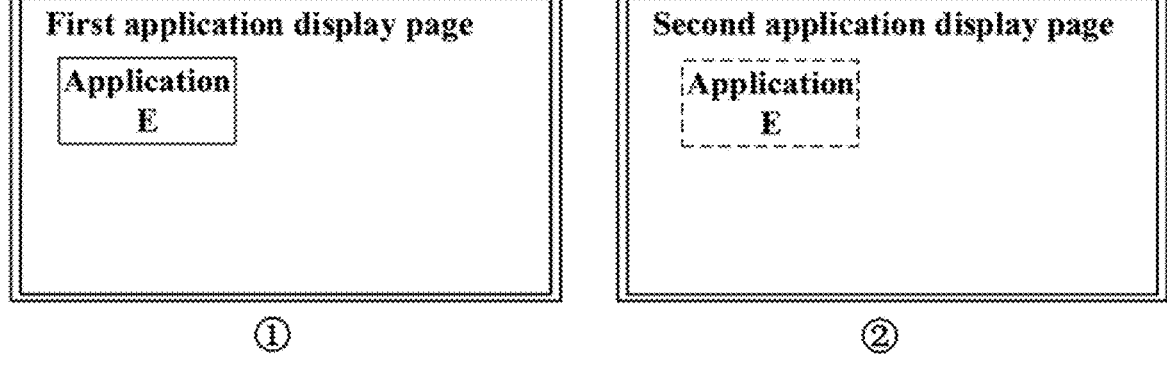
FIG. 46 shows a schematic diagram of display interfaces after application E is moved according to some embodiments.

The display apparatus 200 identifies the selected application E, and in response to the second move command, reads the application data e of the application E from the second storage space and writes the application data e to the first storage space. By refreshing the first application display page, the application E is displayed on the first application display page, and by refreshing the second application display page, the application E is removed from the second application display page. As shown in FIG. 1) in FIG. 46, the application E is displayed on the first application display page, and as shown in FIG. 2) in FIG. 46, the application E is no longer displayed on the second application display page (the application E that is no longer displayed is shown by a dotted line).

In some embodiments, if the second target application is currently displayed on both the first application display page and the second application display page, it is not necessary to write the application data again when it is detected that the application data of the second target application exist in the first storage space, and correspondingly, it is unnecessary to refresh the first application display page.

Based on the above process, the third-party application displayed on the second application display page may be moved to and displayed on the first application display page, such that a display position of the third-party application on the second application display page may be flexibly presented. Especially for the pre-installed third-party application, in spite of undeletability of the application data of the pre-installed third-party application, a storage location of the application data of the pre-installed third-party application may be moved, such that the pre-installed third-party application may be moved to and displayed on the first application display page, so as to hide icon presentation of the pre-installed third-party application.

Figure 47:
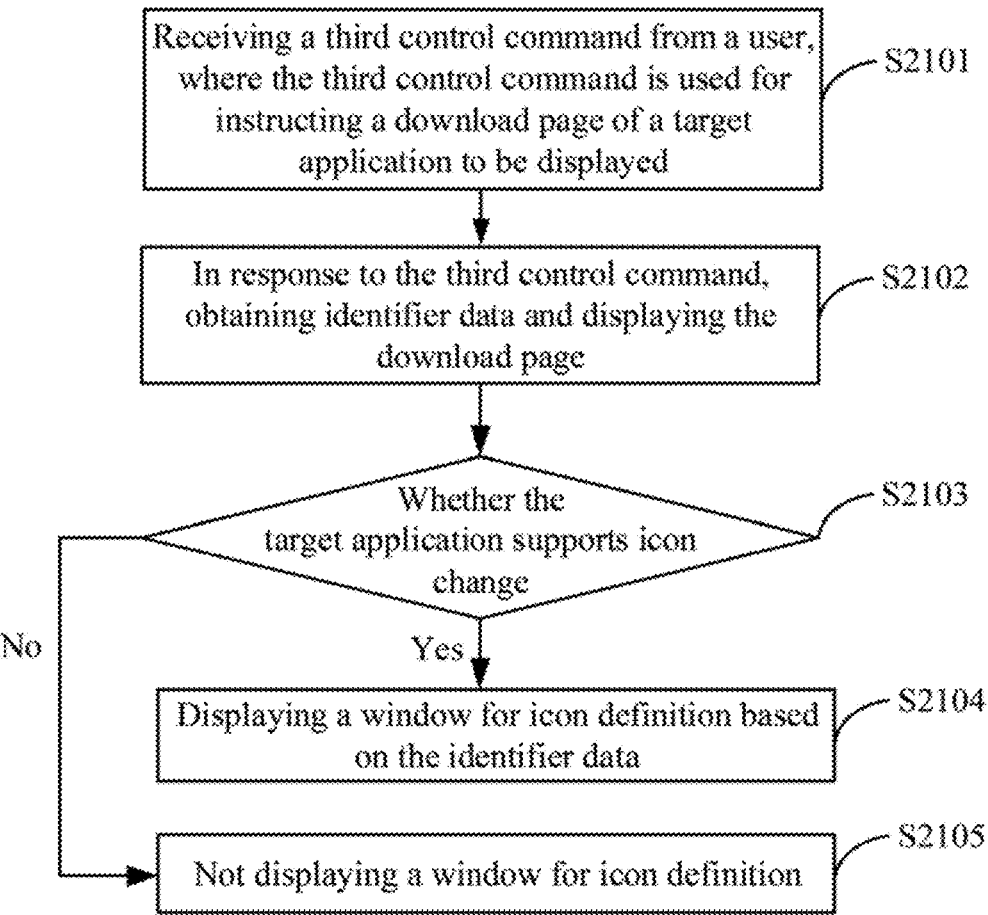
FIG. 47 shows a schematic flowchart of changing an icon according to some embodiments.

Generally, an icon image of an installed third-party application may merely be obtained and displayed based on an icon address provided by the third-party application. The icon image provided by the third-party application is relatively fixed, and may not be defined by the user. In view of this issue, reference may be made to the process shown in FIG. 47, the icon of the third-party application may be customized while the third-party application is installed, with details as follows.

S2101, receiving a third control command from a user, where the third control command is used for instructing a download page of a target application to be displayed.

Reference may be made to related description in S9031 above for the process of sending the third control command to the display apparatus 200, which is not repeated herein.

S2102, in response to the third control command, obtaining identifier data and the displaying the download page.

In this embodiment, the display apparatus 200 is configured to obtain the identifier data from the cloud. The identifier data refer address data, image data, etc. for generating a corresponding identifier. The identifier may be an icon having a smaller size than the icon of the third-party application, and also serves as representation for the application, for example, an identifier as "a basketball" represents basketball sports, and an identifier as "a basketball team logo" represents a corresponding basketball team.

S2103, determining whether the target application supports icon change.

The display apparatus 200 may respond to the installation command from the user. Reference may be made to part described above corresponding to S9031 for the processing of the installation command, which is not repeated herein. The display apparatus 200 first determines whether the target application indicated by the installation command supports icon change, for example, may determine whether other identifiers may be added to the icon of the application based on a protocol of a developer of the third-party application.

S2104, in response to supporting icon change, displaying a window for icon definition based on the identifier data, and the window for icon definition is used for changing the icon of the target application.

Figure 48:
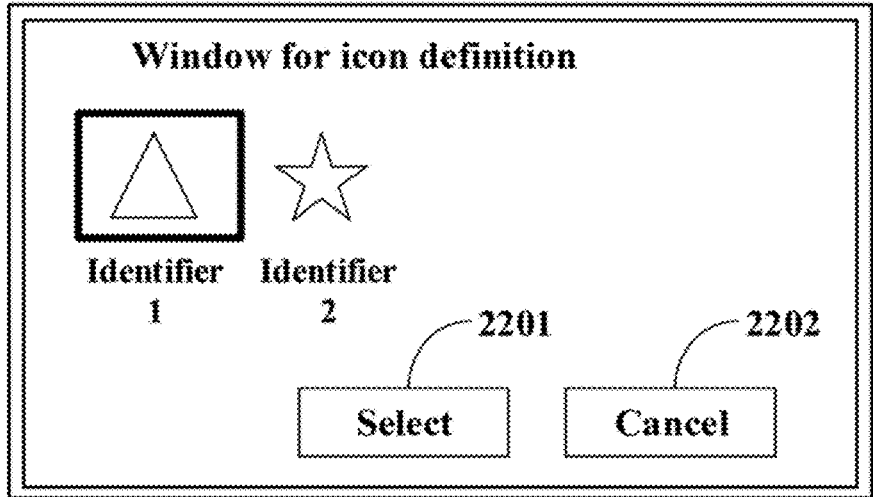
FIG. 48 shows a schematic diagram of a window for icon definition according to some embodiments.

If the target application supports icon change, the display apparatus 200 displays the window for icon definition based on the obtained identifier data for the user to select an identifier to be added. As shown in FIG. 48, the displayed window for icon definition includes an identifier 1 "triangle" and an identifier 2 "star". The window for icon definition further includes a select option 2201 for the user to send a change command to instruct the selected identifier to be added as the icon of the target application. The window for icon definition further includes a cancel option 2202 for the user to send a cancel command to ignore the icon definition.

S2105, in response to not supporting the icon change, not display a window for icon definition.

If the target application does not support the icon change, the window for icon definition is not displayed, and an original icon of the target application is directly used as an icon for installing the target application.

If the target application supports the icon change, reference may be made to a flow shown in FIG. 49 for a process of icon change, with details as follows.

S2301, receiving a change command from the user, and the change command is used for indicating a target identifier.

If the user needs to change the icon of the target application, the user issues a change command to the display apparatus 200. In some embodiments, based on the window for icon definition as shown in FIG. 48, the user moves the focus to the target identifier to be added, such as a triangle, via the remote controller, and sends a command to the display apparatus 200 by selecting the "OK" key on the remote controller to indicate the selected target identifier (indicated by a bold line box in FIG. 48). The user moves the focus to the selection option 2201 via the remote controller, and sends a change command to the display apparatus 200 by selecting the "OK" key on the remote controller to instruct the display apparatus 200 to add the target identifier to the target application.

S2302, in response to the change command, obtaining image data corresponding to the target identifier.

In response to the change command, the display apparatus 200 obtains the image data corresponding to the target identifier from the cloud.

In some embodiments, the cloud of the display apparatus 200 may be configured to generate icons of the third-party application as well as the combination of icons with identifiers (referred to as changed icons for the convenience of description) in advance, and the display apparatus 200 can directly obtain addresses of the changed icons corresponding to the target identifiers and the target applications from the cloud, and directly obtain the changed icons, that is, image data corresponding to the target identifiers according to the addresses. Therefore, efficiency of adding the target identifier may be improved.

In some embodiments, the cloud of the display apparatus 200 merely stores an address of an identifier image of the target identifier, and the display apparatus 200 may obtain the identifier image according to the address of the identifier image. After obtaining the identifier image, the display apparatus 200 may synthesize the original icon of the target application and the target identifier image via a picture drawing function provided by a browser in the display apparatus, such as a canvas function, for example, to cause the identifier image cover a top right corner of the original icon to obtain the image data corresponding to the target identifier, and save the image data in a local format in a local database which is able to be recognized by the local database of the display apparatus. When the target application is displayed, a synthesized image, the image data corresponding to the target identifier stored in the local database, is directly called up from the local database to serve as the icon of the target application.

S2303, replacing the icon data corresponding to the icon in the application data of the target application with the image data to obtain updated application data.

The icon data corresponding to the icon of the target application are replaced with the above obtained image data corresponding to the target identifier to determine updated version of the application data with a target identifier, which allows for better visually indication of different types of third-party applications.

S2304, storing the updated application data in the first storage space.

Accordingly, while the target application is installed, the updated application data are stored in the first storage space to display a changed icon on the first application display page.

In some embodiments, the icon of the third-party application may also be changed after the third-party application is installed. In this case, the user may instruct a detail page of the third-party application to be displayed. When the display apparatus 200 displays the detail page of the third-party application in response to a command from the user, the display apparatus may obtain the identifier data from the cloud, with reference to the corresponding process of obtaining the identifier data of S2102 above, and display the window for icon definition on the detail page of the third-party application with reference to the corresponding parts of S2103-S2105. If the third-party application supports the icon change, the target identifier may be added to the icon of the third-party application with reference to the corresponding process of S2301-S2304, and the above processes are not repeated herein. As shown in FIG. 1) in FIG. 50, an original icon of the application B is a circle. After the target identifier is added, as shown in FIG. 2) in FIG. 50, there is a target identifier shown as a triangle at the top right corner of the original icon.

Figure 51:
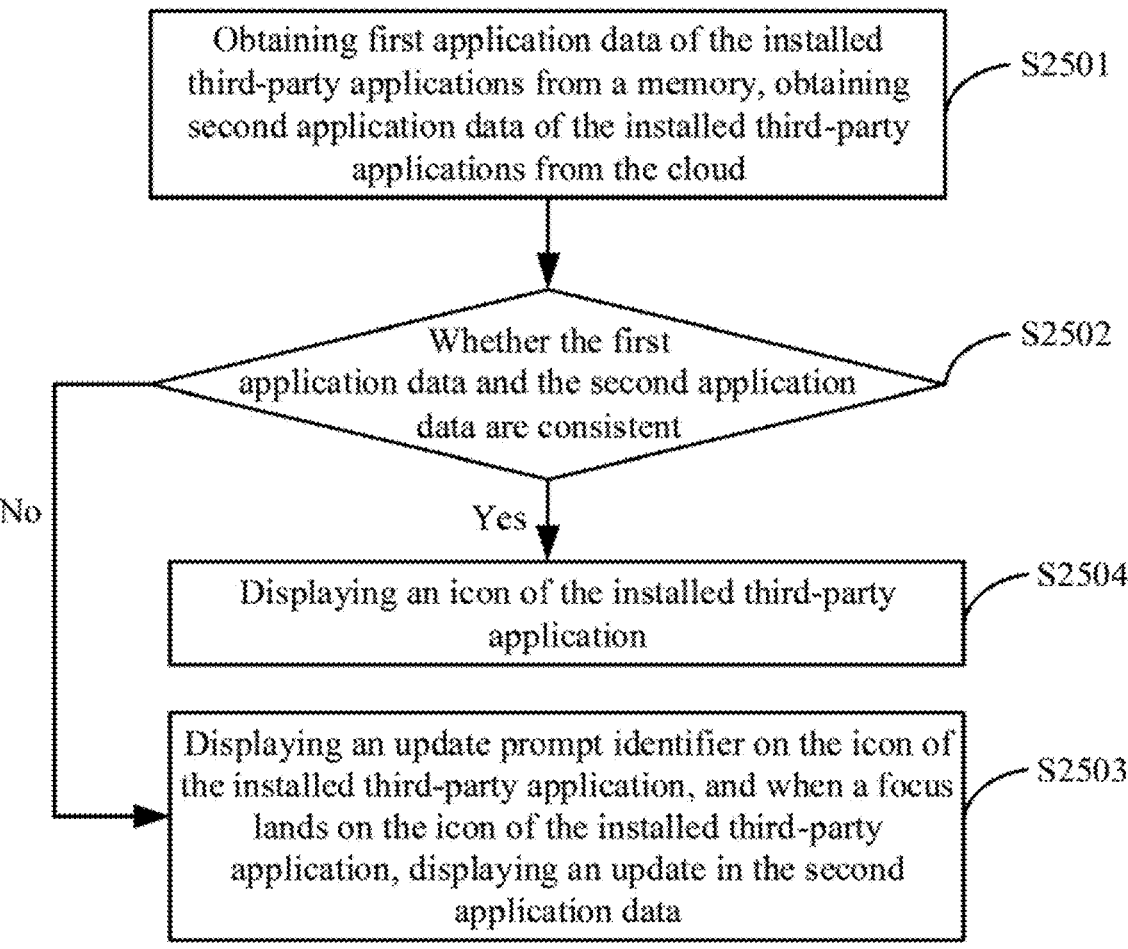
FIG. 51 shows a schematic flowchart of displaying an update prompt according to some embodiments.

In some embodiments, the display apparatus 200 is configured to automatically update the installed third-party applications in the background to guarantee that the display apparatus may operate in a latest version of the third-party applications. A process of automatically updating the installed third-party applications in the background refers to storing updated application data of the third-party applications in the cloud. Just because of this non-perceived update process, the user may not know in time which third-party application updates, or specific content of this update of these updated third-party applications. In view of the above issue, prompt information may be set for the updated third-party application with reference to a flow shown in FIG. 51, with details as follows.

S2501, obtaining first application data of the installed third-party applications from a memory, obtaining second application data of the installed third-party applications from the cloud, where the first application data and the second application data both include a version number and an update content of the installed third-party application, update time is added simultaneously when the application data are stored. The update time refers to time for updating the first application data with the second application data obtained from the cloud.

In this embodiment, the application data of the third-party application obtained by the display apparatus 200 from the cloud also includes a version number, recent update time and an update of the third-party application. These application data are used to detect whether the third-party application is updated and a specific update.

In this embodiment, the application data of the installed third-party application obtained from the memory are referred to as the first application data, and the application data of the installed third-party application obtained from the cloud are referred to as the second application data. Obtaining time of the second application data is later than that of the first application data, so once the installed third-party application is updated in the background, the first application data are inconsistent with the second application data. On the contrary, if the installed third-party application is not updated in the background, the first application data are consistent with the second application data. Consistency between the first application data and the second application data may be determined based on the version number of the third-party application.

In some embodiments, after the display apparatus 200 is powered on, whether the third-party applications are updated in the background is detected. Optionally, after the first application display page is instructed to be opened and the second application display page is instructed to be opened, whether the third-party applications displayed on corresponding pages are updated in the background is detected. Optionally, after a specified time interval, for example, 24 h, whether the third-party applications are updated in the background is periodically detected. Optionally, whether the third-party applications are updated in the background is detected at a special time point, such as a holiday.

In some embodiments, update time of the second application data that have never been obtained is displayed as void.

S2502, detecting whether the first application data and the second application data are consistent.

By comparing whether version numbers in the first application data and the second application data are the same, whether the third-party application is updated can be rapidly and accurately determined.

S2503, in response to the first application data and the second application being not consistent, displaying an update prompt identifier on the icon of the installed third-party application, and when the focus lands on the icon of the installed third-party application, displaying an update in the second application data.

Figure 52:
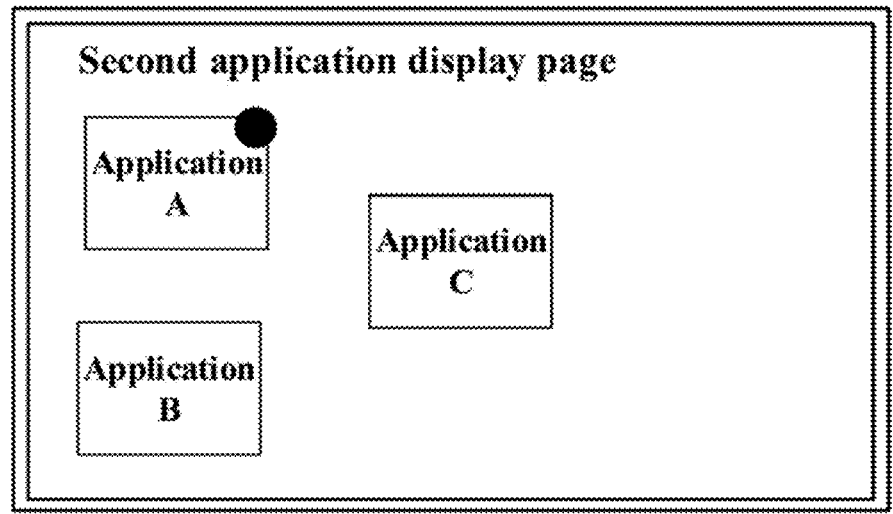
FIG. 52 shows a schematic diagram of an interface showing an update prompt identifier on an icon according to some embodiments.

In the case of inconsistency, it means that the installed third-party application has been updated in the background. An update prompt identifier is added to the installed third-party application by adding a flag to the installed third-party application, such as update=true. As shown in FIG. 52, if the application A in the second application display page is updated in the background, an update prompt identifier is added at a top left corner of the application A, such as a black circular flag. By recognizing the update prompt identifier, the user may rapidly know a background update of the application A, which allows for better human-machine interaction.

In addition, when the display apparatus 200 detects that the focus lands on the application A, the update of the application A is displayed. The update is an update in the second application data. In this way, the user may rapidly know the update of the application A.

In some embodiments, since display of the update may block presentation of a page, the update is displayed in response to the display apparatus 200 detecting that the focus stays on the application A for a preset period, so as to avoid the situation that when the user accidentally moves the focus to the application A, the update pops up immediately to block presentation of the page, and therefore preventing distraction from browsing the application display page normally.

Figure 53:
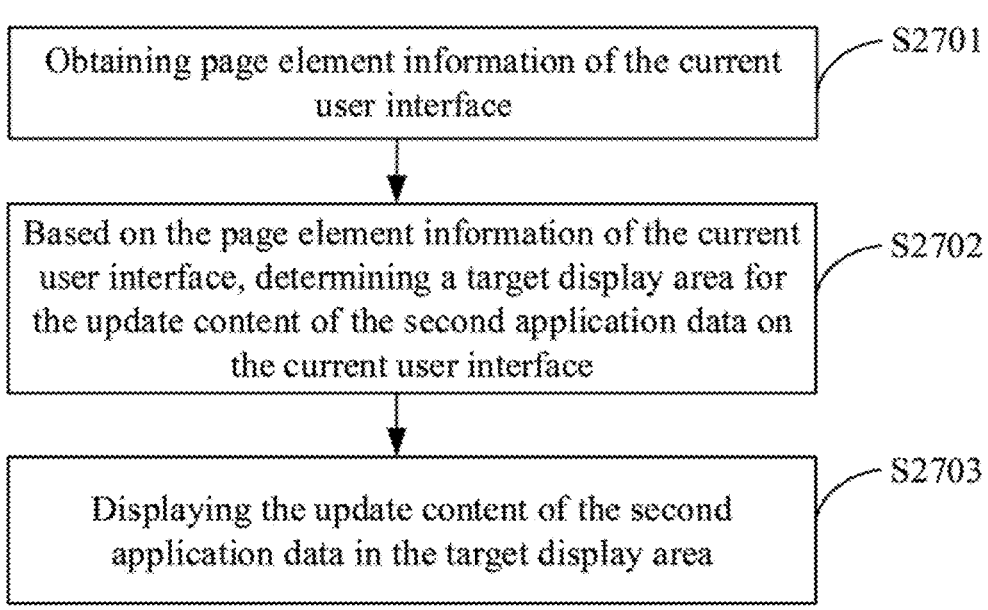
FIG. 53 shows a schematic flowchart of displaying an update according to some embodiments.

In some embodiments, the update is displayed in a current user interface by detecting page element information of the current user interface with reference to a process shown in FIG. 53, with details as follows.

S2701, obtaining page element information of the current user interface.

The current user interface refers to a page currently displayed on the display of the display apparatus, and includes the first application display page and the second application display page. The page element information includes a display position of an icon of the installed third-party application on the current user interface, boundary information of the current user interface, and a display area required for the update in the second application data.

S2702, based on the page element information of the current user interface, determining a target display area for the update content of the second application data on the current user interface.

S2703, displaying the update content of the second application data in the target display area.

Figure 54:
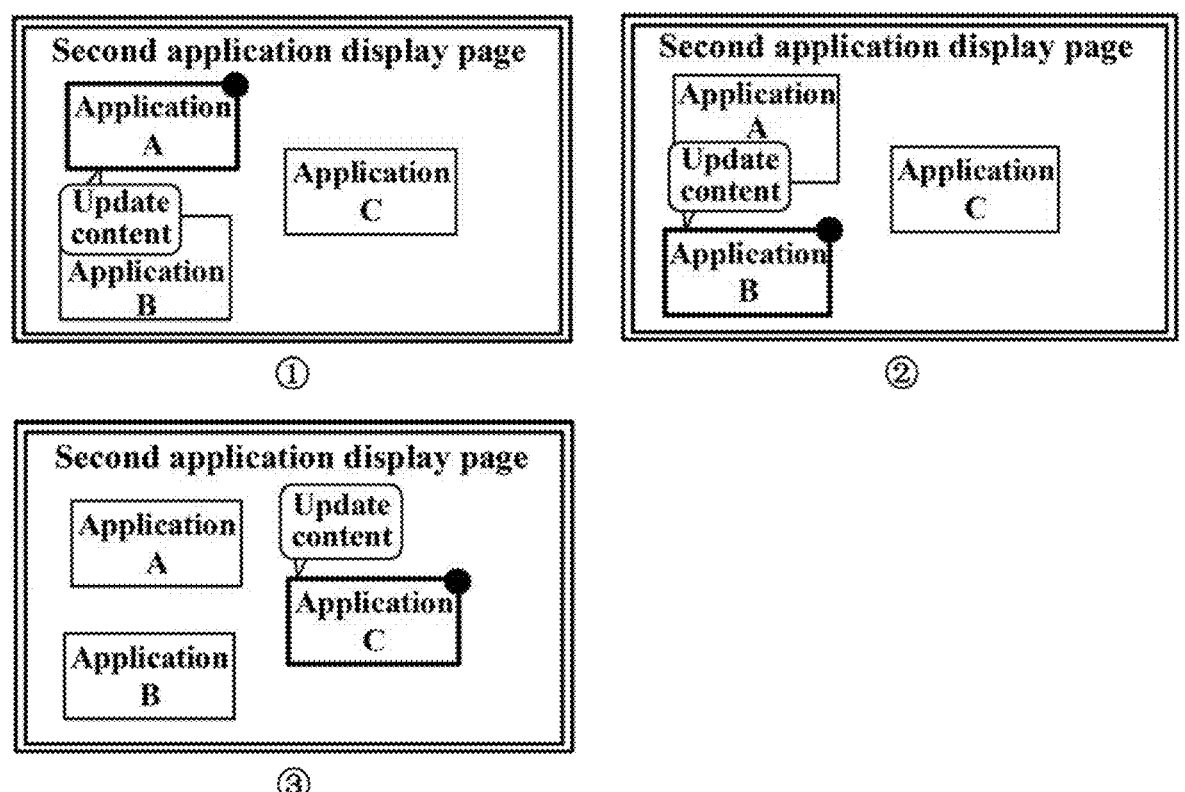
FIG. 54 shows schematic diagrams of an interface showing a position for presenting an update according to some embodiments.

In this embodiment, it is necessary to guarantee that the update is completely displayed in the target display area, that is, when a distance or area between a third-party application with an update content needs to display and a boundary of the current user interface is greater than or equal to an area required for the update content display, such as one of the four edges of the first application display page presented as a rectangle, the update may be displayed there. As shown in FIG. 1) in FIG. 54, in the case that a third-party application with an update content to be displayed is the application A, since a distance between the application A and an upper boundary of the current user interface is small, the update is displayed below the application A. As shown in FIG. 2) in FIG. 54, in the case that a third-party application with an update to be displayed is the application B, since a distance between the application B and a lower boundary of the current user interface is small, the update is displayed above application B. If the distance between the third-party application with the update to be displayed and the boundary of the current user interface is large enough to display the update, the update may be displayed in a default orientation, for example, the default orientation is above the third-party application, as shown in FIG. 3) in FIG. 54. In the case that a third-party application with an update to be displayed is the application C, since a distance between the application C and the boundary of the current user interface is large, the update is displayed above application C.

S2504, in response to the first application data and the second application being consistent, displaying the icon of the installed third-party application.

If the first application data are consistent with the second application data, it means that the installed third-party application is the updated one in the background, so it is unnecessary to display the update prompt identifier and the update, but merely needs to directly display the icon of the third-party application.

Figure 55:
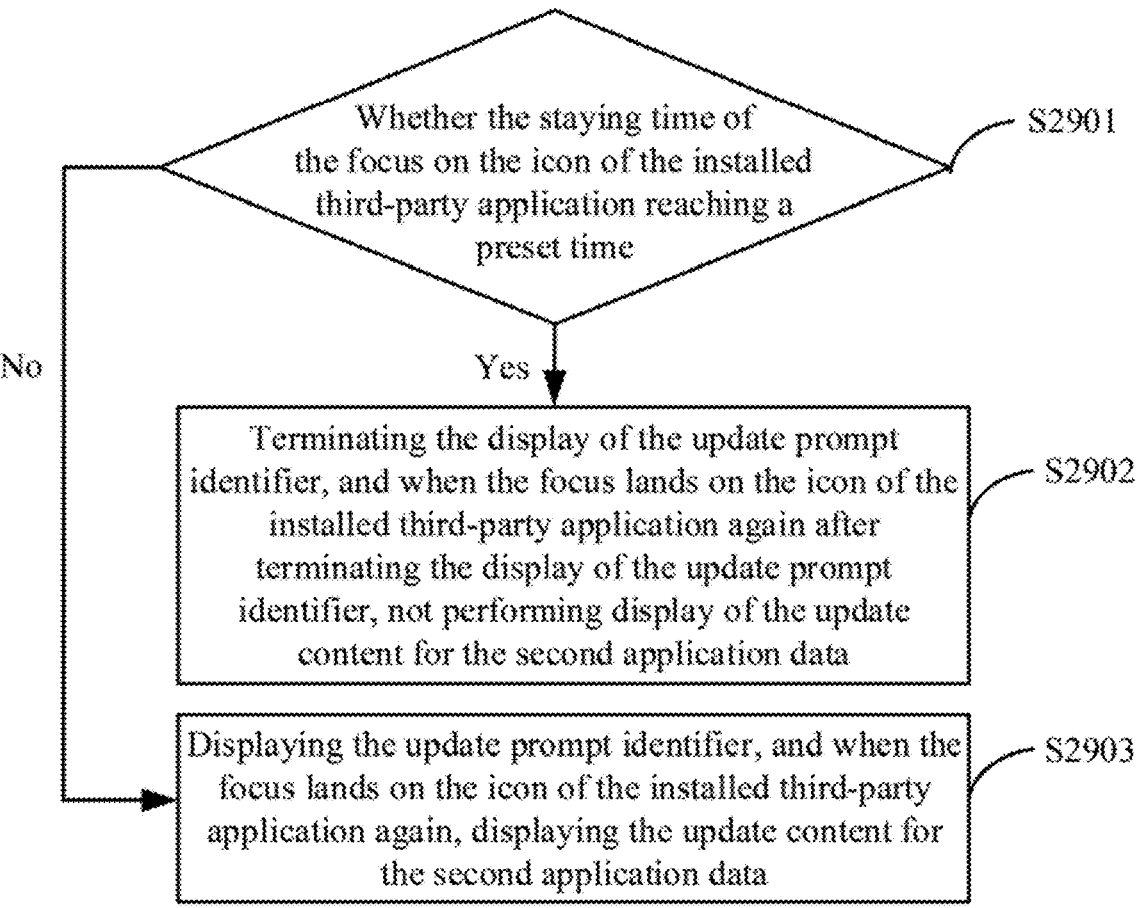
FIG. 55 shows a schematic flowchart of deleting an update prompt according to some embodiments.

In some embodiments, the update prompt identifier and the update are mainly used to attract attention of the user, such that when the user sees the third-party application updated in the background, the user may rapidly know that the third-party application is updated in the background and the corresponding update. After the user knows the above information, the prompt for the user is not needed any longer, so as to prevent the update prompt identifier and the update from affecting normal browsing of the page. The prompt information may be eliminated with reference to a flow shown in FIG. 55, with details as follows.

S2901, detecting whether the staying time of the focus on the icon of the installed third-party application reaching a preset time.

In this embodiment, the staying time of the focus on the icon of the installed third-party application is used to indicate whether the update of the third-party application has been presented on the display.

S2902, in response to the staying time reaching the preset time, terminating the display of the update prompt identifier, and when the focus lands on the icon of the installed third-party application again after terminating the display of the update prompt identifier, not performing display of the update content for the second application data.

Figure 56:
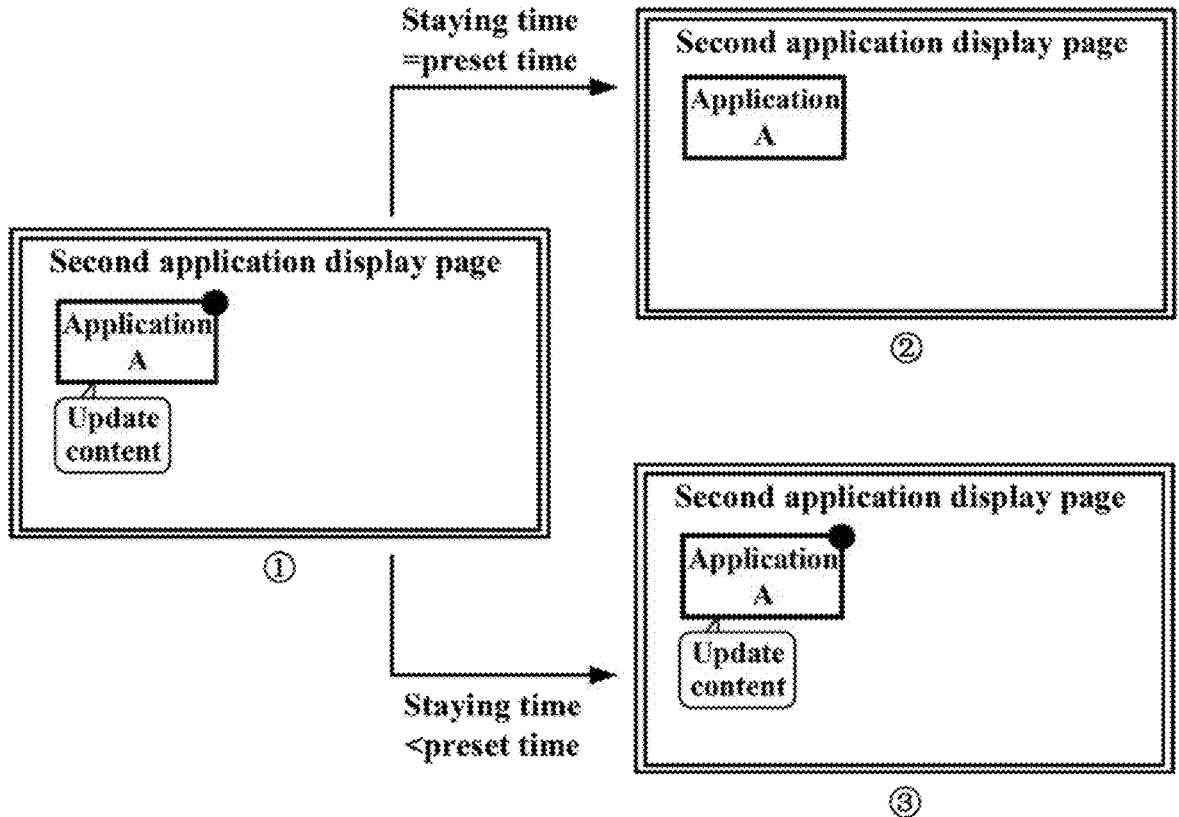
FIG. 56 shows a schematic diagram of user interfaces with an update prompt maintained or deleted according to some embodiments.

With reference to the process shown from FIG. 1) in FIG. 56 to FIG. 2) in FIG. 56, in response to the staying time of the focus (shown in a bold solid line box) being equal to the preset time, that is, the update prompt identifier successfully plays a prompt role, it is unnecessary to continue to display the update prompt identifier, but a function of displaying the update content is retained when the focus lands on the icon of the third-party application this time. By modifying the flag after terminating display of the update prompt identifier, for example, modifying the flag to update=false, the update content will not be displayed when the focus lands on the icon of the third-party application again.

S2903, in response to the staying time being shorter than the preset time, displaying the update prompt identifier, and when the focus lands on the icon of the installed third-party application again, displaying the update content for the second application data.

With reference to the process shown from FIG. 1) in FIG. 56 to FIG. 3 in FIG. 56, if the staying time of the focus is shorter than the preset time, that is, the update prompt identifier fails to play a prompt role, the update prompt identifier is displayed continuously to serve as a prompt for the user continuously. Besides, the flag update=true is retained to display the update content when the focus lands on the icon of the third-party application again.

Based on the display apparatus and the method for processing a third-party application according to the embodiments of the disclosure, the display apparatus receives and responds to the installation command from the user, and first stores the application data of the target application indicated by the installation command in the first storage space, such that the target application is displayed on the first application display page by default. The display apparatus receives and responds to the display command from the user, and moves the application data of the target application from the first storage space to the second storage space, that is, the storage space corresponding to the second application display page indicated by the user, so as to display the target application on the second application display page. Therefore, the installed third-party application may be merely displayed on the second application display page. While the target application is installed, the icon of the target application may be further changed based on demands for visually indication of different types of third-party applications. Moreover, the installed third-party applications may be flexibly changed to be displayed on the first application display page or the second application display page. Besides, after the third-party application is updated, the update prompt and the specific update are displayed, such that the updated third-party application can be visually indicated in time in case of background update.

For the convenience of explanation, the above description has been made in combination with specific embodiments. However, the above illustrative discussion is not intended to be exhaustive or to limit the embodiments to the specific forms disclosed above. Various modifications and variations can be made based on the above teachings. The above embodiments have been chosen and described to better explain contents of the present disclosure, such that those skilled in the art can make better use of the embodiments.

What is claimed is:

1. A display apparatus, comprising:
a display configured to display an image from broadcast system or Internet, and/or a user interface;
a non-transitory memory, comprising a first storage space and a second storage space, wherein the first storage space is configured to store application data of a first application whose icon is presented on a first application display page, and the first storage space is a default storage space for a third party application installed upon request; the second storage space is configured to store application data of a second application whose icon is presented on a second application display page different from the first application display page and the second storage space is an optional storage space for a third party application;
at least one processor in connection with the display and the memory, and configured to execute instructions to cause the display apparatus to:
receive an install command for installing a target third party application in the display apparatus based on a selection of a first option on a downloading page corresponding to the target third party application from a user;
in response to the install command for installing the target third party application, store application data of the target third application in the first storage space in the display apparatus;
receive a display command for displaying an icon of the target third party application on the second application display page based on a selection of a second option on the downloading page from the user; wherein the second button is configured to be available for selection when the installation of the target third party application is complete;
in response to the display command, move the application data of the target party application from the first storage space to the second storage space and display the icon of the target third party application on the second application display page.

2. The display apparatus according to claim 1, wherein the at least one processor is further configured to execute the instructions to cause the display apparatus to:

receive a first control command for indicating displaying the first application display page;

in response to the first control command, display the first application display page, wherein the first application display comprising a first plurality of icons whose application data are stored in the first storage space;

receive a first move command for a first icon among the first plurality of icons to move the first icon to the second application display page;

in response to the first move command, move application data corresponding to the first icon.

3. The display apparatus according to claim 1, wherein the at least one processor is further configured to execute the instructions to cause the display apparatus to:

receive a second control command for indicating displaying the second application display page, wherein the second application display page comprises a second plurality of icons whose application data are stored in the second storage space;

in response to the second control command, display the second application display page;

receive a second move command for a second icon among the second plurality of icons to move the second icon to the first application display page, wherein the second icon is an icon for a built-in third party application in the display apparatus;

in response to the second move command, move application data corresponding to the second icon from the second storage space to the first storage space.

4. The display apparatus according to claim 1, wherein the at least one processor is further configured to execute the instructions to cause the display apparatus to:

receive a third control command for displaying a download page of the target third party application;

in response to the third control command, display the download page of the target application and obtain identifier data of the target application, wherein the identifier data of the target application is configured to generate an updated identifier for the target third party application different from an original icon of the target third party application.

5. The display apparatus according to claim 4, wherein the at least one processor is further configured to execute the instructions to cause the display apparatus to:

store the updated identifier for the target third party application in the first storage space according to a local data format which is able to be recognized by a local database in the display apparatus.

6. The display apparatus according to claim 5, wherein the at least one processor is further configured to execute the instructions to cause the display apparatus to:

synthesize the original icon of the target application and the identifier data via a picture drawing function provided by a browser in the display apparatus to obtain the updated identifier for the third party application; and replace the original icon of the target third party application with the updated identifier for the third party application which is able to be presented on the first application display page.

7. The display apparatus according to claim 1, wherein the at least one processor is further configured to execute the instructions to cause the display apparatus to:

obtain third application data for a third application stored in the first storage space and obtain fourth application for the third application, wherein the third application data includes a version number, recent update time and update content, the fourth application data includes a version number, recent update time and update content;

determine whether the third application data and the fourth application data are consistent;

in response to the third application data and the fourth application data being consistent, present a third icon of the third application data on the first application display page according to the application data in the first storage space;

in response to the third application data and the fourth application data being not consistent, present the third icon of the third application with a visual update prompt identifier on the first application display page;

in response to a focus landing on the third icon, display update content of the third application.

8. The display apparatus according to claim 7, wherein the at least one processor is further configured to execute the instructions to cause the display apparatus to:

detect whether staying time of the focus on the third icon reaching a preset time;

terminate display of the visual update prompt identifier with the third icon, and when the focus lands on the third icon again after terminating display of the visual update prompt identifier, not perform display of the update content for the third application.

9. The display apparatus according to claim 8, wherein the at least one processor is further configured to execute the instructions to cause the display apparatus to:

in response to the staying time not reaching the preset time, display the visual update prompt identifier, and when the focus lands on the third icon again, display the update content for the third application again.

10. The display apparatus according to claim 8, wherein the at least one processor is further configured to execute the instructions to cause the display apparatus to:

obtain page element information on the first application display page, wherein the page element information comprises a display position of the third icon, boundary information of the first application display page and a display area required for presentation of the update content;

determine a target display area for displaying the update content of the third application according to the page element information;

display the update content of the third application in the target display area.

11. A method for a display apparatus, comprising:

receiving an install command for installing a target third party application in the display apparatus based on a selection of a first option on a downloading page corresponding to the target third party application from a user; wherein the display apparatus comprises a display and a non-transitory memory, the display is configured to display an image from broadcast system or Internet, and/or a user interface, and the memory comprises a first storage space and a second storage space; wherein the first storage space is configured to store application data of a first application whose icon is presented on a first application display page, and the first storage space is a default storage space for a third party application installed upon request; the second storage space is configured to store application data of a second application whose icon is presented on a second application display page different from the first application display page and the second storage space is an optional storage space for a third party application;

in response to the install command for installing the target third party application, storing application data of the target third application in the first storage space in the display apparatus;

receiving a display command for displaying an icon of the target third party application on the second application display page based on a selection of a second option on the downloading page from the user; wherein the second button is configured to be available for selection when the installation of the target third party application is complete;

in response to the display command, moving the application data of the target party application from the first storage space to the second storage space and display the icon of the target third party application on the second application display page.

12. The method according to claim 11, further comprising:

receiving a first control command for indicating displaying the first application display page;

in response to the first control command, displaying the first application display page, wherein the first application display comprising a first plurality of icons whose application data are stored in the first storage space;

receiving a first move command for a first icon among the first plurality of icons to move the first icon to the second application display page;

in response to the first move command, moving application data corresponding to the first icon.

13. The method according to claim 11, further comprising:

receiving a second control command for indicating displaying the second application display page, wherein the second application display page comprises a second plurality of icons whose application data are stored in the second storage space;

in response to the second control command, displaying the second application display page;

receiving a second move command for a second icon among the second plurality of icons to move the second icon to the first application display page, wherein the second icon is an icon for a built-in third party application in the display apparatus;

in response to the second move command, moving application data corresponding to the second icon from the second storage space to the first storage space.

14. The method according to claim 11, further comprising:

receiving a third control command for displaying a download page of the target third party application;

in response to the third control command, displaying the download page of the target application and obtain identifier data of the target application, wherein the identifier data of the target application is configured to generate an updated identifier for the target third party application different from an original icon of the target third party application.

15. The method according to claim 14, further comprising:

storing the updated identifier for the target third party application in the first storage space according to a local data format which is able to be recognized by a local database in the display apparatus.

16. The method according to claim 15, further comprising:

synthesizing the original icon of the target application and the identifier data via a picture drawing function provided by a browser in the display apparatus to obtain the updated identifier for the third party application; and replacing the original icon of the target third party application with the updated identifier for the third party application which is able to be presented on the first application display page.

17. The method according to claim 11, further comprising:

obtaining third application data for a third application stored in the first storage space and obtain fourth application for the third application, wherein the third application data includes a version number, recent update time and update content, the fourth application data includes a version number, recent update time and update content;

determining whether the third application data and the fourth application data are consistent;

in response to the third application data and the fourth application data being consistent, presenting a third icon of the third application data on the first application display page according to the application data in the first storage space;

in response to the third application data and the fourth application data being not consistent, presenting the third icon of the third application with a visual update prompt identifier on the first application display page;

in response to a focus landing on the third icon, displaying update content of the third application.

18. The method according to claim 17, further comprising:

detecting whether staying time of the focus on the third icon reaching a preset time;

terminating display of the visual update prompt identifier with the third icon, and when the focus lands on the third icon again after terminating display of the visual update prompt identifier, not performing display of the update content for the third application.

19. The method according to claim 18, further comprising:

in response to the staying time not reaching the preset time, displaying the visual update prompt identifier, and when the focus lands on the third icon again, displaying the update content for the third application again.

20. The method according to claim 18, further comprising:

obtaining page element information on the first application display page, wherein the page element information comprises a display position of the third icon, boundary information of the first application display page and a display area required for presentation of the update content;

determining a target display area for displaying the update content of the third application according to the page element information;

displaying the update content of the third application in the target display area.

* * * * *